United States Patent
Gonzales et al.

(10) Patent No.: US 11,274,437 B2
(45) Date of Patent: Mar. 15, 2022

(54) DRAINING CONSTRUCTION FRAMEWORK AND METHODS FOR SAME

(71) Applicant: R.H. Tamlyn & Sons, LP, Stafford, TX (US)

(72) Inventors: Miguel Gonzales, Pearsland, TX (US); Lei Zhou, Sammanish, WA (US)

(73) Assignee: R. H. Tamlyn & Sons, LP, Stafford, TX (US)

( * ) Notice: Subject to any disclaimer, the term of this patent is extended or adjusted under 35 U.S.C. 154(b) by 0 days.

(21) Appl. No.: 16/872,001

(22) Filed: May 11, 2020

(65) Prior Publication Data

US 2020/0270858 A1   Aug. 27, 2020

Related U.S. Application Data

(63) Continuation-in-part of application No. 16/271,518, filed on Feb. 8, 2019.

(30) Foreign Application Priority Data

Feb. 10, 2018   (CN) .......................... 201820240747.8

(51) Int. Cl.
*E04B 1/62*         (2006.01)
*B32B 3/26*         (2006.01)
(Continued)

(52) U.S. Cl.
CPC .............. *E04B 1/625* (2013.01); *B32B 3/266* (2013.01); *B32B 5/02* (2013.01); *B32B 5/18* (2013.01);
(Continued)

(58) Field of Classification Search
CPC .............. E04B 1/64; E04B 1/625; E04B 1/665
(Continued)

(56) References Cited

U.S. PATENT DOCUMENTS

| | | | | |
|---|---|---|---|---|
| 2,669,114 A | * | 2/1954 | Mills ....................... | E04F 13/04 52/454 |
| 3,073,066 A | * | 1/1963 | Edwards ................. | E04F 13/04 52/127.3 |

(Continued)

FOREIGN PATENT DOCUMENTS

| | | | | |
|---|---|---|---|---|
| CA | 2777993 A1 | * | 11/2012 | ........... E04D 12/002 |
| CN | 208088530 U | | 11/2018 | |

(Continued)

OTHER PUBLICATIONS 19 page PDF of machine translation of DE 102017117375 (Year: 2019).*

(Continued)

*Primary Examiner* — Robert Canfield
(74) *Attorney, Agent, or Firm* — Schwegman Lundberg & Woessner, P.A.

(57) ABSTRACT

A draining construction wrap includes a pliable moisture impermeable layer having interior and exterior surfaces. A drainage framework is configured to channel moisture across the exterior surface of the pliable moisture impermeable layer. The drainage framework includes a plurality of support struts. Each of the support struts includes a base strut portion coupled with the exterior surface, a strut support face, and a strut body extending from the base strut portion to the strut support face. A plurality of drain channels are between the support struts. The draining construction wrap includes an installation surface configured for coupling with an outer wall. The installation surface includes the strut support faces of the plurality of support struts. The strut bodies of the plurality of support struts brace the installation surface and the pliable moisture impermeable layer is recessed from the installation surface with a strut gap therebetween.

23 Claims, 24 Drawing Sheets

(51) Int. Cl.
  *B32B 5/02* (2006.01)
  *B32B 5/24* (2006.01)
  *B32B 27/12* (2006.01)
  *B32B 5/18* (2006.01)

(52) U.S. Cl.
  CPC .............. *B32B 5/245* (2013.01); *B32B 27/12* (2013.01); *B32B 2307/7265* (2013.01); *B32B 2607/00* (2013.01)

(58) Field of Classification Search
  USPC .... 52/169.5, 302.1, 342–345, 361–363, 408, 52/443, 454
  See application file for complete search history.

(56) References Cited

U.S. PATENT DOCUMENTS

| | | | |
|---|---|---|---|
| 3,507,634 A | 4/1970 | Odriscoll | |
| 3,525,663 A | 8/1970 | Hale | |
| 3,563,038 A * | 2/1971 | Healy et al. | E02B 11/005 405/45 |
| 3,888,087 A | 6/1975 | Bergsland | |
| 4,057,500 A * | 11/1977 | Wager | E02B 11/005 210/170.07 |
| 4,212,692 A | 7/1980 | Rasen et al. | |
| 4,284,447 A * | 8/1981 | Dickens | B29C 33/16 156/299 |
| 4,572,700 A * | 2/1986 | Mantarro | E01C 11/225 210/486 |
| 4,622,138 A * | 11/1986 | Wager | B01D 29/395 210/170.07 |
| 4,631,221 A | 12/1986 | Disselbeck et al. | |
| 4,733,989 A * | 3/1988 | Harriett | C09D 5/34 405/43 |
| 4,840,515 A | 6/1989 | Freese | |
| 4,925,342 A * | 5/1990 | Hendy | E02B 11/00 405/36 |
| 4,956,951 A | 9/1990 | Kannankeril | |
| 5,044,821 A | 9/1991 | Johnsen | |
| 5,263,792 A | 11/1993 | Davis et al. | |
| 5,364,686 A | 11/1994 | Disselbeck et al. | |
| 5,383,314 A | 1/1995 | Rothberg | |
| 5,673,521 A | 10/1997 | Coulton et al. | |
| 5,692,348 A | 12/1997 | Ambrosino | |
| 5,860,259 A | 1/1999 | Laska | |
| 6,241,421 B1 * | 6/2001 | Harvie | E02B 11/00 405/36 |
| 6,684,579 B2 * | 2/2004 | Brunson | E04B 1/7061 52/169.14 |
| 6,691,472 B2 | 2/2004 | Hubert | |
| 6,786,013 B2 | 9/2004 | Coulton | |
| 6,802,668 B2 | 10/2004 | Parker | |
| 6,955,847 B1 | 10/2005 | Itou et al. | |
| 7,131,788 B2 | 11/2006 | Ianniello et al. | |
| 7,493,738 B2 * | 2/2009 | Bui | E04C 2/06 52/578 |
| 7,536,835 B2 | 5/2009 | Schlueter | |
| 7,607,270 B2 | 10/2009 | Ehrman et al. | |
| 8,647,734 B2 * | 2/2014 | Keene | B32B 5/022 428/193 |
| 8,695,300 B2 * | 4/2014 | Hartl | E04F 15/182 52/390 |
| 8,728,605 B2 * | 5/2014 | Payne | B32B 3/04 428/74 |
| 9,091,049 B2 * | 7/2015 | Walker | E04C 2/34 |
| 9,145,688 B2 * | 9/2015 | Hunt-Hansen | E04F 13/04 |
| 9,366,033 B2 | 6/2016 | Johnson | |
| 9,771,703 B1 * | 9/2017 | Golding, Jr. | B32B 5/022 |
| 10,161,129 B2 | 12/2018 | Hickie et al. | |
| 10,364,579 B2 | 7/2019 | Norwood et al. | |
| 10,676,918 B2 * | 6/2020 | Caruso | B32B 27/14 |
| 11,008,756 B2 * | 5/2021 | Krasnoff | B32B 13/12 |
| 2006/0260233 A1 | 11/2006 | Schluter | |
| 2006/0277854 A1 | 12/2006 | Egan | |
| 2007/0004306 A1 | 1/2007 | Leeser et al. | |
| 2007/0180791 A1 | 8/2007 | Amster et al. | |
| 2008/0032114 A1 * | 2/2008 | Squires | E04B 1/76 428/308.4 |
| 2008/0041005 A1 * | 2/2008 | Ehrman | E04B 1/625 52/408 |
| 2009/0029109 A1 | 1/2009 | Seth et al. | |
| 2009/0193738 A1 | 8/2009 | Kortuem et al. | |
| 2010/0107533 A1 * | 5/2010 | Stephan | E04F 13/045 52/342 |
| 2010/0233427 A1 | 9/2010 | De | |
| 2011/0197987 A1 | 8/2011 | Koravos et al. | |
| 2012/0247040 A1 * | 10/2012 | Buoni | E04F 13/047 52/302.1 |
| 2013/0089696 A1 | 4/2013 | Pargeter et al. | |
| 2013/0180203 A1 | 7/2013 | Xiangli | |
| 2014/0255100 A1 * | 9/2014 | Li, Jr. | B01D 39/1623 405/129.75 |
| 2016/0002914 A1 * | 1/2016 | Snyder | E04B 1/625 52/309.1 |
| 2017/0342709 A1 * | 11/2017 | Dahlin | E04B 1/64 |
| 2018/0320368 A1 | 11/2018 | Gonzales et al. | |
| 2019/0249419 A1 | 8/2019 | Gonzales et al. | |
| 2020/0354965 A1 * | 11/2020 | Attebery, II | E04B 1/7038 |
| 2021/0129462 A1 * | 5/2021 | Rolland | B32B 37/146 |
| 2021/0230874 A1 * | 7/2021 | Krasnoff | B32B 27/12 |
| 2021/0355687 A1 * | 11/2021 | Hascher | E04B 1/625 |

FOREIGN PATENT DOCUMENTS

| | | | | |
|---|---|---|---|---|
| CN | 112757726 A | * | 5/2021 | .............. E02D 3/10 |
| DE | 19507041 A1 | * | 9/1996 | ........... E04B 1/7069 |
| DE | 102017117375 A1 | * | 2/2019 | ............. B32B 5/022 |
| EP | 3885125 A1 | * | 9/2021 | ............. E04B 1/625 |
| WO | WO-2007026108 A1 | * | 3/2007 | ............. B32B 5/022 |
| WO | WO-2017200831 A | * | 11/2017 | ............. B32B 5/022 |
| WO | WO-2019036783 A1 | * | 2/2019 | ........... A41D 31/145 |
| WO | WO-2019074866 A1 | * | 4/2019 | ........... E04B 1/8409 |
| WO | WO-2019228734 A1 | * | 12/2019 | .............. E04F 15/18 |

OTHER PUBLICATIONS

"U.S. Appl. No. 15/971,948, Response filed Jul. 3, 2020 to Non Final Office Action dated Feb. 5, 2020", 14 pgs.

"U.S. Appl. No. 16/271,518, Restriction Requirement dated Aug. 11, 2020", 9 pgs.

"U.S. Appl. No. 16/271,518, Response filed Aug. 21, 2020 to Restriction Requirement dated Aug. 11, 2020", 13 pgs.

"U.S. Appl. No. 15/971,948, Final Office Action dated Oct. 29, 2020", 13 pgs.

"U.S. Appl. No. 16/271,518, Non Final Office Action dated Nov. 20, 2020", 12 pgs.

"U.S. Appl. No. 15/971,948, Non Final Office Action dated Feb. 5, 2020", 13 pgs.

"U.S. Appl. No. 15/971,948, Response filed Oct. 16, 2019 to Restriction Requirement dated Aug. 16, 2019", 7 pgs.

"U.S. Appl. No. 15/971,948, Restriction Requirement dated Aug. 16, 2019", 7 pgs.

"New flexible and stronger aerogel expected to open new applications for super-insulator", The American Ceramic Society, [Online], Retrieved from the Internet: <URL: http://ceramics.org/ceramic-tech-today/nasas-new-flexible-and-stronger-aerogel-expected-to-open-new-applications-for-super-insulator, (Aug. 19, 2012), 4 pgs.

"Strong and Flexible Aerogels", [Online], Retrieved from the Internet: <URL: http://www.aerogel.org/?p=1058, (Accessed Jan. 13, 2017), 22 pgs.

"U.S. Appl. No. 15/971,948, Non Final Office Action dated Oct. 5, 2021", 27 pgs.

"U.S. Appl. No. 15/971,948, Response filed Apr. 29, 2021 to Final Office Action dated Oct. 29, 2020", 19 pgs.

"U.S. Appl. No. 16/271,518, Corrected Notice of Allowability dated May 13, 2021", 2 pgs.

"U.S. Appl. No. 16/271,518, Examiner Interview Summary dated Apr. 19, 2021", 3 pgs.

(56) References Cited

OTHER PUBLICATIONS

"U.S. Appl. No. 16/271,518, Notice of Allowance dated May 5, 2021", 10 pgs.
"U.S. Appl. No. 16/271,518, Response filed Apr. 20, 2021 to Non Final Office Action dated Nov. 20, 2020", 22 pgs.
"International Application Serial No. PCT/US2021/031530, International Search Report dated Jun. 9, 2021", 3 pgs.
"International Application Serial No. PCT/US2021/031530, Written Opinion dated Jun. 9, 2021", 5 pgs.

\* cited by examiner

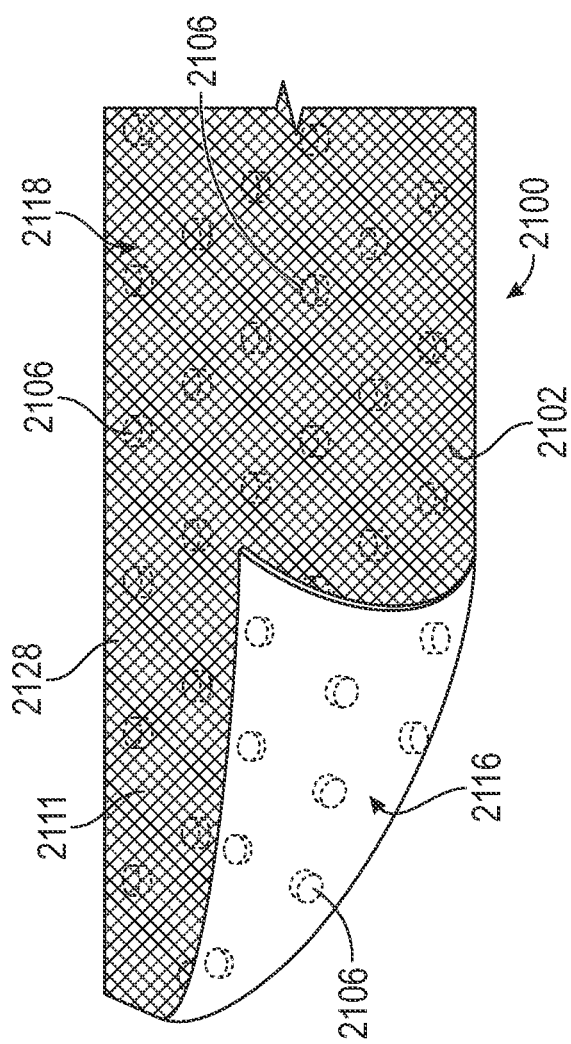
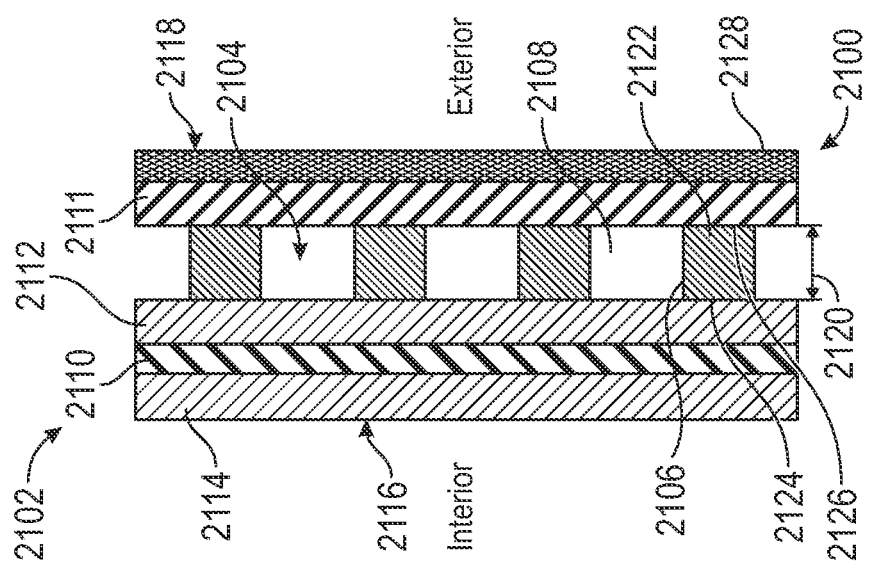
FIG. 21B
FIG. 21A

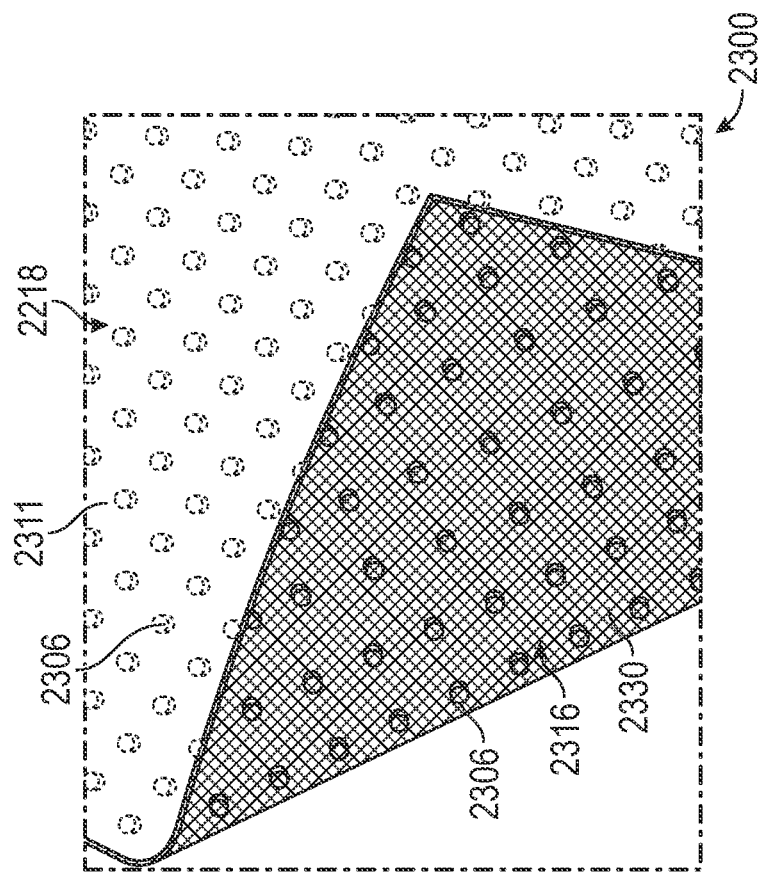
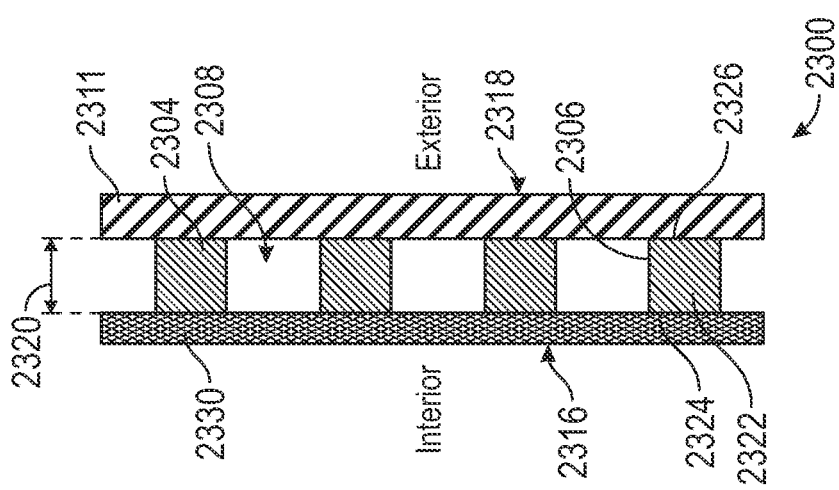
FIG. 23B
FIG. 23A

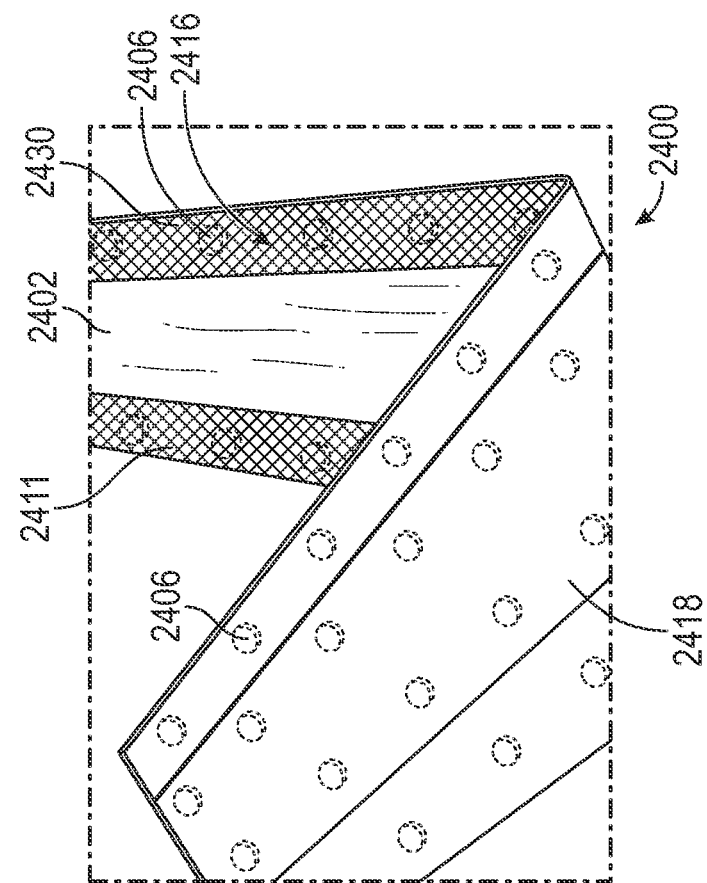
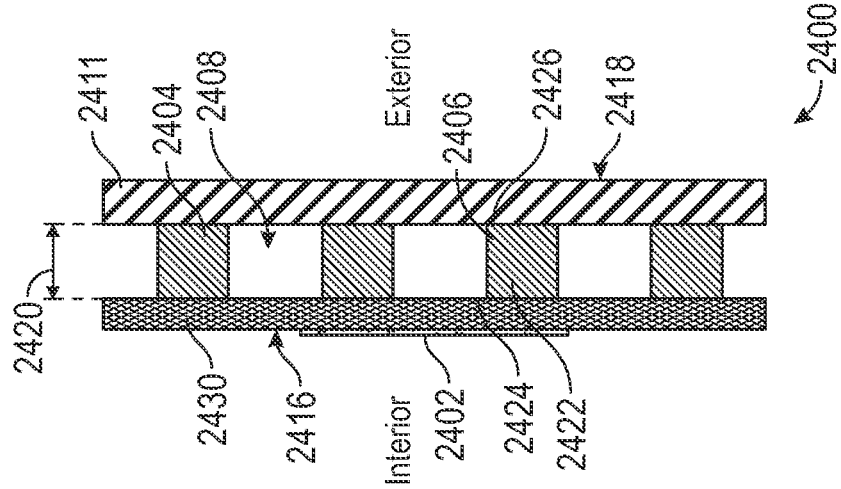
FIG. 24B
FIG. 24A

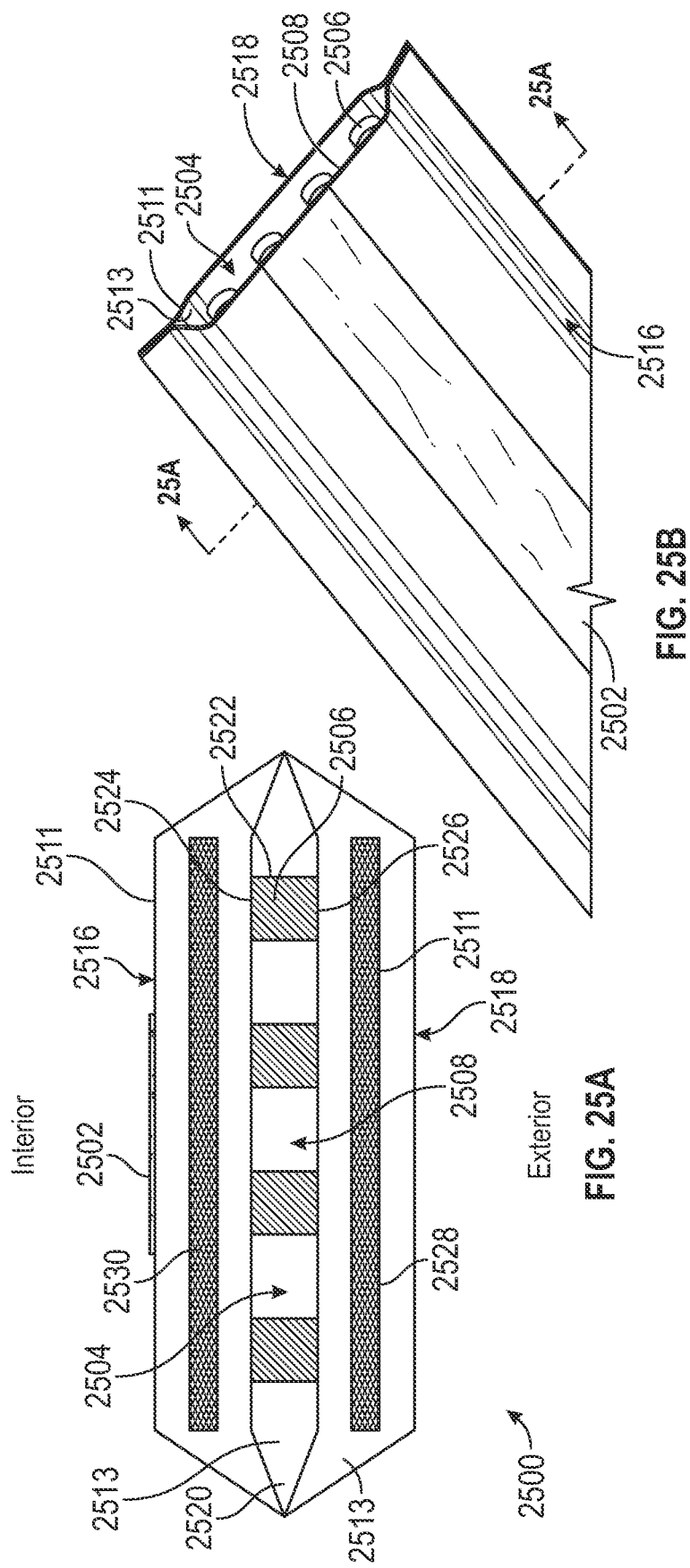

DRAINING CONSTRUCTION FRAMEWORK AND METHODS FOR SAME

CLAIM OF PRIORITY

This patent application is a continuation-in-part of and claims the benefit of priority of Gonzales et. al. U.S. Utility Model patent application Ser. No. 16/271,518, entitled "DRAINING CONSTRUCTION WRAP AND METHODS FOR SAME." filed on Feb. 8, 2019, which is hereby incorporated by reference herein in its entirety.

CROSS-REFERENCE TO RELATED PATENT DOCUMENTS

This patent application is also related to U.S. patent application Ser. No. 15/971,948, entitled "THERMAL INSULATING CONSTRUCTION WRAP AND METHODS FOR SAME." filed on May 4, 2018.

This patent application claims the benefit of priority of Lei Zhou et. al Chinese Utility Model Patent Application Number 201820240747.8, entitled "WATERPROOF AND MOISTURE PERMEABLE FABRIC WITH THREE-DIMENSIONAL STRUCTURE, PRODUCTION LINE AND WALL STRUCTURE," filed on Feb. 10, 2018, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright R. H. Tamlyn & Sons, LP; Stafford, Tex. USA. All Rights Reserved.

TECHNICAL FIELD

This document pertains generally, but not by way of limitation, to construction wraps for building applications.

BACKGROUND

When constructing buildings (e.g., homes, offices or the like) a moisture barrier is, in some examples, used on the exterior of the building. For instance, a house or construction wrap (herein a construction wrap) is applied over the plywood or other material of the building. The construction wrap encloses plywood, framing, insulation and other components of the building and minimizes water intrusion. External fascia, such as brick, stone, siding, stucco or the like, are applied over the construction wrap to provide a decorative exterior to the building (e.g., an outer wall). Water intrusion through the external fascia is intercepted by the construction wrap and diverted away from the covered components of the building.

Construction wrap, in some examples includes a pliable polymer that is wrapped around the features of the building including, but not limited to, walls, corners, fenestration openings (openings for doors or window), vent openings or the like. One example of a construction wrap is Tamlyn Wrap, a registered trademark of R. H. Tamlyn & Sons, LP.

Overview

The present inventors have recognized, among other things, that a problem to be solved includes minimizing the collection of moisture between an outer wall and a construction wrap. Construction wraps include a moisture impermeable layer. Moisture incident on the layer is diverted downwardly (e.g., by gravity). In some examples, drainage of moisture is frustrated or prevented because of engagement of the outer wall to the construction wrap. The engagement interrupts the flow of moisture along the construction wrap and traps moisture between the moisture impermeable layer and the outer wall. In other examples the construction wrap includes linear pliable ridges extending along the wrap to increase drainage based on the contour of the ridges relative to the wrap substrate. However, one or more of the ridge, moisture impermeable layer, inner wall or the like are deformable, and engagement of the outer wall (siding or the like) with the wrap deforms one or more of these features, such as the ridge, and accordingly minimizes the contour. In some examples, moisture remains trapped between the construction wrap and the outer wall and fails to drain. Further still, the engagement between the wrap and the outer wall minimizes ventilation and accordingly decreases evaporation of the trapped moisture.

In still other examples, the engagement of the outer wall to the construction wrap (plain wrap or wrap with deformable ridges) enhances capillary action between the outer wall and the construction wrap that traps and retains moisture to the locus of engagement and the surrounding area around the locus. Accordingly, even where contoured space is provided between the moisture impermeable layer and the outer wall intermittent engagement at these loci traps and retains moisture between the wrap substrate and the outer wall. Trapping of moisture increases the risk of ingress and other complications with the building including, but not limited to, water damage, mold growth, environment control, odor or the like.

The present subject matter provides a solution to these problems with a draining construction wrap including a drainage framework as a structural component of the wrap. The draining construction wrap includes a pliable moisture impermeable layer (e.g., thermoplastic polyolefins, laminates including a non-woven substrate, foils, polymer films or the like). The drainage framework extends from the pliable moisture impermeable layer and provides a braced installation surface spaced from the impermeable layer. In some examples, the drainage framework includes a plurality of support struts extending from the pliable moisture impermeable layer to strut support faces that provide the installation surface for coupling with the outer wall. The strut support faces are remote relative to the impermeable layer, and the strut bodies of the plurality of support struts are rigid compared to the impermeable layer. The support struts accordingly act as posts, pilings, columns or the like and brace the installation surface and space the surface from the impermeable layer according to a strut gap (e.g., the length of the strut bodies). Drain channels extend between the support struts to readily divert moisture to a weep hole, screen or the like.

With the drainage framework including the plurality of support struts, the installed outer wall is positioned away from the impermeable layer according to the strut gap. Engagement of the outer wall (e.g., panels, siding, masonry, stucco) to the draining construction wrap is localized to the strut support faces of the support struts and spaced from the moisture impermeable layer. Further, the support struts brace the strut support faces and the installation surface and ensure the outer wall remains spaced from the moisture impermeable layer, for instance with engagement of the outer wall to the installation surface. Accordingly, the drain channels between the support struts are maintained thereby enhancing drainage, facilitating ventilation and evaporation, and minimizing capillary action between the outer wall and the moisture impermeable layer.

The subject matter described herein provides a clearance layer, such as a drainage framework, between the inner wall and the outer wall of a structure. The drainage framework guides the flow of moisture (e.g., diverts water) and promotes ventilation. For instance, moisture condensation is collected on the surface of the waterproof and moisture permeable functional layer and is attached on the waterproof and moisture permeable fabric, and flows down the drain channels, thereby drying the layers. Additionally, ventilated air in the drain channels directs air flow between the bottom and top of the draining construction wrap to evaporate collected moisture. The elastic protrusions (e.g., support struts) form a three-dimensional structure that ensures clearance between the inner wall and the outer wall to further improve the moisture removal performance. In some examples, the elastic protrusions include elasticity (e.g., limited elasticity relative to the pliable layers) that enable the exterior wall panel and protrusions to absorb impact and vibration during construction so the exterior wall panel (especially panels made from cement) are not likely to be damaged (e.g., broken, cracked or the like) during construction including installation. Additionally, the drainage framework provided with the draining construction wraps described herein provide a rainscreen and structural support in a consolidated system, thereby facilitating construction by combining features provided previously with construction wraps, and separate spacing components (such as furring strips).

In examples, the thickness of the elastic protrusions (e.g., height) is 1 mm-20 mm or more, and the diameter of the elastic protrusions is between 1 mm-20 mm. Optionally, the elastic protrusions are distributed in one or more densities including, but not limited to, 50-800 protrusions per square meter. Additionally, the elastic protrusions include a variety of profiles (e.g., strut profiles) including, but not limited to, spherical, semi-spherical, cylindrical shapes or the like.

The draining construction wraps described herein, are optionally constructed in one or more methods. For example, the elastic protrusions are formed through one or more of foaming formation on the surface of the waterproof and moisture permeable fabric (permeable or impermeable layers) or with injection molding formation on the surface. In other examples the elastic protrusions are bonded with at least one of the layers with methods including, but not limited to, hot cutting, hot stamping, thermal radiation heating, laser welding, sonic heating or the like.

The draining construction wraps described herein, in some examples, include composite layers having two or more layers including nonwoven (permeable) component layers and moisture impermeable layers. In an example, the composite layers are constructed as a waterproof and moisture permeable fabric structure with a hot pressing process during production. The nonwoven fabric is pressed while heated onto both sides of a waterproof (moisture impermeable) and gas permeable film (a moisture impermeable component layer that is moisture impermeable and gas or vapor permeable as described herein) such as PE or TPU. The elastic protrusions are then coupled with the surface of the composite layer. For instance, the elastic protrusions are coupled with hot stamping to minimize burning or damage to the waterproof and moisture permeable fabric (e.g., composite moisture impermeable layer) during hot stamping. In one example, the thickness for the nonwoven fabrics attached to the two sides of PE or TPU are different to facilitate damage free coupling. For instance, the nonwoven component layer used on the exterior (support strut) side of the draining construction wrap is thick (e.g., 5 mm) relative to the inner nonwoven component layer (e.g., less than 5 mm) to isolate the moisture impermeable component layer from the bonding heat while minimizing the overall thickness of the draining construction wrap.

In another example, foamed polymers for the elastic protrusions (e.g., support struts) are applied through direct extruding onto the waterproof and moisture permeable fabric. The foamed polymer as the elastic protrusions, once extruded, is cooled with the pliable moisture impermeable layer (or permeable layer if the base layer or an overlying layer) to set the protrusions on the one or more layers.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 21A is schematic cross sectional view of another example of a draining construction structure including a lath membrane.

FIG. 21B is a perspective view of the draining construction structure of FIG. 21A partially reversed to show exterior and interior surfaces.

FIG. 23A is schematic cross sectional view of a supplemental example of a draining construction structure including a lath membrane.

FIG. 23B is a perspective view of the draining construction structure of FIG. 23A partially reversed to show exterior and interior surfaces.

FIG. 24A is schematic cross sectional view of an another example of a draining construction structure including a furring strip.

FIG. 24B is a perspective view of the draining construction structure of FIG. 24A partially reversed to show exterior and interior surfaces.

FIG. 25A is schematic cross sectional view of an additional example of a draining construction structure including a furring strip.

FIG. 25B is a perspective view of the draining construction structure of FIG. 25A partially reversed to show exterior and interior surfaces.

DETAILED DESCRIPTION

Figure 1:
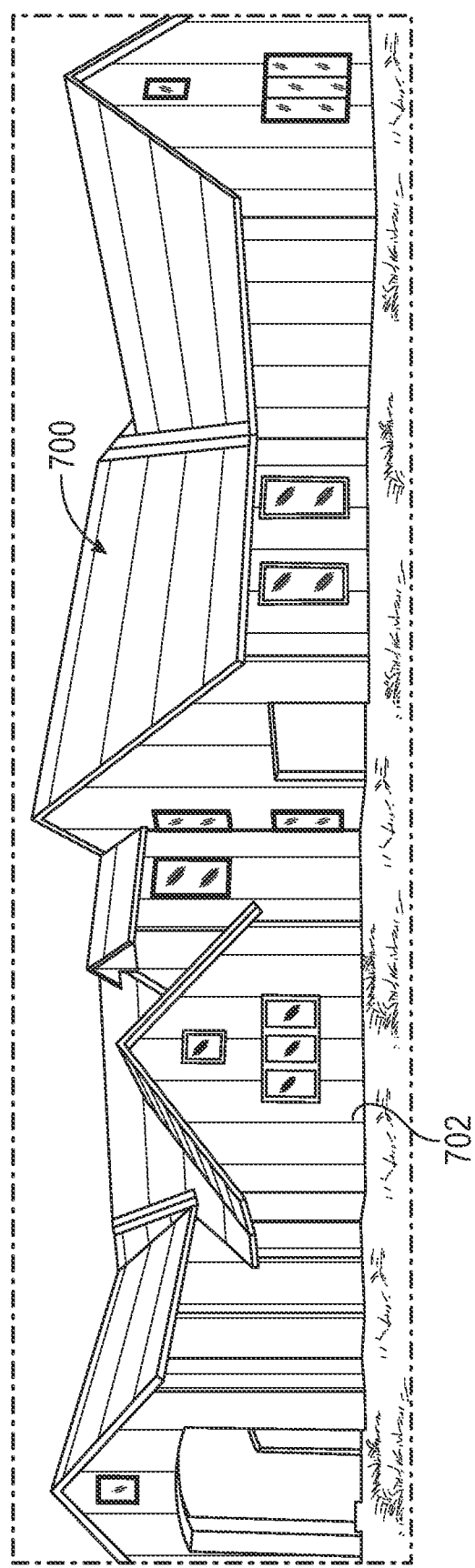
FIG. 1 is a perspective view of a building enveloped with a draining construction structure.

FIG. 1 is a perspective view of a building 700 enveloped with one example of a draining construction wrap 702. The draining construction wrap encloses the building 700 (e.g., a single family residential home, multi-family residential unit, municipal building, office building or the like) from the surrounding environment, for instance, from one or more of natural elements including, but not limited to, moisture, heat, cold or the like. In one example, the draining construction wrap provides a moisture impermeable feature such as a membrane, layer or the like configured to prevent the ingress of moisture from the exterior to the interior of the building, for instance, along and into one or more of plywood sheeting, studs, insulation or other components on the interior of the building 700. The draining construction wrap, in another example, includes one or more features such as a drainage framework further described herein configured to facilitate the collection and diversion of moisture, for instance, passing through an outer wall including, but not limited to, one or more of stucco, mortar and stone, brickwork, shingles, siding, panels or the like toward the interior of the home. Further, the outer wall includes, but is not limited to, one or more of aluminum composite panels, brass, brick, bronze, ceramic, composite materials, copper, fiber cement panels, glass, masonry panels, metal, plastic laminate panels, porcelain, polyvinyl chloride (PVC), recycled polystyrene, rubber, stainless steel, stone, tile, vinyl, wood or the like. The draining construction wrap 702 intercepts moisture (water vapor, liquid water or the like) and collects the water within one or more drain channels. The drainage framework includes one or more struts or the like configured to brace an installation surface and accordingly maintain drain channels in a specified configuration (e.g., for instance, without occlusions, constriction of drain channels, closing of drain channels or the like).

The permeable character of one or more components of the structures (e.g., wraps, panels or the like) described herein are provided in a relative convention. For instance, permeable layers, sheets, materials or the like are generally understood as allowing some amount of moisture penetration or ingress whether in the form of liquids or vapors. Example permeable layers include, but are not limited to, fabrics, nonwoven materials, lath membranes, porous sheets or membranes or the like. Impermeable layers include materials that are resistant to moisture penetration or ingress in the form of liquids or vapors up to and including waterproof materials that are intended to prevent the passage of moisture. Impermeable layers include, but are not limited to, sheets, panels or the like including polymers; films: coatings; treated (otherwise permeable) materials such as panels, fabrics, nonwoven materials or the like; that minimize (e.g., reduce or eliminate) the passage of moisture in one or more of liquid or vapor forms. In some examples herein, permeability and impermeability are optionally relative to each other based on varied materials used in different components. For example, a draining construction structure, such as a wrap or panel, includes an impermeable layer and the impermeable layer may permit the passage of some amount of moisture but is more resistant to the passage of moisture than a permeable layer of the wrap or panel. Conversely, the permeable layer is less resistant to moisture passage and permits the penetration of moisture more readily than the impermeable layer.

In another example, permeability is conveyed in a convention used in the building industry premised on a unit of moisture vapor permeability called "permeance" (otherwise referred to as perms) that reflects the overall vapor permeability of an assembly of layers. A Building Science Corporation website (https://www.buildingscience.com/documents/information-sheets/info-312-vapor-permeance-some-materials) discusses permeance, and is paraphrased herein below.

The vapor permeance characteristic of a sheathing and cladding assembly is indicated by the effective wet cup permeance of both the cladding and sheathing combined. Four categories are established:

Vapor impermeable: 0.1 perm or less

Vapor semi-impermeable: 1.0 perm or less and greater than 0.1 perm

Vapor semi-permeable: 10 perms or less and greater than 1.0 perm

Vapor permeable: greater than 10 perms

For example, an assembly using a foil-faced isocyanurate rigid insulation is classed as vapor impermeable regardless of the cladding type installed external to the foil-faced isocyanurate. OSB sheathing and plywood sheathing covered with a building paper or housewrap and vinyl siding are classed as vapor semi-permeable. However, when the vinyl siding is replaced with a three-coat hard-coat stucco the combined wet cup permeance of both stucco, building paper and OSB (or plywood) sheathing is below 1.0 perm and therefore, this assembly is classed as vapor semi-impermeable. The application of the stucco in this manner clearly affects the drying characteristics of the wall; the stucco is relatively "airtight" whereas the vinyl siding is "air leaky." If, instead of being installed directly over building paper or housewrap, the traditional three-coat hard-coat stucco is "back vented" (i.e., installed over an airspace), the assembly is once again classed as vapor semi-permeable.

Permeance as used in the above description indicates an overall permeability of an assembly of varying layers, such as a cladding and sheathing. As noted in the various examples by including a more permeable layer for a relatively less permeable layer the overall perms (vapor permeability) are increased, for instance toward vapor permeability. Conversely, including a less permeable layer for a relatively more permeable layer decreases the overall perms and vapor permeability is decreased, for instance toward vapor impermeability.

In one example, the draining construction wrap 702 is coupled to the building 700 (e.g., installed over, around or the like). The draining construction wrap 702 is coupled to an exterior surface of the building 700 including, but not limited to, wall panels, roof panels or the like. The draining construction wrap pliably conforms to the contours and shapes of the building 700. For instance, the draining construction wrap is adapted to pliably conform around corners, bends, fenestration openings (e.g., proximate windows and doors of the building 700) while maintaining the moisture resistance of the draining construction wrap 702.

Figure 2B:
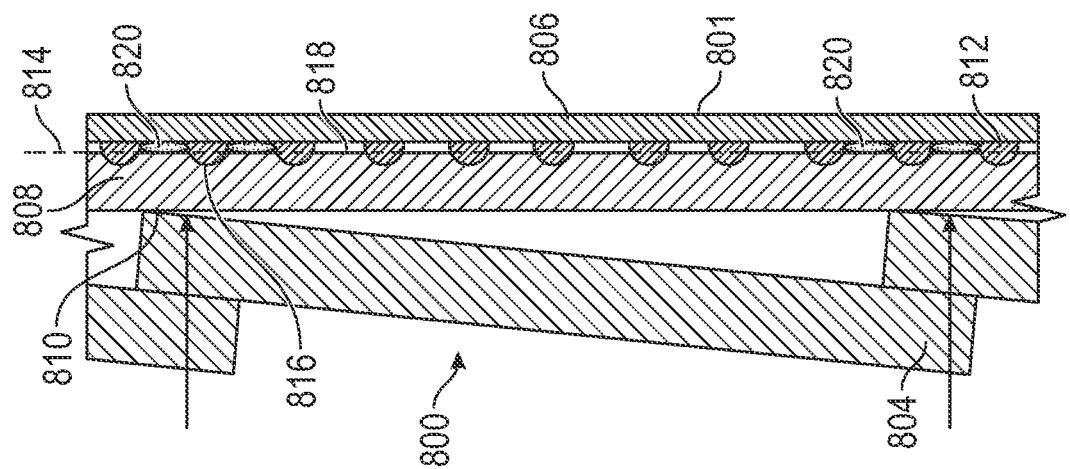
FIG. 2B is a cross sectional view of an assembly of an inner wall and an outer wall with another example of a construction wrap therebetween.
Figure 2A:
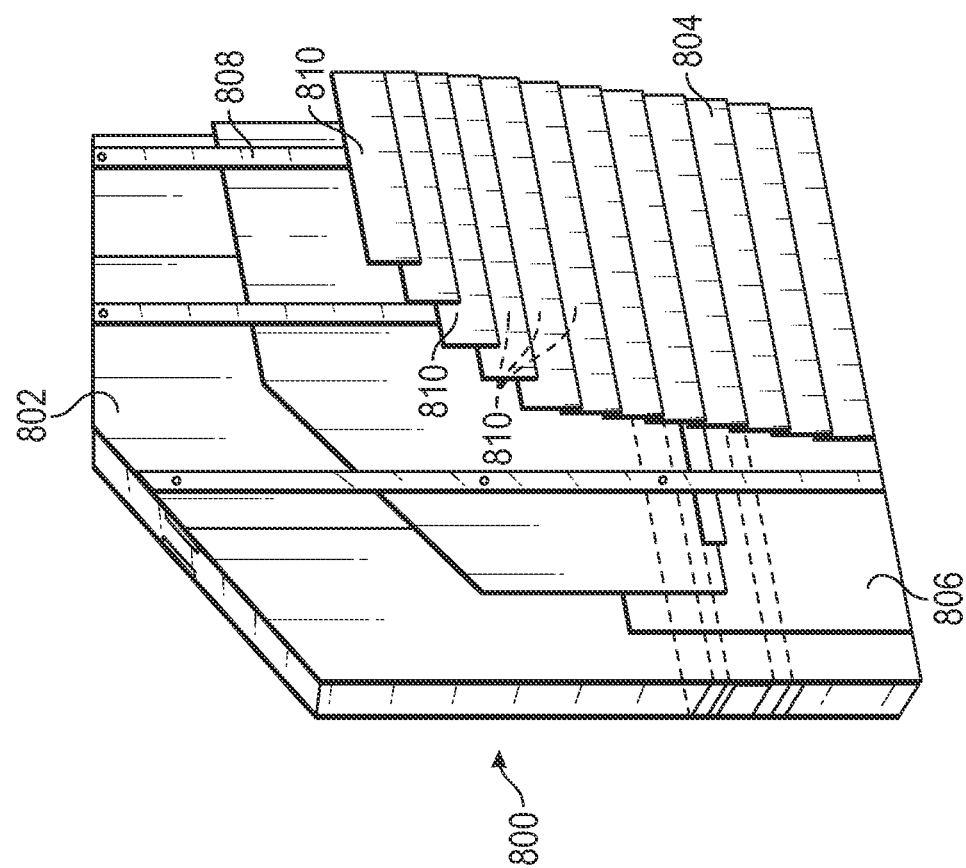
FIG. 2A is a sectional view of an assembly of an inner wall and an outer wall with a construction wrap therebetween.

FIG. 2A shows an example of a sectional view of a wall assembly 800. As shown, the wall assembly 800 provides an exterior to interior view including, for instance, an outer wall 804 and an inner wall 802. In one example, the outer wall 804 includes one or more of siding, panels, shingles, stucco, brick, stone and corresponding mortar provided over the inner wall 802. In the example shown in FIG. 2A, the outer wall 804 includes a plurality of siding panels positioned over the inner wall 802 and coupled thereto. In other examples, furring strips or other components are fastened along the inner wall 802 to facilitate installation of the outer wall 804.

As further shown in FIG. 2A, the inner wall 802 includes a construction wrap 806 applied thereon. The construction wrap 806, in one example, provides moisture resistance to prevent or minimize the ingress of moisture into the interior portions of the building, for instance, into and beyond the inner wall 802. As further shown in the example provided in FIG. 2A, one or more furring strips 808 are provided in an interposing fashion between the construction wrap 806 and the outer wall 804. In one example, the furring strips 808 provide gaps between the outer wall 804 and the construction wrap 806 and the inner wall 802 to facilitate ventilation and drainage of water on the construction wrap 806. The furring strips 808 are, in one example, driven through and fastened to the inner wall 802 with one or more fasteners including, but not limited to, screws, tacks, nails or the like. The outer wall 804 is coupled over the furring strips 808, for instance, with fitting in channels and laying up against the furring strips 808 while indirectly engaging against the inner wall 802 and the construction wrap 806. As described herein, the engagement of the outer wall 804, for instance, at one or more intersections of siding panels or the like creates a locus of engagement 810 with the inner wall 802, for instance along the furring strips 808 and the corresponding portions of the construction wrap 806. As shown in additional views provided herein, the locus of engagement 810 is, in one example, plural loci of engagement 810 corresponding to the interfacing between one or more of a plurality of panels or furring strips 808 and the construction wrap 806. As described herein, the loci of engagement 810, in one example, compress the construction wrap 806 and other features associated with the construction wrap 806 facilitates the retention of moisture and frustrates ventilation. In some examples retention of moisture along the construction wrap 806 facilitates the ingress of the into the inner wall 802 and the interior portions of the building.

FIG. 2B shows a detailed sectional view of one example of a construction wrap 806 provided in a wall assembly 800 similar to the wall assembly 800 previously shown in FIG. 2A. In this example, the construction wrap 806 includes one or more pliable ridges 812 including, for instance, silicone, butyl rubber or the like provided in an elongate fashion along the construction wrap 806. In one example, the pliable ridges 812 are configured to facilitate the drainage of moisture along the construction wrap 806.

As further shown in FIG. 2B, the wall assembly 800 includes the outer wall 804 including a plurality of wall panels engaged in a staggered inter fitting configuration. Where the panels intersect at the locus of engagement 810, a force is applied to the furring strips 808 and correspondingly applied to the pliable ridges 812 (see the directional arrows in FIG. 2B). Additionally, the furring strips 808, as previously described, are driven into and fastened to the inner wall 802. The fastening of the furring strips 808 to the inner wall 802 as well as pressure applied by the outer wall 804, for instance, at one or more loci of engagement 810 compresses the pliable ridges 812. As shown in FIG. 2B, the pliable ridges 812 include ridge apexes 816, for instance, along an upper surface or distal surface of the pliable ridges 812. Forces applied to the pliable ridges by the fastened furring strips 808 or engagement by the outer wall 804 compress the pliable ridges 812 thereby forming a deformation line 814 recessed relative to the specified height for the ridge apexes 816. The deformation line 814 shown, for instance, by a broken line in FIG. 2B indicates the deformation of the pliable ridges 812 and accordingly shows the position of the furring strips 808 in close proximity to the remainder of the construction wrap 806 including, for instance, a moisture impermeable membrane 801. The deformation of the pliable ridges 812 creates one or more pockets between the furring strip 808 and the construction wrap 806 to facilitate the trapping and retention of moisture there along. For instance, as shown in FIG. 2B, trapped moisture 820 is localized, in this example, between the pliable ridges 812 adjacent to one or more of the loci of engagement 810. The deformation of the pliable ridges 812, for instance, to the deformation line 814 provides one or more pockets, recesses or the like that trap moisture.

Additionally, one or more of capillary action, constricted passages such as drainage channels provided between the pliable ridges 812 retains moisture therein and minimizes exposure of the moisture, for instance, to ventilated air passing between the furring strips 808. Accordingly, the moisture, in one example, is retained along the furring strips 808 and between the furring strips 808 and the construction wrap 806. In some examples, trapped moisture 820 is subject to one or more of long term retention, heating and cooling at the loci of engagement 810. Additionally, the trapped moisture 820 is proximate to perforation in the construction wrap 806, for instance from nails, staples or tacks. Accordingly, the trapped moisture 820, in other examples, is subject to one or more of mold, eventual ingress into the building or the like.

In another example, the deformation line 814 corresponding to the deformed pliable ridges 812 forms one or more constricted passages 818 between the pliable ridges 812, the construction wrap 806 and the furring strips 808. As previously described, the constricted passages 818 are, in one example, a constricted channel between the pliable ridges 812 that positions the furring strips 808 in close proximity to the remainder of the construction wrap 806. The constricted passages 818 thereby readily retain trapped moisture 820 therein. In one example, the constricted passages 818 are not localized to the loci of engagement 810 and are instead provided along the length of the construction wrap 806 as shown. The constricted passages 818 accordingly facilitate the trapping of moisture in a manner similar to the trapped moisture 820 along the length of the furring strips 808, for instance, between each of the pliable ridges 812.

Figure 3A:
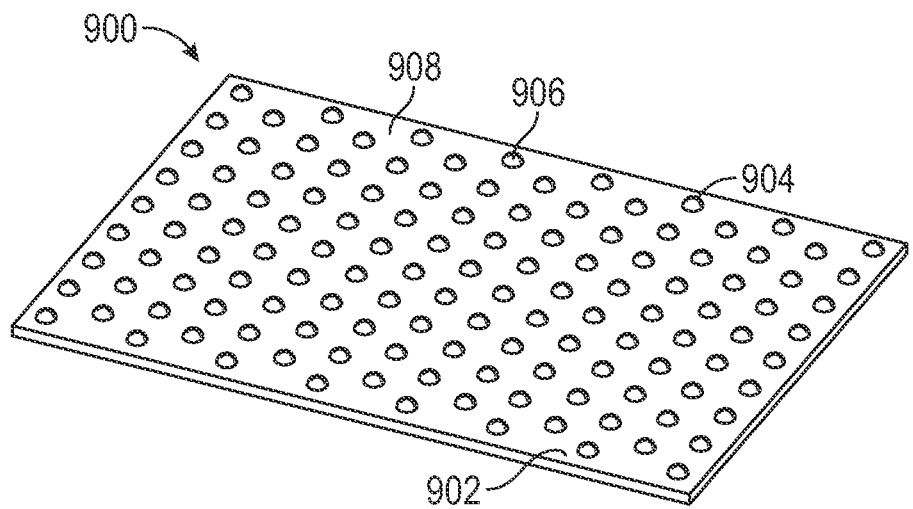
FIG. 3A is a perspective view of one example of a draining construction structure including a drainage framework.
Figure 3B:
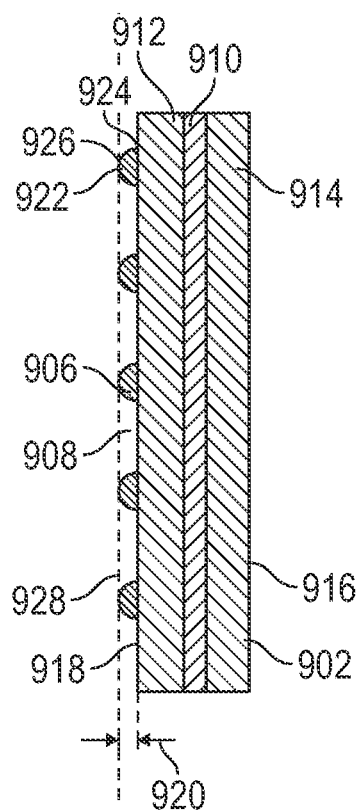
FIG. 3B is a sectional view of the draining construction structure of FIG. 3A.

FIGS. 3A and 3B show one example of a draining construction wrap 900 including a drainage framework 904 that provides drain promoting features with a structurally braced installation surface. Referring first to FIG. 3A, the draining construction wrap 900 includes a pliable moisture impermeable layer 902, for instance, as a backing or substrate for the drainage framework 904. In one example, the pliable moisture impermeable layer 902 includes one or more component layers as a composite or laminate configured to provide one or more of moisture impermeability, pliability or the like. Optionally, the pliable moisture impermeable layer 902 includes a single layer, for instance, a single layer providing moisture impermeability from the exterior to the interior of the layer 902. In the example shown in FIG. 3B, the layer 902 includes component layers such as a moisture impermeable component layer 910 between a nonwoven component layers 912, 914. In still another example, the moisture impermeable component layer 910 is included with another component layer such as one or more of the nonwoven component layers 912, 914. Optionally, the moisture impermeable layer 902 is moisture impermeable while being gas permeable, for instance to facilitate gas passage and water vapor passage from the interior to the exterior for drying.

Optionally, the nonwoven component layers 912, 914 include one or more of filaments, threading or the like, arranged in a nonwoven matted configuration that provides interstitial spaces configured to receive and coupled with one or more of the support struts 906 shown in FIGS. 3A and 3B. For example, the nonwoven layers 912, 914 coupled with a base strut portion 924 of the struts 906 while the portions 924 are at a glass transition temperature, melting temperature or the like. The material of the base strut portions 924 impregnates or penetrates the nonwoven layers 912 and (when set) bonds the struts 906 to the nonwoven component layer. In still other examples, the base strut portions 924 are coupled with the pliable moisture impermeable layer 902 with adhesives, welds or the like.

Referring again to FIG. 3A, the drainage framework 904 includes a plurality of support struts 906. The support struts 906 in the example shown in FIG. 3A have an upstanding configuration in the manner of a post, peg, projection, boss, or the like (e.g., collectively, strut profiles) extending from the pliable moisture impermeable layer 902 in an outward fashion. Drain channels 908 are provided between each of the support struts 906 to provide unobstructed channels for moisture and ventilation across the pliable moisture impermeable layer 902. In contrast to the construction wrap 806 shown, for instance, in FIG. 2B, the example support struts 906 are provided as discrete components extending from the pliable moisture impermeable layer 902. The pliable ridges 812 shown in FIG. 2B, in one example, extend into and out of the page and accordingly provide elongate lines along the construction wrap 806. As previously described, with deformation of the pliable ridges 812 constricted passages 818 or the like are provided along the construction wrap 806 and accordingly trap moisture there along, minimize ventilation or the like.

Referring again to FIG. 3A, the drainage framework 904, including the support struts 906 and the intervening drain channels 908, provides consistent unobstructed diversion of moisture, for instance, when installed in a vertical or angled configuration such as that shown in FIG. 3B. The support struts 906 are, in one example, constructed with materials such as polymers, foam polymers or the like having a higher Young's modulus relative to the moisture impermeable layer 902. Because the support struts 906 are discrete components, the pliable moisture impermeable layer 902, even with the support struts 906, is configured to readily comply, conform or the like relative to one or more of contours, shapes or the like provided with the building 700. Additionally, the support struts 906 extend from the pliable moisture impermeable layer 902 and are structural components that provide a braced installation surface for the installation of one or more components, such as the outer wall 804 shown in FIG. 2A. As will be described herein, the support struts 906 have a greater rigidity (for instance, greater than butyl rubber or the like) that ensures that engagement with the support struts 906 with one or more of a furring strip, outer wall panels or the like, minimizes deformation of the support struts 906 and accordingly maintains drain channels 908 in an open configuration (e.g., with minimal or no constrictions). Additionally, the drain channels 908 are bounded, in one example, by the bodies of the support struts 906 as well as the pliable moisture impermeable layer 902. Accordingly, intervening components, for instance, of the elongate pliable ridges 812 extending in and out of the page in FIG. 2B are absent in the draining construction wrap 900 of FIGS. 3A, B. Accordingly, the drain channels 908 remain open because of the gaps between the support struts 906 even with deformation of the struts 906, for instance during shock loading with installation of furring strips, outer wall components or the like.

Referring now to FIG. 3B, the draining construction wrap 900 shown in FIG. 3A is shown in a detailed sectional view. As shown, the moisture impermeable component layer 910 is, in this example, sandwiched between the nonwoven component layers 912, 914. The plurality of support struts 906 extend from the nonwoven component layer 912, in this example. In another example, the plurality of support struts 906 extend from other layers, for instance, the moisture impermeable component layer 910.

Referring again to FIG. 3B, as previously discussed, the plurality of support struts 906 extend from an exterior surface 918 of the pliable moisture impermeable layer 902. The support struts 906 include a support body 922 extending from a base strut portion 924 coupled along the pliable moisture impermeable layer 902 to a strut support face 926. In one example, the strut bodies 922 of the plurality of support struts 906 brace the strut support faces 926 at a specified position, for instance, corresponding to a strut gap 920 between the strut support faces 926 and the nonwoven component layer 912 or other exterior surface 918 of the pliable moisture impermeable layer 902. The strut bodies 922 provide a structural component between the pliable moisture impermeable layer 902 that positions the strut support faces 926 at a specified position with minimal deformation (as described herein, to absorb shock loading in examples).

The strut bodies 922 of the support struts 906 statically position the strut support faces 926 in a flush configuration, for instance, corresponding to the installation surface 928 shown in dashed line extending across each of the strut support faces 926. The strut support faces 926 accordingly provide the installation surface 928 in a substantially planar configuration for installation of one or more components of the outer wall including, but not limited to, furring strips, outer wall panels, mortar, stucco or the like. In another example, the installation surface 928 provides a virtual installation surface including each of the strut support faces 926 to facilitate installation of one or more components of the outer wall while maintaining the drain channels 908 between the support struts 906. As shown in FIG. 3B, the strut gap 920 extending from the strut support faces 926 to the exterior surface 918 is substantially static and accordingly the installation surface 928 is substantially static to facilitate the installation of the outer wall along the structurally supported installation surface 928 in a specified orientation (e.g., vertically and without bowing, warping or the like).

As previously described herein, the drainage framework 904 including the support struts 906 is a structural component that provides a braced installation surface 928 for outer wall components while maintaining the drain channels 908 in a restriction free (including constriction free) configuration. In one example, the support struts 906 are structural components that also permit limited deformation to absorb shock loading that otherwise causes damage to the outer wall components or components of a wall assembly. For instance, during installation of one or more of furring strips, outer wall components such as shingles, siding, panels, brick and mortar or the like shock loads are transmitted to the draining construction wrap 900, the inner wall 802 and any components coupled there along. In some examples, shock loads if not absorbed cause damage to components including brittle components, such as brick, stone, siding panels or the like. Optionally, porous cells (e.g., filled with ambient air) in foam or reticulated support struts 906 facilitate limited deformation of the struts during installation, and accordingly absorb forces that otherwise damage the outer wall (e.g., including brittle cement panels or the like).

As previously described herein, in some examples, the support struts 906, while having a greater rigidity than the pliable moisture impermeable layer 902, allow for some amount of deformation, for instance, during installation of one or more of wall components, such as furring strips, brick and mortar, stone, vinyl siding, shingles, panels or the like.

In one example, the plurality of support struts 906 are configured to provide a limited amount of deformation during shock loading to facilitate the coupling of one or more of these features without damaging the brittle or sensitive components. The deformation of the support struts 906 cushions the shock loading of these components and accordingly facilitates the installation of these components without damage (e.g., compressive cracking, fracture or the like). Instead, the support struts 906 that brace the installation surface 928 also deformably support the outer wall components during installation. The support struts 906 intimately couple with the outer wall components, and bias back into their original configuration, for instance, that shown in FIG. 3B, having the braced installation surface 928 and consistent drain channels 908.

Figure 4A:
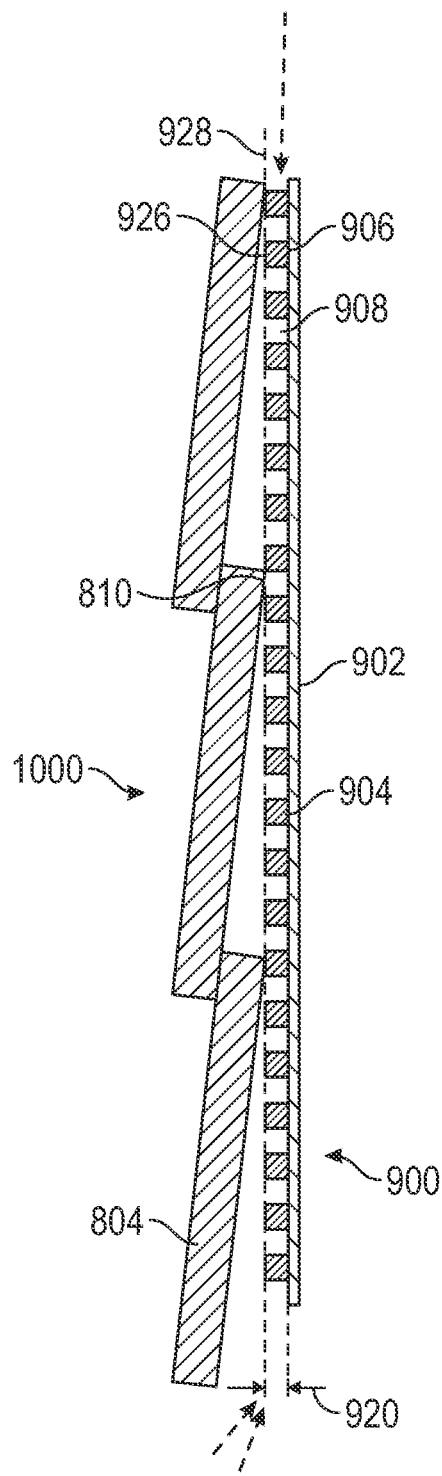
FIG. 4A is a cross sectional view of the draining construction structure of FIGS. 3A and 3B installed between an inner wall and an outer wall.
Figure 4B:
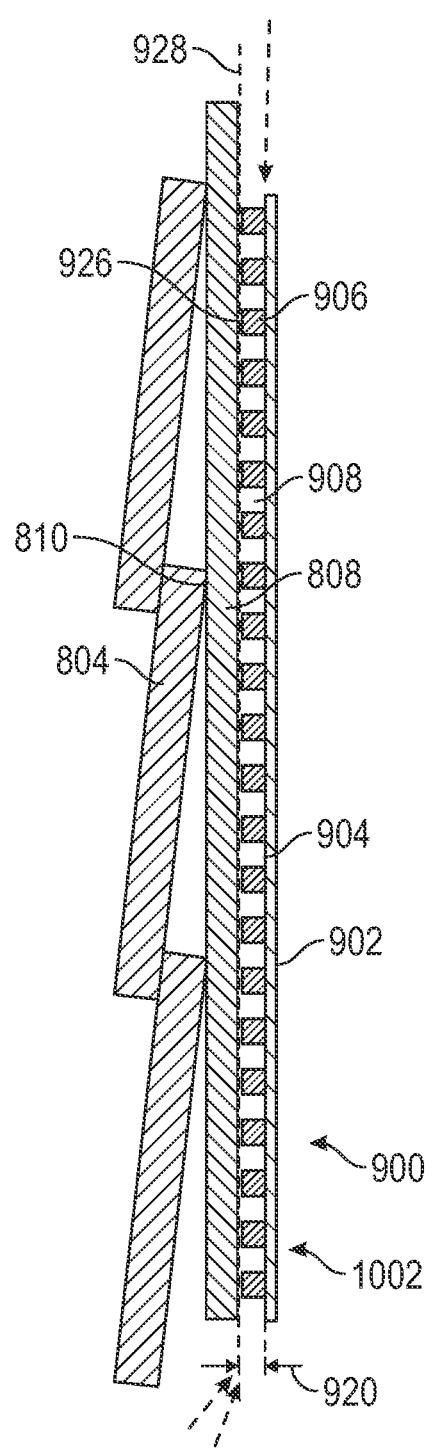
FIG. 4B is a cross sectional view of the draining construction structure of FIGS. 3A and 3B installed between an inner wall and an outer wall with a furring strip.

FIGS. 4A and 4B show examples of wall assemblies 1000, 1002, respectively, including outer walls 804, with the draining construction wrap 900 previously described and shown, for instance, in FIGS. 3A, 3B. Referring first to FIG. 4A, the draining construction wrap 900 is shown in an installed configuration engaged directly with the outer wall 804, for instance, in this example, a plurality of siding pieces or panels including one or more of cement siding. In the example shown in FIG. 4A, the draining construction wrap 900 includes a plurality of support struts 906 extending to strut support faces 926. The strut support faces 926, in turn, are part of the installation surface 928, for instance, a substantially planar installation surface to facilitate the coupling of one or more of the outer wall components 804 along the inner wall (802 as shown in FIG. 2A). The installation surface 928 provides a planar contour, and ensures the outer wall 804 coupled there along has a specified appearance (e.g., planar and without bowing, depressions or the like).

As shown, the drainage framework 904 includes the plurality of support struts 906 and the drain channels 908 therebetween. The support struts 906 brace the installation surface 928, for instance, at the specified position relative to the pliable moisture impermeable layer 902 corresponding to the strut gap 920. The drain channels 908 of the drainage framework 904 are maintained between the support struts 906 without constriction or appreciable deformation of the support struts 906 (e.g., while optionally allowing limited deformation as described herein). Additionally, as shown in FIG. 4A, one or more of loci of engagement 810, for instance, at the interfaces between component panels of the outer wall 804, do not significantly compress the support struts 906, and accordingly the drain channels 908 are maintained in an open configuration and are bounded by the support struts 906 and the pliable moisture impermeable layer 902 coupled with the support struts 906. Accordingly, pliable ridges or other components of other construction wraps do not interrupt, constrict or otherwise retain moisture at the loci of engagement 810. Instead, moisture is readily diverted through the support struts 906, for instance, along the drain channels 908 in a downward direction by gravity (shown with the downward dashed arrow in FIG. 4A). Additionally. (as shown with the upward turned dashed arrows in FIG. 4A), ventilation is facilitated through the wall assembly 1000, for instance, between the support struts 906 and along the drain channels 908 because of the maintenance of the drain channels 908 through the support struts 906. Accordingly, even with forces such as engagement forces, weight, moment or the like applied at the loci of engagement 410 by the outer wall 804 (including one or more of cement panels, metal panels, glass or the like), the drain channels 908 are maintained without restriction thereby facilitating the drainage and ventilation along the draining construction wrap 900.

FIG. 4B shows another example of a wall assembly 1002 including the outer wall 804 coupled along the draining construction wrap 900. In this example, a plurality of furring strips 808 are coupled along the pliable moisture impermeable layer 902 and interposed between the layer 902 and the outer wall 804. In this configuration, the loci of engagement 810, in one example, corresponds to the interface between one or more of the component panels of the outer wall 804. As shown, the furring strips 808 are installed along the installation surface 928 and the drain channels 908 are maintained between the outer wall 804 and the pliable moisture impermeable layer 902. As previously described, the support struts 906 brace the strut support faces 926 and the corresponding installation surface 928 at a position corresponding to the strut gap 920. Deformation of the support struts 906 is, in most examples, limited to deformation of the support struts during installation of the furring strips, for instance, by way of driving of nails, fasteners or the like and corresponding shock loading of the support struts 906. The deformation of the support struts 906 cushions the installation of each of the outer wall 804 and the furring strips 808 and accordingly minimizes any damage to either of the furring strips 808 or the outer wall components, such as brittle components. Localized deformation of the support struts 906 restored after installation, and the support struts 906 assume a near previous configuration spacing the installation surface 928 by the strut gap 920. Ventilation and draining are shown, in one example in FIG. 4B, with the dashed arrows at the top and bottom of the wall assembly 1002, respectively.

The draining construction wrap 900 shown in FIGS. 4A, 4B is in one example applied on site to a building, such as building 700. In another example, the draining construction wrap 900 is applied as a component of a prefabricated component, such as a wall panel. For instance, the draining construction wrap 900 is bonded with prefabricated boards, panels or the like at a factory, manufacturing location, job site or the like prior to installation. For instance, the draining construction wraps described herein are laminated, adhered, welded, fastened or the like to oriented strand board (OSB), plywood, fiberboard, foam board or the like. In still other examples, the draining construction wrap 900 described herein is applied to the building 700 after assembly of the panels (e.g., the draining construction wrap is unrolled along the building 700) and fastened or adhered in place.

Figure 5A:
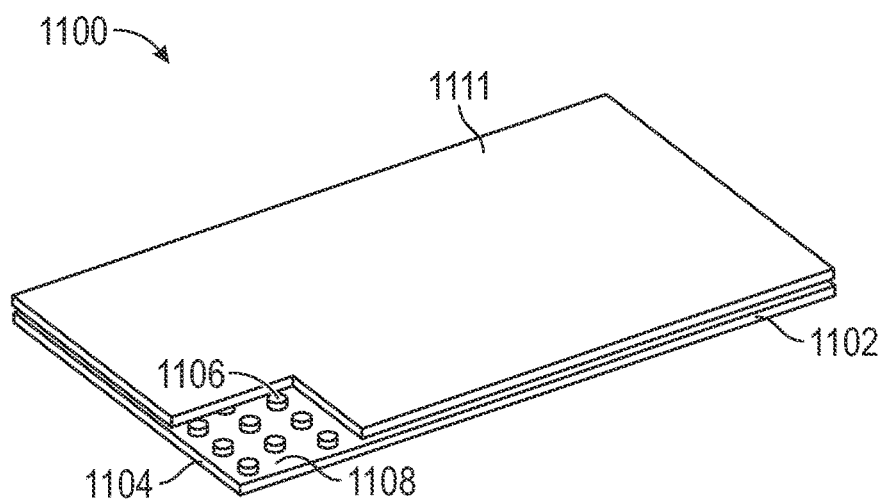
FIG. 5A is a perspective view of another example of a draining construction structure including a drainage framework.

FIG. 5A shows another example of a draining construction wrap 1100. In the example shown, the draining construction wrap 1100 includes a drainage framework 1104 coupled with a pliable moisture impermeable layer 1102. As previously described, the pliable moisture impermeable layer 1102, in some examples, is a single layer and, in other examples, includes one or more component layers, for instance, a composite, laminate or the like.

As further shown in FIG. 5A, the draining construction wrap 1100, in this example, includes a pliable moisture permeable layer 1111, for instance, a porous nonwoven layer or the like coupled with the drainage framework 1104. In one example, the pliable moisture permeable layer 1111 cooperates with the support struts 1106 of the drainage framework 1104 to provide a continuous installation surface 1128 (see FIG. 5B) along each of the support struts 1106 and between the struts 1106 with the pliable moisture permeable layer 1111. In some examples, the pliable moisture permeable layer 1111 is used with outer wall components including, but not limited to, one or more of stucco, mortar or the like. The stucco or mortar, when applied in a liquid configuration, partially penetrates or impregnates the pliable moisture permeable layer 1111 and provides an intimate engagement and coupling between the outer wall and the draining construction wrap 1100 without infiltrating the drain channels 1108 between the support struts 1106. Additionally, in operation, the pliable moisture permeable layer 1111 facilitates the ingress of moisture, for instance, to the drain channels 1108 between the support struts 1106 to facilitate drainage and ventilation along the drainage framework 1104.

Referring again to FIG. 5A, as previously described, the drainage framework 1104 includes the support struts 1106 as well as the drain channels 1108 therebetween. In a manner similar to the draining construction wrap 900 previously described herein, the support struts 1106 have a greater rigidity than the corresponding rigidity of the pliable moisture impermeable layer 1102. Accordingly, the pliable moisture impermeable layer 1102 provides a flexible substrate for the support struts 1106. The support struts 1106 are discrete components from one another, and the layer 1102 readily deflects and conforms to the contours of a building while providing the bracing support struts thereon.

Figure 5B:
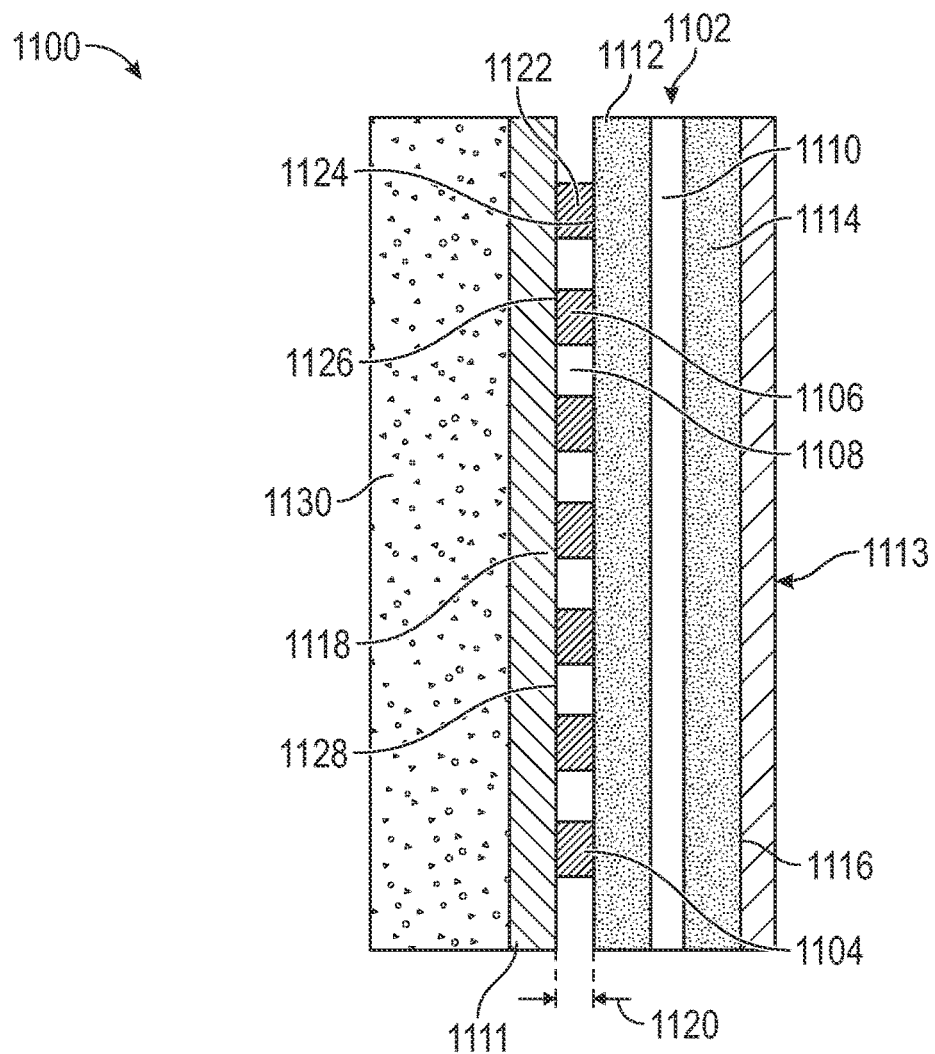
FIG. 5B is a sectional view of the draining construction structure of FIG. 5A.

Additionally, the support struts 1106, having a higher Young's modulus or the like relative to the pliable moisture impermeable layer 1102, provide structural support to maintain the installation surface, such as the surface 1128 shown in FIG. 5B, at a specified position corresponding to the strut gap 1120. The support struts 1106 maintain the drain channels 1108 even with the installation of outer walls that, in other examples, may deform other components of other construction wraps such as the pliable ridges shown, for instance, in FIG. 2B. In contrast to the deformed pliable ridges, the support struts 1106 maintain a consistent (static or near static) configuration and accordingly maintain the strut gap 1120 after installation of the outer wall along the draining construction wrap 1100. The drain channels 1108 thereby avoid constrictions, occlusion or the like present in other construction wraps and corresponding trapping of water, capillary action to trap moisture or the like.

Referring now to FIG. 5B, the draining construction wrap 1100 is shown in an installed configuration, for instance, with an outer wall 1130 coupled with the wrap, and the wrap is coupled along an inner wall 1113. In the example shown in FIG. 5B, the outer wall 1130 includes one or more component materials such as stucco, mortar or the like applied along the pliable moisture permeable layer 1111. The support struts 1106 are provided along an exterior surface 1118 of the draining construction wrap 1100 while the remainder of the draining construction wrap, for instance, on an opposed surface of the pliable moisture impermeable layer 1102, is provided along an interior surface 1116. Optionally, the draining construction wrap 1100 is included as a component of the inner wall 1113. For instance, the pliable moisture impermeable layer of the draining construction wrap 1100 is bonded (e.g., laminated, adhered, welded, fastened or the like) to the inner wall 1113 prior to installation of the inner wall 1113 to a building, frame or the like.

As further shown in FIG. 5B, the draining construction wrap 1100, in this example, includes a component construction of the pliable moisture impermeable layer 1102. For instance, the layer 1102 includes component layers, such as a moisture impermeable component layer 1110 and one or more nonwoven component layers 1112, 1114. In the example shown in FIG. 5B, the moisture impermeable component layer 1110 is sandwiched or interposed between the nonwoven layers 1112, 1114. In other examples, the moisture impermeable component layer 1110 is coupled with one or more other component layers, for instance, one of the nonwoven component layers 1112, 1114.

As further shown in FIG. 5B, the plurality of support struts 1106 extend between the pliable moisture impermeable layer 1102 and the pliable moisture permeable layer 1111. For instance, the plurality of support struts 1106 include strut bodies 1122 extending between base strut portions 1124 coupled with the pliable moisture impermeable layer 1102 and strut support faces 1126 coupled with the pliable moisture permeable layer 1111. The support struts bridge between the pliable moisture permeable layer 1111 and the pliable moisture impermeable layer 1110 and space the permeable layer 1111 at a consistent distance from the impermeable layer 1110.

Referring again to FIG. 5B, as previously described, the support struts 1106 of the drainage framework 1104 are interposed, in this example, between the pliable moisture permeable layer 1111 and the pliable moisture impermeable layer 1102. The plurality of support struts 1106 provide an installation surface 1128 spaced relative to the pliable moisture impermeable layer 1102 and configured to provide a consistent series of drain channels 1108 therebetween. The drain channels 1108, in the example shown in FIG. 5B, and in a similar manner to the previously described example, includes drain channels 1108 bounded by the support struts 1106 as well as the pliable moisture impermeable layer 1102 and, in this example, the pliable moisture permeable layer 1111. Accordingly, intervening portions of pliable ridges or the like are not interposed between the support struts 1106. Accordingly, deformation, even limited deformation, of the strut bodies 1122 fails to preclude or constrict the drain channels 1108. Instead, the drain channels 1108 are consistently maintained with a height corresponding to the strut gap 1120, shown in FIG. 5B, corresponding to the length of the strut bodies 1122 between the base strut portions 1124 and the strut support faces 1126.

With the plurality of support struts 1106 forming the drainage framework 1104 the strut support faces 1126 and the pliable moisture permeable layer 1111 consistently provide the installation surface 1128 in a spaced position relative to the pliable moisture impermeable layer 1102. Accordingly, the drain channels 1108 are maintained and a continuous substantially planar surface is provided for the installation of the outer wall 1130. As shown in FIG. 5B, the strut support faces 1126 provide a substantially planar continuous surface for installation of the outer wall 1130 (e.g., one or more of mortar, stucco or the like) there along. Additionally, the pliable moisture permeable layer 1111 spanning each of the strut support faces 1126 continues the installation surface 1128 and provides a porous substrate for penetration and capture of the liquid outer wall material therealong. Even with the penetration of the outer wall 1130 into the pliable moisture permeable layer 1111 further penetration is substantially arrested by the porous layer. The drain channels 1108 of the drainage framework 1104 are accordingly maintained and one or more of ventilation, moisture drainage or the like continues in the draining construction wrap 1100 even when coupled with the outer wall 1130.

Figure 6A:
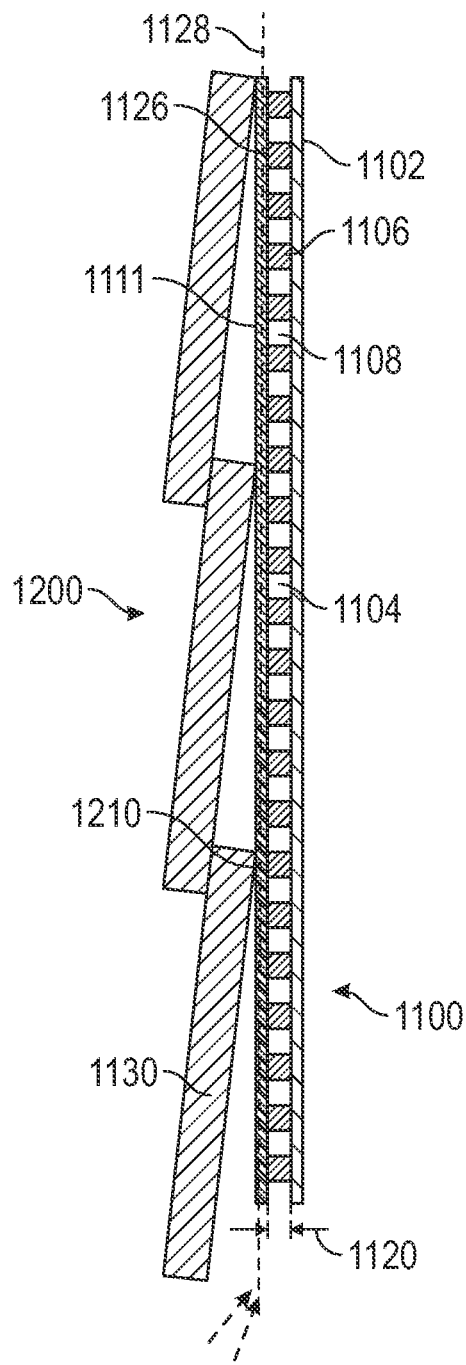
FIG. 6A is a cross sectional view of the draining construction structure of FIG. 5A installed between an inner wall and an outer wall.
Figure 6B:
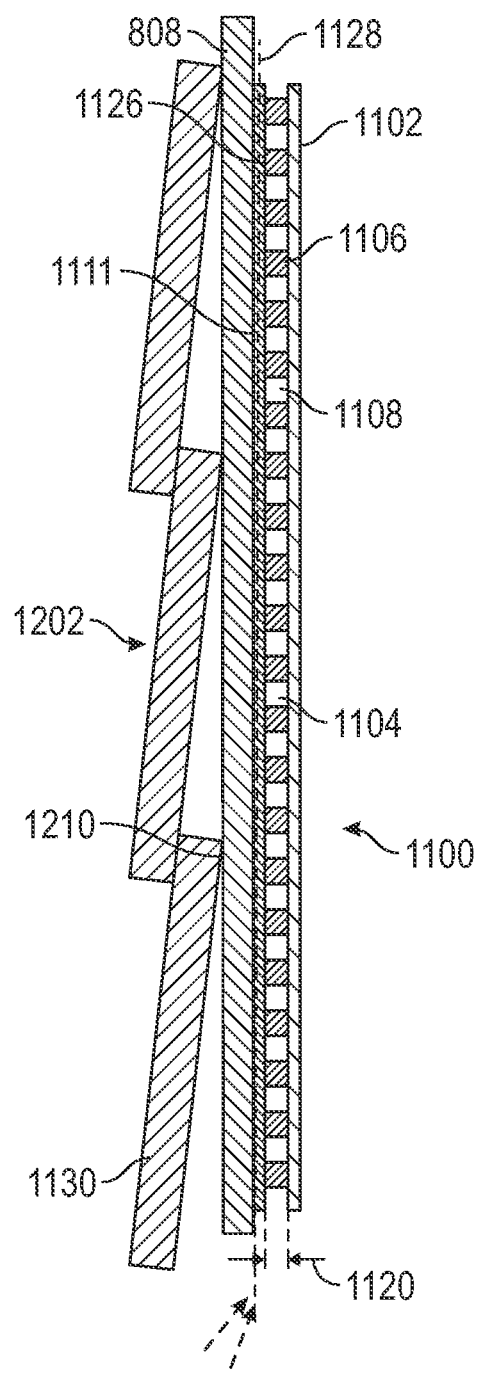
FIG. 6B is a cross sectional view of the draining construction structure of FIG. 5A installed between an inner wall and an outer wall with a furring strip.

FIGS. 6A and 6B show examples of wall assemblies 1200, 1202 including, for instance, an outer wall 1130 installed along an installation surface 1128 of the draining construction wrap 1100. An additional component, such as an inner wall (shown in FIG. 2A) is provided along the opposed or interior surface of the draining construction wrap 1100 in each of these examples.

Referring first to FIG. 6A, the wall assembly 1200 is shown with an outer wall 1130 including, for instance, one or more outer wall panels such as shingles, siding or the like engaged along the installation surface 1128. As previously described and shown again in FIG. 6A, the installation surface 1128 is substantially planar, for instance, having a continuous planar configuration along the strut support faces 1126. As previously described, the strut support faces 1126 of the support struts 1106 are braced in the position shown, for instance, with the corresponding strut gap 1120 between the pliable moisture impermeable layer 1102 and the pliable moisture permeable layer 1111. The strut support faces 1126 provide a structural surface for installation of one or more features, such as features of the outer wall 1130 there along.

The drainage framework 1104, including the support struts 1106, further includes drain channels 1108 between each of the support struts 1106. The drain channels 1108 are maintained even with loading of the draining construction wrap 1100, for instance, with application of the outer wall 1130 nailing, fastening or the like driven through the outer wall 1130 or the application of heavier materials, for instance, one or more of stucco, mortar, stone, brick or the like. For instance, at one or more loci of engagement 1210 apply force along the installation surface 1128 to the underlying support struts 1106. The force, and corresponding compression, are resisted according to the structural configuration of the support struts 1106 with a greater rigidity than the pliable moisture impermeable layer 1102. Optionally, the support struts 1106 permit limited deformation to absorb loads, such as shock loads, and then return to substantially the configuration shown in FIG. 6A (e.g., with the specified strut gap 112). The support struts 1106 accordingly maintain the drain channels 1108 and the drainage framework 1104 along the draining construction wrap 1100 to facilitate one or more of draining (shown with a downward dashed arrow) or ventilation (shown with the upward dashed arrows).

As further shown in FIG. 6A, in this example the installation surface 1128 further includes a pliable moisture permeable layer 1111 as previously shown in FIGS. 5A, 5B. In this example, the pliable moisture permeable layer 1111 facilitates increased ventilation of the draining construction wrap 1100 while providing a porous barrier between the outer wall 1130 and the drainage framework 1104. For instance, the pliable moisture permeable layer 1111, such as a perforated polymer, nonwoven or the like, facilitates ventilation through the layer 1111 while at the same time preventing the ingress of particulate, dust, pollen or the like. Additionally, moisture readily passes through the pliable moisture permeable layer 1111 into the drain channels 1108 for diversion, for instance, toward the bottom of the draining construction wrap 1100.

Referring now to FIG. 6B, another example wall assembly 1202 is shown. In this example, furring strips 808 are provided as an interposing feature between the remainder of the outer wall 1130 and the draining construction wrap 1100. The furring strips 808 are, in one example, driven into the inner wall, for instance, through the draining construction wrap 1100 to accordingly fasten the furring strips 808 in place and thereafter allow for installation of the outer wall 1130 thereon. As previously described in some examples, loci of engagement 1210 are applied to the draining construction wrap 1100 corresponding to the fastening or applied force of the furring strips 808 to the draining construction wrap 1100. Because of the structural configuration of the support struts 1106, the installation surface 1128 remains substantially planar (e.g., with limited deformation at installation of the strips 808) and accordingly the drain channels 1108 are maintained, for instance, without one or more of occlusions, constrictions or the like. Instead, drainage is allowed through the drain channels 1108 even behind the furring strips 808 along the inner wall of the building.

Optionally, the support struts 1106 allow for some limited deformation, for instance, with shock loading of the furring strips 808 during hammering, nailing, fastening or the like. The support strips 1106 readily return to their original or near original configuration, and thereby maintain the strut gap 1120 and the drain channels 1108. As with the previous example shown, for instance, in FIG. 6A, the pliable moisture permeable layer 1111 is included to facilitate the ingress and draining of moisture while minimizing ingress of particulate, such as pollen, dust or the like. Accordingly, in this example, the pliable moisture permeable layer 1111 (as well as in the example in FIG. 6A) facilitates the ingress of moisture and ventilation to the draining construction wrap 1100 while preventing the ingress of other particulate such as dust, pollen or the like into the drain channels 1108.

In another example, the draining construction wrap 1100 is coupled with panels used in the construction of the building 700. For instance, the draining construction wrap 1100 is bonded with prefabricated boards, panels or the like at a factory, manufacturing location, job site or the like prior to installation. For instance, the draining construction wrap described herein is laminated, adhered, welded, fastened or the like to oriented strand board (OSB), plywood, fiberboard, foam board or the like. In still other examples, the draining construction wrap 1100 described herein is applied to the building 700 after assembly of the panels (e.g., the draining construction wrap is unrolled along the building 700) and fastened or adhered in place.

FIGS. 7A-7D show various examples of draining construction wrap 1300, 1302, 1304, 1306 including support struts having various profiles (e.g., strut profiles). The strut profiles described herein include one or more of shape, length, width, circumference or the like of the support struts and the corresponding overall support surface provided by the support struts, for instance, corresponding to the installation surfaces described herein such as the installation surfaces shown in FIGS. 3B; 4A, B; 5B; and 6A, B.

Figure 7A:
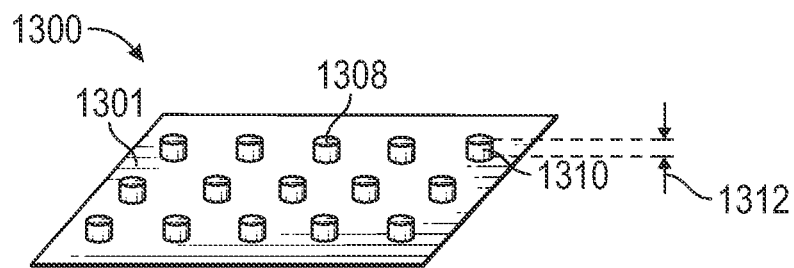
FIGS. 7A-D are perspective views of example support struts and respective strut profiles.

Referring first to FIG. 7A, the draining construction wrap 1300 includes a plurality of support struts 1308 having corresponding strut profiles 1310. The strut profiles 1310 are, in this example, in a post configuration. For instance, the struts 1308 are round columns extending from their base portions to strut support faces configured to provide an installation surface. As further shown in FIG. 7A, the plurality of support struts 1308 are coupled with a pliable layer 1301, such as one or more of the pliable moisture impermeable or pliable moisture permeable layers described herein. In another example, the plurality of support struts 1308 bridge between pliable moisture impermeable and pliable moisture permeable layers as described herein. For ease of illustration the second layer is withheld in each of FIGS. 7A-D.

The support struts 1308 provide a flush installation surface for installation of one or more components of an outer wall assembly. In the view shown in FIG. 7A, the support struts 1308, having the strut profile 1310, provide a discontinuous surface having a continuous planar configuration. The installation surface is substantially continuous extending across the tops of each of the support struts 1308 while providing the drain channels (and discontinuities) therebetween.

Figure 7B:
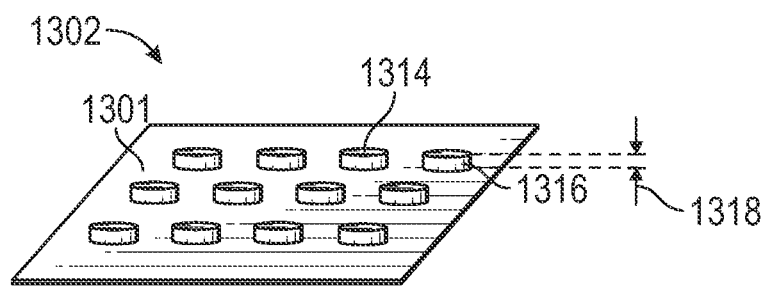

FIG. 7B shows another example of a draining construction wrap 1302 including support struts 1314 coupled with a pliable layer 1301 (e.g., one or more of the pliable moisture impermeable or pliable moisture permeable layers). In the example shown, the draining construction wrap 1302 includes the support struts 1314 having strut profiles 1316. In this example, the strut profiles 1316 are substantially ovular relative to the circular profiles of the support struts 1308 shown in FIG. 7A. Additionally, the strut length 1318 of the support struts 1314 (corresponding to the strut gaps described herein) is smaller with the support struts 1314 relative to the strut lengths 1312 of the support struts 1308 shown in FIG. 7A. Additionally, as shown in FIG. 7B, the support struts 1314 provide distributed support faces (a larger surface area) relative to the support struts 1308 according to the strut profiles 1316. Additionally, the support struts 1314, having the ovular configuration shown in FIG. 7B and circular configuration in FIG. 7A, are configured to divert moisture, for instance, liquid water, along their surfaces in substantially any orientation.

Figure 7C:
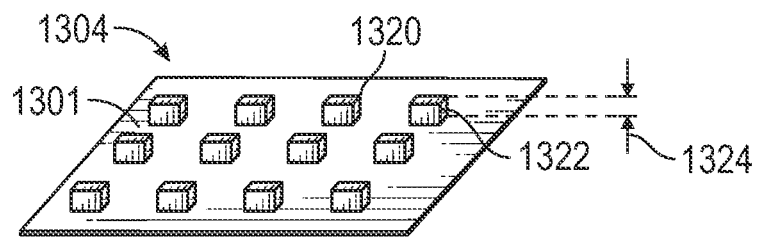

FIG. 7C shows another example of a draining construction wrap 1304, including a plurality of support struts 1320 extending from a pliable layer 1301. In this example, the support struts 1320 have a differing strut profile 1322 relative to either of the strut profiles 1310, 1316 previously described herein. The support struts 1320 include a rectangular or square strut profile 1322. Additionally, the strut lengths 1324 corresponding to the strut gaps previously described herein are different for the support struts 1320 relative to the strut length 1312 of the support struts 1308. For instance, the strut lengths 1324, as shown in FIG. 7C are, in one example, smaller relative to the strut lengths 1312 shown in FIG. 7A. In the example shown in FIG. 7C the strut profile 1322 is one or more of a rectangle, square or the like. Optionally, the strut profile 1322 is, in one example, provided in a rotated configuration relative to horizontal. For instance, the strut profiles 1322 are arranged in a diamond pattern or rotated 45 degree or the like to orient one or more of the surfaces of the strut profile 1322 into an angled orientation relative to horizontal to ensure diversion of moisture along the support struts 1320.

Figure 7D:
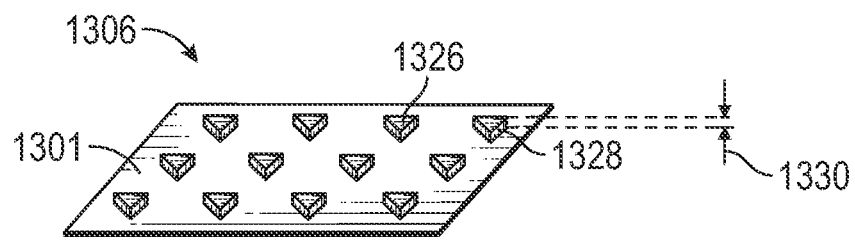

FIG. 7D shows another example of a draining construction wrap 1306 including support struts 1326 having strut profiles 1328 that are triangular. As shown, the support struts 1326 include a strut length 1330 (as part of the strut profile 1328) shorter compared to the other strut lengths 1312, 1318, 1324 shown in FIGS. 7A-C. In various examples, the strut lengths 1330 are provided in one or more specified dimensions, for instance, from 5 millimeters to 65 millimeters. In the various examples described and shown herein, the support struts 1308, 1314, 1320, 1326, as well as the other examples of support struts described herein have varied profiles including combinations of shape, length, perimeter or the like to provide a consistent flush series of strut support faces as installation surfaces. The installation surface provides a planar surface configured to support one or more components installed over the corresponding construction wraps. As described herein, the support struts brace the strut support faces and ensure the outer wall components are adequately supported to prevent chronic deformation, shrinking or the like of the support struts and corresponding occlusion, constriction or the like of drain channels extending between the support struts.

Figure 8A:
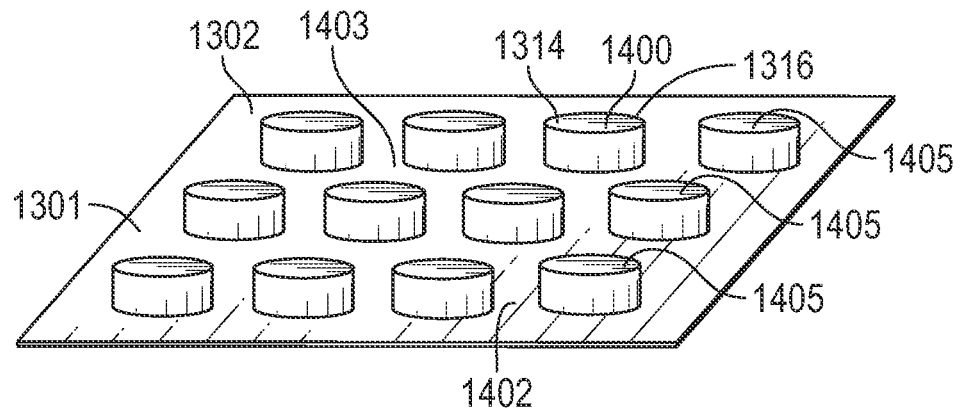
FIG. 8A-B are perspective views of example support struts and drain channels.
Figure 8B:
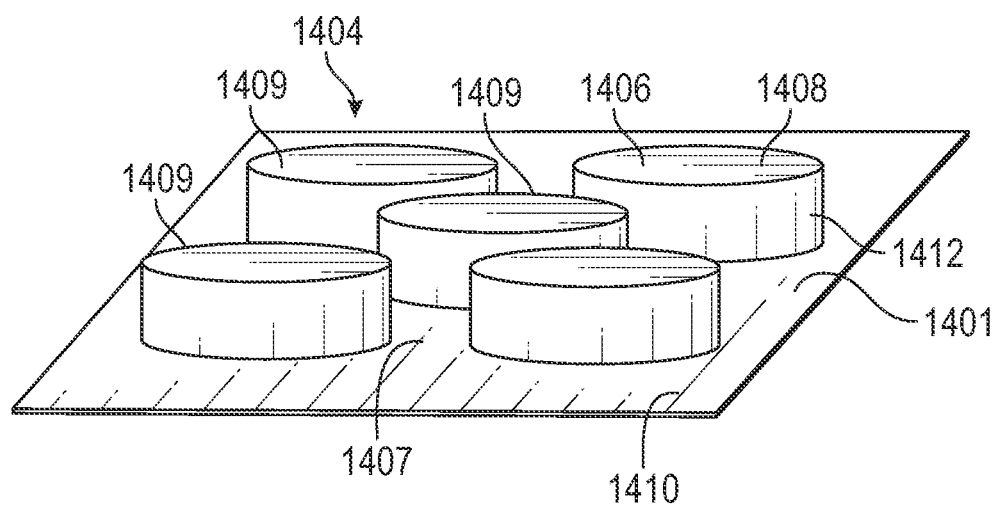

Referring now to FIGS. 8A and 8B, examples of construction wraps such as draining construction wraps 1302, 1404 are shown. The strut profiles 1316, 1412 of the draining construction wraps 1302, 1404 provide varying coverage surface of the support struts and the intervening drain channels along the pliable layers 1301, 1401.

Referring first to FIG. 8A, the draining construction wrap 1302 includes a plurality of support struts 1314 that provide a drainage frame work. In the example shown in FIG. 8A, the support struts 1314 have a post strut profile 1316 extending away from the pliable layer 1301. As further shown in FIG. 8A, drain channels 1403 extend between each of the support struts 1314.

As shown in FIG. 8A, each of the support struts 1314 includes a component strut coverage area 1400 corresponding to a surface area or a strut support face area of each of the struts 1314. A composite strut coverage area 1405 includes the areas 1400 of each of the support struts 1314 included together relative to a channel coverage area 1402 of the drain channels 1403. The channel coverage area 1402 is the surface area between each of the support struts 1314 (the drain channels 1403) and extending along the pliable layer 1301. In the example shown in FIG. 8A, the composite strut coverage area 1405 is less than the channel coverage area 1402. The larger channel coverage area 1402 relative to the strut coverage area 1400 facilitates the draining of fluids between each of the support struts 1314 while at the same time continuing to provide an installation surface, for instance, along the strut support faces (as described herein) sufficient to support and brace the strut support faces and thereby provide an installation surface having a planar configuration for mounting of outer wall components.

Referring now to FIG. 8B, another example of the draining construction wrap 1404 is provided. In this example, the support struts 1406 having a relatively larger strut profile 1412 relative to the strut profile 1316 shown in FIG. 8A. The support struts 1406 extend from the pliable layer 1401 including, but not limited to, one or more of the pliable moisture impermeable layers or pliable moisture permeable layers described herein. Optionally, the support struts 1406 bridge between layers, such as a pliable moisture impermeable layer and a pliable moisture permeable layer as previous described.

In this example, the support struts 1406 include strut coverage areas 1408 larger than the strut coverage areas 1400 of the struts 1314 shown in FIG. 8A. Additionally, in this example, the support struts 1406 are provided in a more tightly packed, higher density configuration relative to the less dense configuration shown elsewhere herein. The corresponding composite strut coverage area 1409 of the support struts 1406 in FIG. 8B is collectively greater than the composite strut coverage area 1405 in FIG. 8A. In this example, the composite strut coverage area 1409 is greater than the channel coverage area 1410 of the drain channels 1407 between the support struts 1406. With this configuration, the support struts 1406 provide a near continuous installation surface including, for instance, a planar installation surface distributed across the pliable layer 1401. In one example, the support struts 1406 having the larger strut profiles 1412 and corresponding overall larger composite strut coverage area 1409 provides additional bracing for the draining construction wrap 1404 to accordingly carry larger loads and and provide enhanced resistance to deformation. In another example, the packing density of the support struts 1406 is decreased to space the support struts 1406 relative to each other and increase the channel coverage area 1410 to facilitate additional ventilation and moisture drainage.

Figure 9:
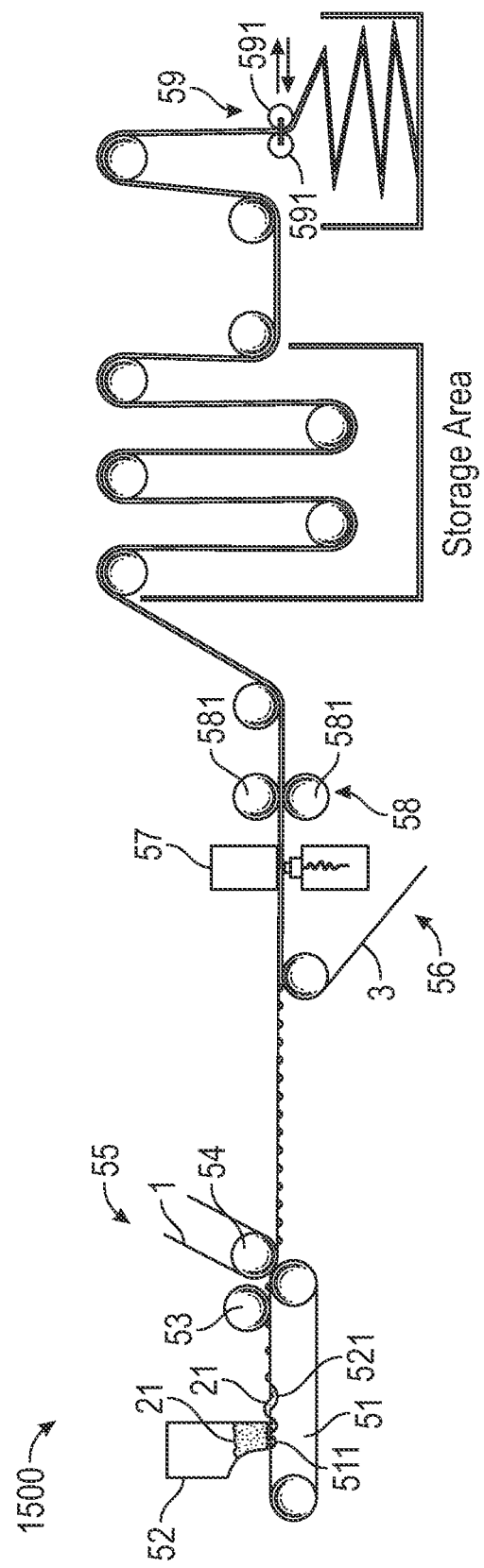
FIG. 9 is a schematic view of one example of an assembly arrangement for a draining construction structure.

An example production line 1500 for one or more of the draining construction wraps is shown in FIG. 9. The production line includes a sequential material-feeding-and-positioning conveying belt 51, a vibrating material-input funnel 52, a hot melting roller 53, a hot attaching roller 54, a waterproof-and-moisture-permeable-fabric unrolling device 55, a protection-layer unrolling device 56, a heat sealing part 57, a drawing device 58 and a fabric-swinging-and-collecting device 59.

The two ends of the material-feeding-and-positioning conveying belt 51 are driven by rollers to rotate. The rollers drive the rotation by means of motors, provided on the material-feeding-and-positioning conveying belt are grooves 511 that contain part of the elastic protrusions 21 (the support struts). The vibrating material-input funnel 52 is located above the material-feeding-and-positioning conveying belt 51, and comprises an opening 521 that faces toward the material-feeding-and-positioning conveying belt 51. Clearance between the opening 521 and the material-feeding-and-positioning conveying belt 51 has a size that satisfies the requirement for the elastic protrusions 21 to enter the grooves 511 and prevent the elastic protrusions 21 from moving outside of the area projected by the opening 521 onto the material-feeding-and-positioning conveying belt 51. For example, the grooves 511 have a size of the radius of the elastic protrusion 21 beads, while the clearance between the opening 521 and the material-feeding-and-positioning conveying belt 51 is slightly larger than the radius of the elastic protrusion 21 beads but is smaller than the diameter of the elastic protrusion 21 beads.

Figure 10:
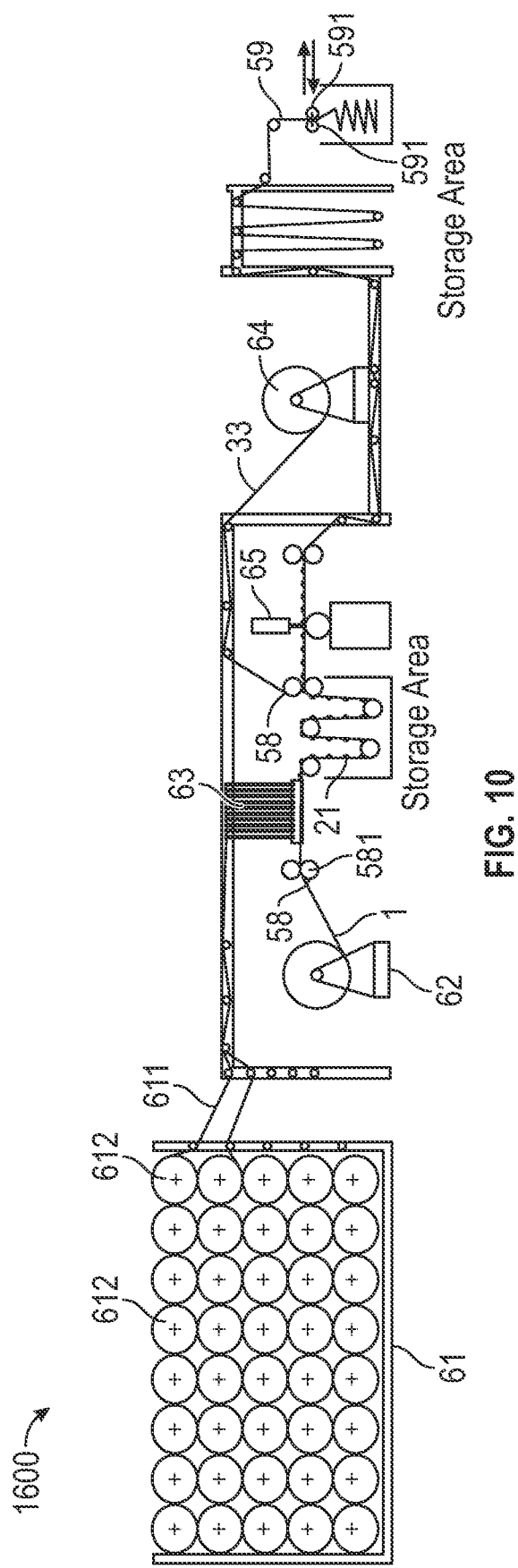
FIG. 10 is a schematic view of another example of an assembly arrangement for a draining construction structure.

The waterproof-and-moisture-permeable-fabric unrolling device 55 is used to unroll the waterproof and moisture permeable fabric 1 (e.g., one of the pliable moisture impermeable layer or the pliable moisture permeable layers described herein including composites having fabric, such as non-woven therein), which rolls the waterproof and moisture permeable fabric 1 by means of a rotary roller, where the structure of the waterproof-and-moisture-permeable-fabric unrolling device 55 is the same as or similar to the first unrolling rack 62 (see FIG. 10).

The hot melting roller 53 and the hot attaching roller 54 are provided on the end of the material-feeding-and-positioning conveying belt 51. The hot melting roller 53 first contacts the elastic protrusions 21 (support struts) in the grooves 511 to partially melt (at or above the glass transition temperature or melting temperature) the elastic protrusions 21 on the side away from the grooves 511, the hot attaching roller 54 presses the waterproof and moisture permeable fabric 1 (e.g., one of the impermeable or permeable layers) that is unrolled from the waterproof-and-moisture-permeable-fabric unrolling device 55 on the surface of the melt elastic protrusions 21.

The protection-layer unrolling device 56 comprises a rotary roller to roll or unroll the protection layer 3 (the other of the pliable permeable or pliable impermeable layers). Also provided at a place close to the elastic protrusions 21 is a rotary roller, by passing through which, the protection layer 3 gets closer to or is tightly attached onto the surface of the elastic protrusions 21. The heat sealing part 57 fixes the protection layer 3 with the elastic protrusions 21 by heating, and the heat scaling part 57 may use an ultrasonic heating device to heat through ultrasonically to melt the elastic protrusions 21 close to the protection layer 3 and fix them with the protection layer 3.

As further shown in FIG. 9, the drawing device 58 comprises drawing rollers 581 that are provided at multiple places on the production line, the drawing rollers 581 draw back and guide the waterproof and moisture permeable fabric (e.g., one or more of the pliable impermeable or permeable layers) in the front section through a pressing and rotating action.

The fabric-swinging-and-collecting device 59 comprises a horizontal pushing device and at least one pair of rotary rollers 591, where the horizontal pushing device may use an air cylinder, an oil cylinder or the like. The action end thereof is connected with the racks of the rotary rollers 591, the paired rotary rollers 591 transfer the waterproof and moisture permeable fabric 1 (draining construction wrap) downward through the pressing and rotating action, and the horizontal pushing device drives the paired rotary rollers 591 to move in the horizontal direction so as to swing and stack the fabric for material collection.

Working mechanism: rolling the water proofing and moisture permeable fabric 1 (one of the pliable moisture impermeable or pliable moisture permeable layers) on the waterproof-and-moisture-permeable-fabric unrolling device 55, and the protection layer 3 (the other of the pliable moisture permeable or pliable moisture impermeable layers) being rolled on the protection-layer unrolling device 56, the waterproof-and-moisture-permeable-fabric unrolling device 55 and the protection-layer unrolling device 56 can both use the unrolling rack, the fabric-swinging-and-collecting device 59 can be provided at the end of the entire production line or a manual collecting and rolling can also be used.

The present subject matter provides a fabric-swinging-and-collecting device 59. With the movement of the material-feeding-and-positioning conveying belt 51, the vibrating material-input funnel 52 inputs the elastic protrusions 21 (e.g., the support struts) therein into the grooves 511 on the surface of the material-feeding-and-positioning conveying belt 51. When the elastic protrusions 21 pass through the hot melting roller 53, the hot melting roller 53 heats and melts the elastic protrusions 21 (to or above the glass transition temperature, melting temperature or the like) until the surface is adhesive. As the material-feeding-and-positioning conveying belt 51 moves, the adhesive elastic protrusions 21 are attached onto the waterproof and moisture permeable fabric 1 (one of the impermeable or permeable layers described herein, including composite layers). As the hot attaching roller 54 and the material-feeding-and-positioning conveying belt 51 move together, the elastic protrusions 21 that are placed on the material-feeding-and-positioning conveying belt 51 are attached onto the waterproof and moisture permeable fabric 1 so as to complete the preparation of the three-dimensional waterproof and moisture permeable fabric 1 described in the embodiments shown in FIGS. 3A, B and 4A, B.

Passing the obtained waterproof and moisture permeable fabric 1 through an ultrasonic heat sealing device, where the ultrasonic heat sealing device heats the elastic protrusions 21 that pass through to make them adhesive, which are then fixed with the protection layer 3 (one of the pliable permeable or impermeable layers, including composite layers). A layered wrap is provided including the protection layer 3—elastic protrusions 21—waterproof and moisture permeable fabric 1. During the process, the waterproof and moisture permeable fabric 1 (the draining construction wrap) is transferred through the drawing devices 58 that are pressed tightly against each other, and then materials are collected through the fabric-swinging-and-collecting device so as to fulfill the preparation of the three-dimensional waterproof and moisture permeable fabric 1 described in the embodiments shown in FIGS. 5A, B and 6A, B.

As shown in FIG. 10, a production line 1600 that comprises a foamed-pipe unrolling rack 61, a first unrolling rack 62, a hot cutting device 63, a drawing device 58 and a fabric-swinging-and-collecting device 59, where the fabric-swinging-and-collecting device 59 in FIG. 10 is the same as the one in FIG. 9. The foamed-pipe unrolling rack 61 is rotationally connected with several rotary discs 612 which have the foamed pipes 611 rolled thereon, the number of the rotary discs 612 determines how many elastic protrusions 21 (support struts are fixed in one time. The first unrolling rack 62 unrolls the waterproof and moisture permeable fabric 1 (e.g., one of the pliable moisture impermeable or moisture permeable layers described herein, including composite layers having component permeable fabric layers, such as non-woven, and moisture impermeable component layers) which is rolled on the rotary roller of the first unrolling rack 62.

Figure 12:
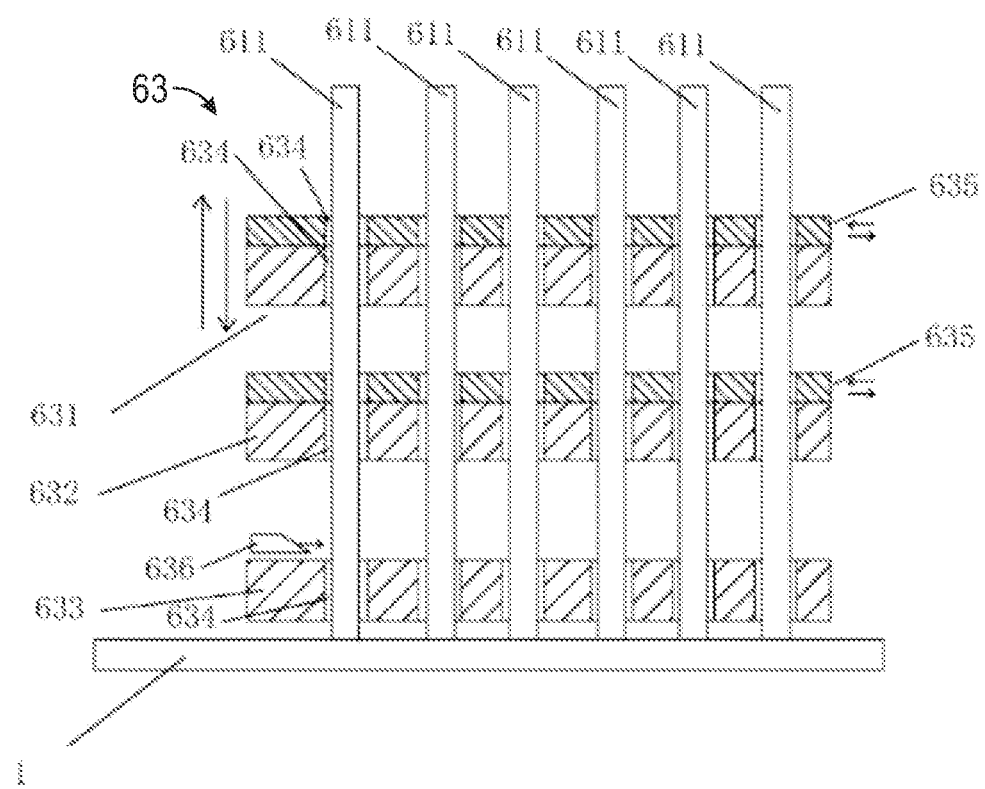
FIG. 12 is a sectional view of one example of a cutting assembly.

As shown in FIG. 12, a hot cutting device 63 includes from the top to the bottom, a lifting clamping plate 631, a fixed clamping plate 632, and a hot-cutting mounting plate 633. Provided on the lifting clamping plate 631, the fixed clamping plate 632 and the hot-cutting mounting plate 633 are through-holes 634 for the foamed pipes (e.g., support struts prior to cutting) to pass through. Provided separately on the lifting clamping plate 631 and the fixed clamping plate 632 are clamping devices 635 for clamping the foamed pipes. In the example shown in FIG. 12, the clamping devices 635 are plates that move on the lifting clamping plate 631 and the fixed clamping plate 632, which also have through-holes thereon. In an example, the plates move by means of an air cylinder. In the process of moving, the through-holes 634 on the plates are arranged in a staggered configuration with the through-holes 634 on the fixed clamping plate 632 or on the lifting clamping plate 631, so as to realize the clamping to the foamed pipes;

As shown in FIG. 12, the hot-cutting mounting plate 633 is connected in a sliding way with an electrically heated knife 636 that cuts and melts the foamed pipes 611 (support struts) which pass through the through-holes 634. The electric heating knife 636 is configured to cut the foamed pipes, and during the cutting process, allow the cut foamed pipes to be melted for the following fixing. The hot cutting device 63 is connected to the action end of the air cylinder to drive, so as to realize the sliding of the electrically heated knife 636 on the hot-cutting mounting plate 633;

As shown in FIG. 10, the drawing device 58 comprises a self-rotary drawing roller 581, the drawing roller 581 draws back the waterproof and moisture permeable fabric 1 (one or more of the pliable impermeable or pliable permeable layers) in the front section by means of the pressing and rotating action, and an individual drawing roller 581 can also change the direction of the fabric.

As shown in FIG. 10, the fabric-swinging-and-collecting device 59 comprises a horizontal pushing device and at least one pair of rotary rollers 591. The horizontal pushing device uses an air cylinder, oil cylinder or the like. The action end thereof is connected with the racks of the rotary rollers 591. The paired rotary rollers 591 transfer the waterproof and moisture permeable fabric 1 downward through the pressing and rotating action. The horizontal pushing device drives the paired rotary rollers 591 to move in the horizontal direction so as to swing and stack the fabric for material collection.

The working mechanism of FIG. 10 is the drawing device 58 draws forward the waterproof and moisture permeable fabric 1 on the first unrolling rack 62. The hot cutting device 63 guides the EVA foamed pipes on the rotary disc to a place above the waterproof and moisture permeable fabric 1. Referring to FIG. 12, the foamed pipes pass sequentially through the through-holes 634 on the hot cutting device 63, and the clamping device 635 on the fixed clamping plate 632 fixes the foamed pipes. The electrically heated knife 636 moves to perform end-face finishing on the foamed pipes that pass through the through-holes 634 on the hot-cutting mounting plate 633, and makes the cuts melted (e.g., engages with the ends of the pipes and heats them for bonding). The clamping device 635 on the lifting clamping plate 631 clamps the foamed pipes, and the clamping device 635 on the fixed clamping plate 632 releases, and the lifting clamping plate 631 moves up and down driven by the air cylinder to let the cuts of the foamed pipes melted after the hot cutting be fixed with the waterproof and moisture permeable fabric 1. The electrically heated knife 636 acts to cut off the foamed pipes to form elastic protrusions 21 (e.g., the support struts, bonded to either of the pliable moisture impermeable or permeable layers). The clamping device 635 on the fixed clamping plate 632 clamps, and the clamping device 635 on the lifting clamping plate 631, driven by the air cylinder, releases and then moves upward to the initial position. The clamping device 635 on the lifting clamping plate 631 is fixed again, and gradually transfers the next section of foamed pipes downward. The process is repeated on the waterproof and moisture permeable fabric 1. The waterproof and moisture permeable fabric 1 with elastic protrusions 21 fixed thereon (the draining construction wrap examples described herein), under the action of the drawing device 58, is collected by the fabric-swinging and collecting device 59.

The foamed pipe is made from foamed materials which is porous inside and is relatively stiff (e.g., to provide the bracing support described herein for maintenance of the drain channels and installation and support of the outer wall). The exterior wall of the periphery (e.g., the installation surface) of the draining construction wrap is relatively stiff, and capable of providing enhanced support to the outer wall.

As shown in FIG. 10, in order to provide the protection layer 3 (e.g., one of the pliable moisture impermeable or moisture permeable layers) made from nonwoven fabric on the three-dimensional waterproof and moisture permeable fabric 1 processed in FIG. 9 on the production line of FIG. 10 a second unrolling rack 64 and an ultrasonic hot stamping device 65 are provided. The second unrolling rack 64 is provided after the hot cutting device 63 to unroll the protection layer 3 to be in contact with the elastic protrusions 21 (support struts). The ultrasonic hot stamping device 65 is provided in between the second unrolling rack 64 and the fabric-swinging-and-collecting device 59, to heat the elastic protrusions 21 and to fix the elastic protrusions 21 with the protection layer 3.

The second unrolling rack 64 is located in between the hot cutting device 63 and the fabric-swinging-and-collecting device 59. On the second unrolling rack 64 rolled with the protection layer 3, where the structure of the second unrolling rack 64 is the same as that of the first unrolling rack 62, when the waterproof and moisture permeable fabric 1 is moving, the protection layer 3 of the second unrolling rack 64 moves to contact with the elastic protrusions 21 on the first waterproof and moisture permeable fabric 1. The protection layer 3 is fixed with the elastic protrusions 21 through the ultrasonic hot stamping device 65 to form a three-dimensional waterproof and moisture permeable fabric 1 (e.g., a draining construction wrap including each of the pliable moisture impermeable and moisture permeable layers).

Lastly, the waterproof and moisture permeable fabric 1 is collected by the fabric-swinging-and-collecting device 59. In the production lines 1500, 1600, the fabric storage area is formed by multiple rollers that are arranged both vertically and horizontally to tension the fabric and satisfy the requirement of hot cutting by frames, for instance as shown in FIG. 12.

In an example production, the draining construction wraps shown at least in FIGS. 3A-6B includes a certain degree of structural strength (e.g., with the support struts providing braced installation surfaces) and complies with architecture standards on fireproofing and anti-combustion performance. In addition, during a waterproofing test and a moisture permeability test, the draining construction wrap examples provide good waterproofing performance and good moisture permeating performance.

In the examples provided herein, the material for the first nonwoven fabric and the second nonwoven fabric (e.g., permeable layers and nonwoven component layers) may use materials made from nonwoven fabric or other materials that satisfy the requirements for architectural standards, building codes or the like. For example, with a grammage of 30-90 g/m$^2$, the waterproof and moisture permeable functional layer is constructed with materials such as polyethylene (PE) film or thermoplastic polyurethane (TPU) with a grammage of 20-30 g/m$^2$, and the material for the elastic protrusions includes foamed beads or small cylinders of polypropylene (PP), polyethylene (PE) or ethylene-vinyl acetate (EVA) (diameter of 6-10 mm, hardness of 70 HRC), and the protection layer (pliable moisture impermeable layer) uses anti-water nonwoven fabric or other woven fabric with a grammage of 30-90 g/m$^2$. The pliable moisture impermeable layer (e.g., including component permeable and impermeable layers) is configured to provide moisture impermeability to prevent moisture ingress while having porosity configured to facilitate gas permeability, for instance to facilitate breathing of a building from the interior to the exterior.

Optionally, the draining construction wrap examples described herein include a composite pliable moisture impermeable layer including Step one: combining the first nonwoven fabric layer 912 with the waterproof and moisture permeable functional layer 910, which is then combined with the second nonwoven fabric layer 914 to obtain a work in process (see FIG. 3B): the waterproof and moisture permeable fabric 1 (fed into the production line of FIG. 9). Step two (optional): printing a logo on the first nonwoven fabric layer 11 using a printer. Step three: hot stamping the elastic protrusions 21 (support struts 906 in FIG. 3B, and 1106 in FIG. 5B) evenly and regularly on the first nonwoven fabric layer 11, where the elastic protrusions 21 attach regularly to the first nonwoven fabric layer 11 after melting with the hot stamping machine to ensure the elastic protrusions 21 having a height of 1-20 mm or more. Step four: packaging.

In another example, the draining construction wrap examples described herein include a composite pliable moisture impermeable layer (FIGS. 5A, B, 1102) and a pliable moisture permeable layer (1111). Step one: combining the first nonwoven fabric layer 912 with the waterproof and moisture permeable functional layer 910, which is then combined with the second nonwoven fabric layer 914 to obtain a work in process: the waterproof and moisture permeable fabric 1 (fed into the production line 1600 of FIG. 10). Step two: hot stamping the elastic protrusions 21 (e.g., support struts 1106) evenly and regularly on the first nonwoven fabric layer 11, where the elastic protrusions 21 attach regularly to the first nonwoven fabric layer 11 after melting with the hot stamping machine to ensure the elastic protrusions 21 having a height of 1-20 mm or greater. Step three: covering the protection layer 3 (e.g., pliable moisture permeable layer 1111) on the elastic protrusions 21. Step four (optional): printing a logo on the protection layer 3 using a printer. Step five: packaging.

Figure 11:
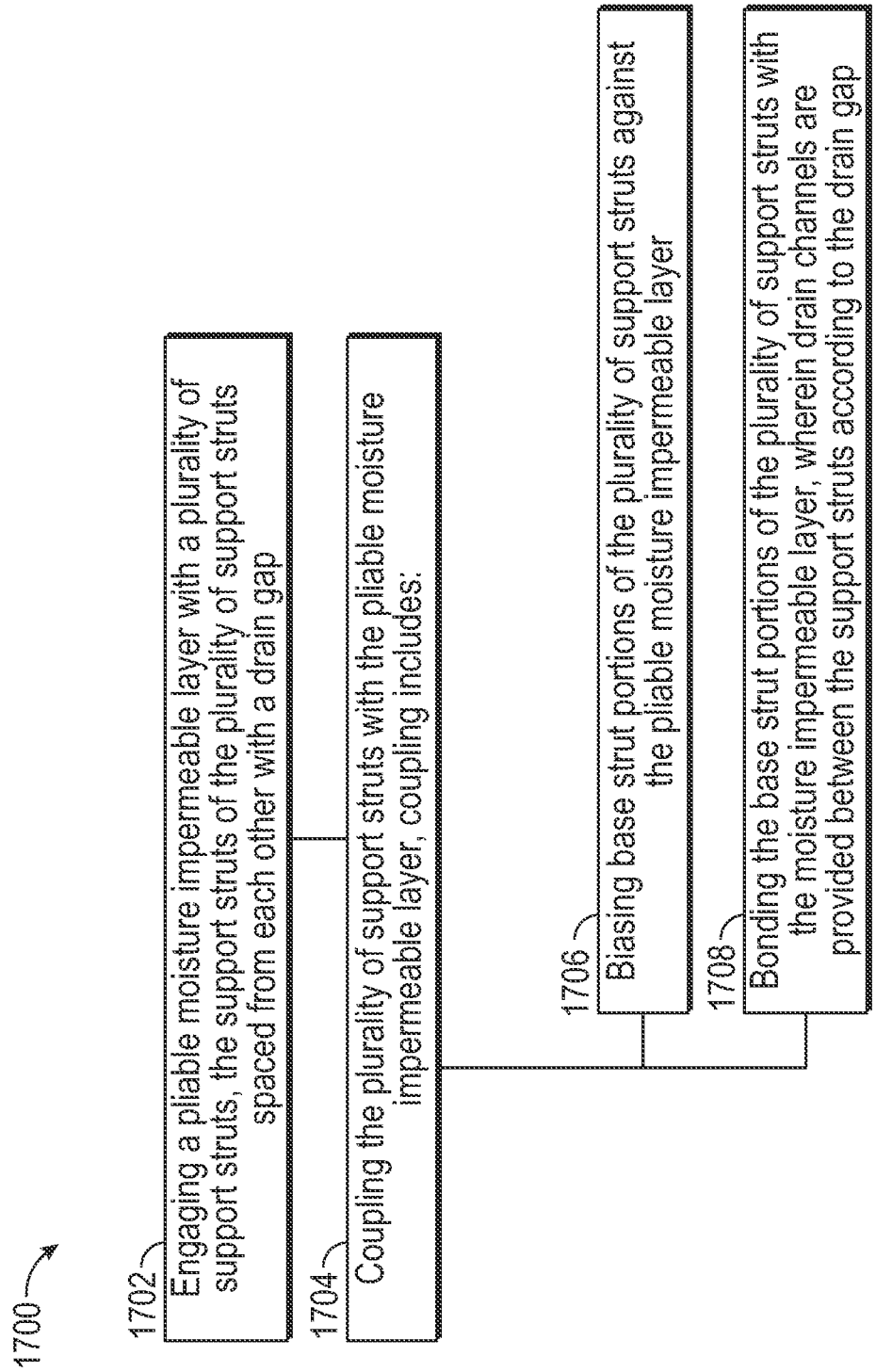
FIG. 11 is a block diagram showing one example of a method for making a draining construction structure.

FIG. 11 shows one example of a method 1100 for making draining construction wrap including one or more of the draining construction wrap examples described herein. In describing the method 1100, reference is made to one or more components, features, functions or steps previously described herein. Where convenient, reference is made to the components, features, steps or the like with reference numerals. The reference numerals provided are exemplary and are not exclusive. For instance, components, features, functions, steps or the like described in the method 1100 include, but are not limited to, the corresponding numbered elements provided herein and other corresponding elements described herein (both numbered and unnumbered) as well as their equivalents.

At 1702, the method 1700 includes engaging a pliable moisture impermeable layer with a plurality of support struts. As described herein, the support struts provide a braced installation surface that maintains drain channels therebetween. The support struts are spaced from each other by a drain gap (for instance, related to the density and profile of the support struts on the layer). Additionally, the plurality of support struts provide a stable platform for installation of outer wall components.

At 1704, the support struts are coupled with the pliable moisture impermeable layer including composite layered assemblies, nonwoven layers or the like. Coupling the support struts with the layer includes biasing the support struts and bonding the support struts to the layer. For example, at 1706 coupling includes biasing base strut portions of the plurality of support struts against the layer. Biasing includes one or more of pressing the layer toward the support struts or pressing the support struts toward the layer. Pressing of the components together includes, but is not limited to, engaging rollers at a nip that compresses the layer and the struts together, pressing a platen against the layer or struts, pressing a cutting and heating assembly (e.g., a hot knife assembly) as described herein toward the layer, pressing a dispensing system, such as an extruder toward the layer or the like.

At 1708, coupling the plurality of support struts to the layer includes bonding the base strut portions of the plurality of struts with the layer (e.g., the pliable moisture impermeable layer, moisture permeable layer or the like). In one example, bonding includes heating of a portion of the support struts, such as base strut portions, with a heated platen, heated knife or the like to temperatures at or above the glass transition or melting temperatures of the strut material. The biasing of the plurality of struts toward the layer causes infiltration, welding or the like of the strut material to the layer. The draining construction wrap is cooled (passively with ambient air or actively) to set the support struts. In another examples, bonding includes extruding the strut material at the layer to initiate a weld, infiltration or the like with the layer. In still other examples, the plurality of struts are cut from with a hot knife assembly. The struts are formed from polymer cylinders. The heated knife is pressed (with a planar face) against the end of the polymer cylinders to heat the strut material. The cylinders are biased into the layer and the cylinder ends (base strut portions) bond with the layer. The edge of the heated knife cuts across the cylinders (e.g., forming the strut support faces) and frees the support struts from the cylinders. In another example, heating cutting of the cylinders melts the remaining cylinder in preparation for bonding to another segment of the layer (e.g., advanced by conveyor).

In still other examples, an adhesive is applied to the base strut portion or the layer. Biasing initiates the bonding through adhesion between the struts and the layer. Optionally, other methods for bonding include, but are not limited to, laser welding, ultrasonic welding or the like.

Several options for the method follow. In one example, another layer is applied to the draining construction wrap, for instance to the strut support faces. A layer, such as a pliable moisture permeable layer (for use with stucco or the like), is layered over the plurality of support struts and the underlying layer (e.g., a pliable moisture impermeable layer). In a manner similar to the coupling described at 1704, the added layer is bonded to the strut support faces (e.g., with heat, adhesives, welds, extrusion or the like). In this example, the installation support surface of the example draining construction wrap includes the strut support faces and the added layer spanning the strut support faces.

In another example, the method 1700 includes spacing the support struts from each other according to a drain gap. For example, if a drain channel size (width) or ratio of drain area to strut support area is specified the method 1700 includes arranging the plurality of support struts in a configuration to achieve the specified size or ratio.

The present subject matter is further described in detail in the preceding and following specification in combination with the Figures. The present embodiments are only explanations to the present subject matter rather than limitations. A person skilled in the art, after reading the description, may make modifications to the present subject matter as needed.

Embodiment 1

Figure 13:
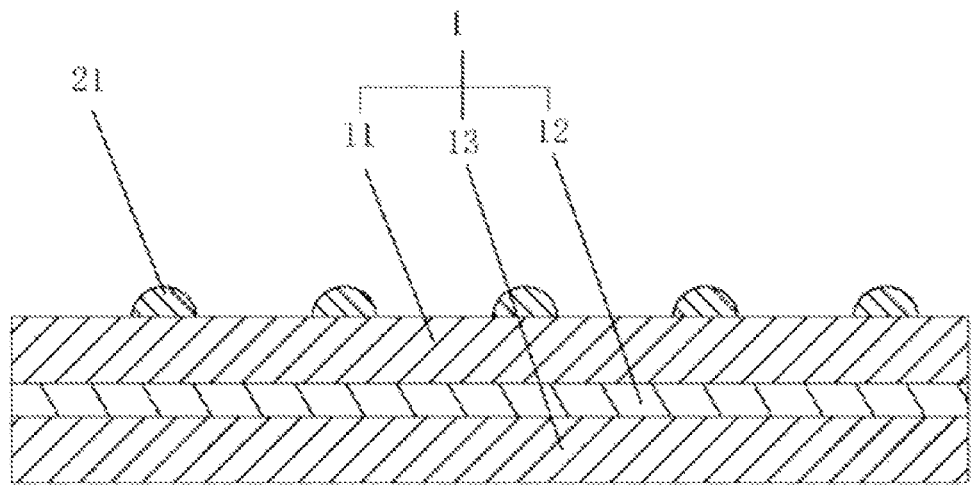
FIG. 13 is another sectional view of the draining construction structure of FIG. 3A.
Figure 14:
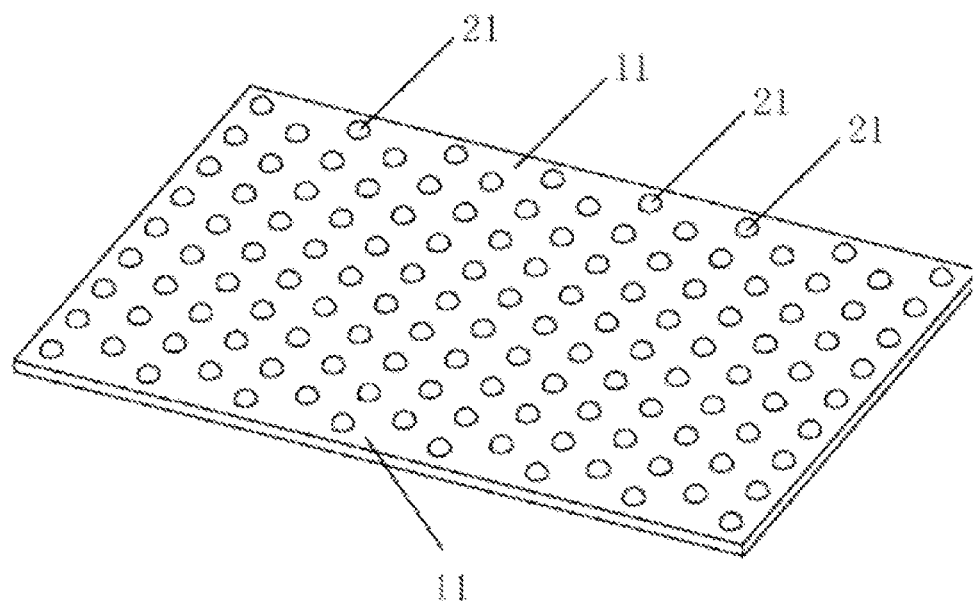
FIG. 14 is a perspective view of the draining construction structure of FIG. 3A.
Figure 15:
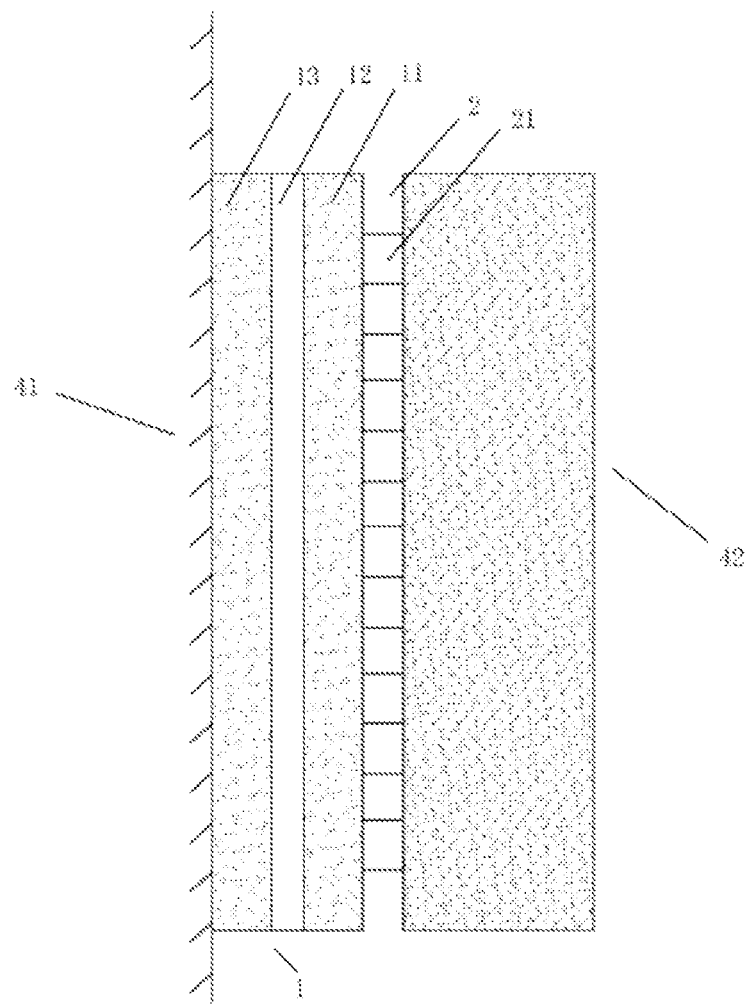
FIG. 15 is another sectional view of the draining construction structure of FIG. 3B.

A three-dimensional waterproof and moisture permeable fabric, as shown in FIG. 13, comprises sequentially from the top to the bottom a waterproof and moisture permeable fabric 1 and a clearance layer 2 (forming an air duct inside the wall structure), wherein the waterproof and moisture permeable fabric 1 comprises three layers: the first nonwoven fabric layer 11, the waterproof and gas permeable (to facilitate breathing and vapor transmission from the interior to the exterior) functional layer 12, and the second nonwoven fabric layer 13: the thicknesses ratio of the first nonwoven fabric layer 11 vs, the waterproof and moisture permeable functional layer 12 vs, the second nonwoven fabric layer 13 is 5:2:3. The waterproof and moisture permeable functional layer 12 can be made from material such as PE or TPU, as shown in FIG. 15. The clearance layer 2 (see FIG. 15) is formed by several elastic protrusions 21 (e.g., support struts) which have a structure as shown in FIG. 14 and are made from plastic substances with certain elasticity, the elastic protrusions 21 are provided on the first nonwoven fabric layer 11.

In the subject matter described herein, the three-dimensional waterproof and moisture permeable fabric (a draining construction wrap) refers, in one example, to the structure of a waterproof and moisture permeable fabric 1 plus the elastic protrusions 21 added thereon. In another example, the waterproof and moisture permeable fabric 1 refers to a three-layered composite structure with the first nonwoven fabric layer 11, the waterproof and moisture permeable functional layer 12 and the second nonwoven fabric layer 13.

Embodiment 2

A production method for the three-dimensional waterproof and moisture permeable fabric includes the following steps: Step 1: fix the waterproof and moisture permeable fabric 1 and level the surface. Step 2: heat the elastic protrusions 21 until adhesive (e.g., at or above a glass transition or melting temperature). The present subject matter, in one example, uses heating methods including hot stamping, thermal radiation heating or sonic heating (e.g., ultrasound). Step 3: attach the elastic protrusions 21 obtained from step 2 onto the surface of the first waterproof layer 1 to form the whole three-dimensional waterproof and moisture permeable fabric (see FIG. 13).

Embodiment 3

A production method for the three-dimensional waterproof and moisture permeable fabric (another example draining construction wrap) includes the following steps: Step 1: fix the waterproof and moisture permeable fabric 1 and level the surface. Step 2: fix the elastic protrusions 21 on the surface of the first nonwoven fabric layer 11 by means of laser welding to form a whole three-dimensional waterproof and moisture permeable fabric. The three-dimensional waterproof and moisture permeable fabric prepared here is the three-dimensional waterproof and moisture permeable fabric shown in FIG. 13.

Embodiment 4

A production method for the three-dimensional waterproof and moisture permeable fabric includes the following steps: Step 1: fix the waterproof and moisture permeable fabric 1 and level the surface; Step 2: let the prepared melt elastic protrusions 21 be arranged on the first nonwoven fabric 11 with a distribution amount of 50-600 per square meter. The specific amount distributed is determined depending on the performance requirement of the three-dimensional waterproof and moisture permeable fabric. The placement method is to heat and melt PP or PE or PU or EVA or foamed PP or foamed PE or foamed PU or foamed EVA by means of an injection molding machine before filling into a roller body that has through-holes opened at the periphery, when the roller body rotates, drops of the above material fall on the first nonwoven fabric 11 and form elastic protrusions 21 on the first nonwoven fabric 11 after cooling. Step 3: The fabric 1 stands until the elastic protrusions 21 cool down and are cured and attached on the waterproof and moisture permeable fabric 1. The three-dimensional waterproof and moisture permeable fabric prepared here is the composite material of the waterproof and moisture permeable fabric shown in Embodiment FIG. 13.

Embodiment 5

An exterior wall structure, as shown in FIG. 15, comprising an interior wall panel 41 and an exterior wall panel 42 (e.g., an outer wall), wherein the interior wall panel 41 and the exterior wall panel 42 are both made of wood panels. Attach the three-dimensional waterproof and moisture permeable fabric from FIG. 13 on the surfaces of the interior wall panel 41 or of the exterior wall panel 42 with the elastic protrusions 21 facing toward the exterior wall panel 42. Fix the three-dimensional waterproof and moisture permeable fabric on the interior wall panel 41 by means of airgun nails, and then fix the exterior wall panel 42 on the three-dimensional waterproof and moisture permeable fabric to form a clearance layer 2 (e.g., an air duct including drain channels therein) in between the interior wall panel 41 and the exterior wall panel 42.

Embodiment 6

Figure 16:
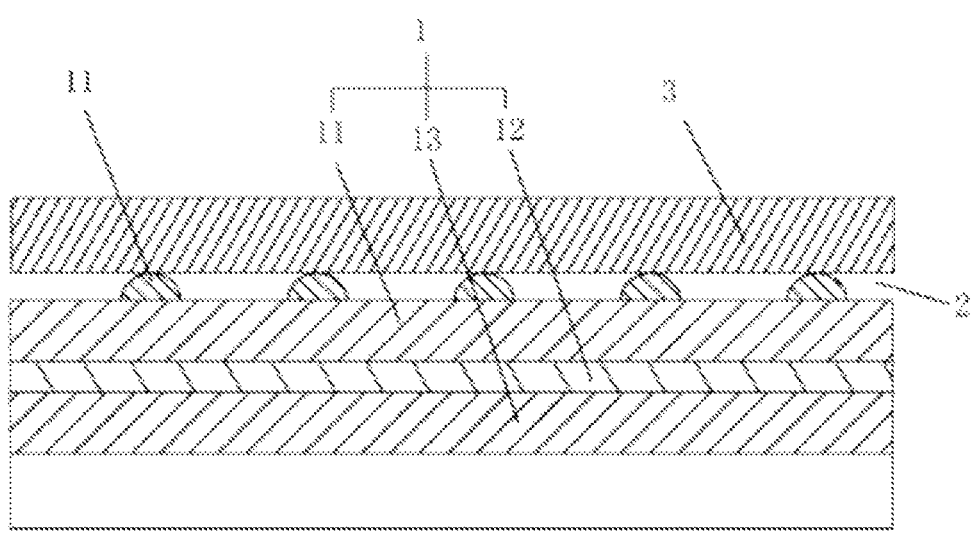
FIG. 16 is another sectional view of the draining construction structure including a pliable moisture permeable layer.
Figure 17:
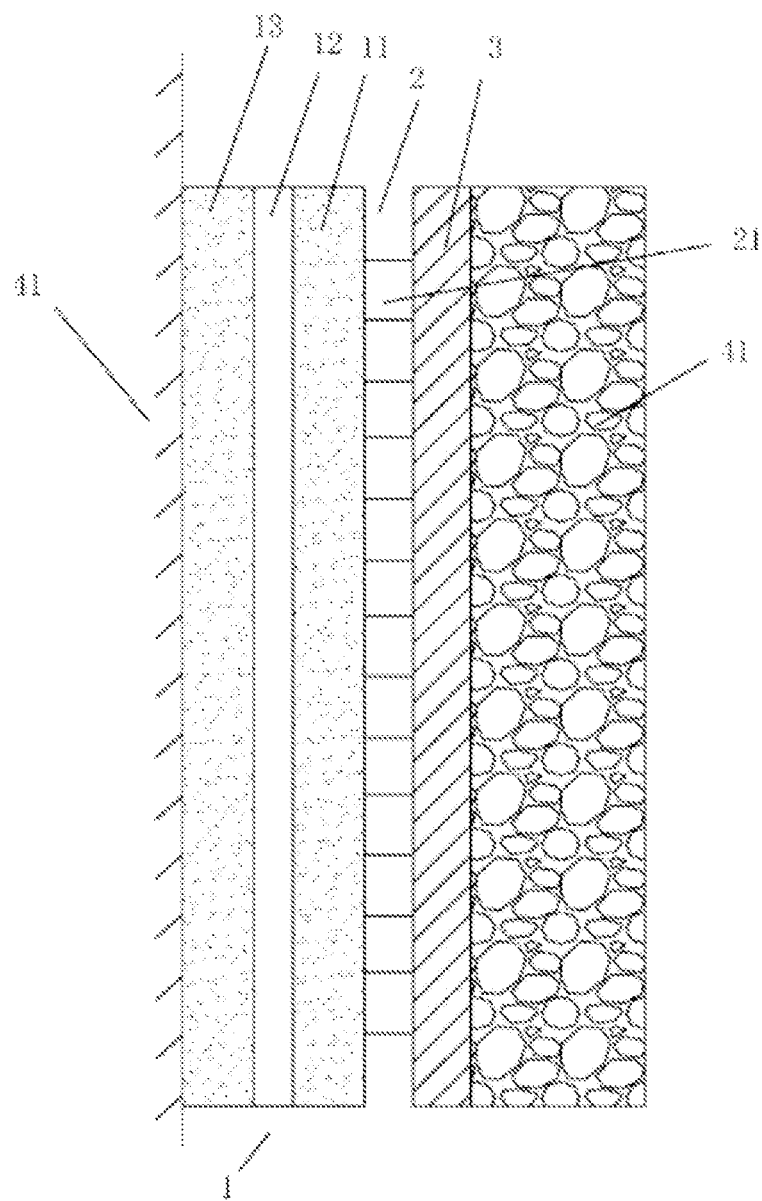
FIG. 17 is another sectional view of the draining construction structure of FIG. 5B.
Figure 18:
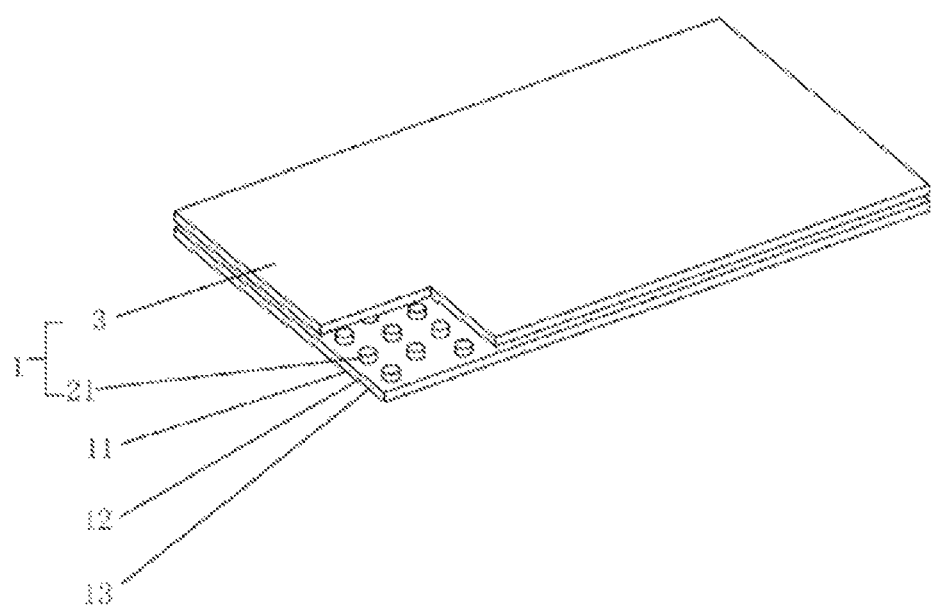
FIG. 18 is another perspective view of the draining construction structure of FIG. 5A.

A three-dimensional waterproof and moisture permeable fabric, as shown in FIGS. 16 and 17, which comprises sequentially, from the bottom to top, a waterproof and moisture permeable fabric 1, a clearance layer 2 and a protection layer 3. In the example shown in FIG. 16 the waterproof and moisture permeable fabric 1 includes three layers: a first nonwoven fabric layer 11, a waterproof and moisture permeable functional layer 12 and a second nonwoven fabric layer 13. In one example, the thickness ratio of the first nonwoven fabric layer 11 versus the waterproof and moisture permeable functional layer 12 versus the second nonwoven fabric layer 13 is 5:2:3. The waterproof and moisture permeable functional layer 12 can be made from materials such as PE or TPU. The clearance layer 2 includes a plurality of elastic protrusions 21 (e.g., support struts) made from polymers with certain elasticity. The elastic protrusions include thicknesses of 2 millimeters-10 millimeters or more. One end of the elastic protrusions 21 is fixed on the first nonwoven fabric layer 13 including a nonwoven fabric. The clearance layer 2 is between the waterproof and moisture permeable fabric 1 and the protection layer 3, and spaces the layers 1, 3 by the thicknesses of the elastic protrusions 21.

Embodiment 7

A production method for the three-dimensional waterproof and moisture permeable fabric as shown in FIG. 17 includes: Step 1: fix the waterproof and moisture permeable fabric 1 and level the surface. Step 2: melt the elastic protrusions 21 (e.g., the support struts) by means of hot stamping until the surface is adhesive. Step 3: fix the adhesive side of the elastic protrusions 21 obtained in step 2 on the surface of the waterproof and moisture permeable fabric 1. Step 4: continue to heat the elastic protrusions 21 at the side away (or remote) from the waterproof and moisture permeable fabric 1 until it is adhesive (at or above one or more of the glass transition or melting temperatures). Step 5: place and fix the protection layer 3 on the surface of the elastic protrusions 21 to complete the production of the three-dimensional waterproof and moisture permeable fabric (see FIG. 17).

In one example, the fabric 1 (e.g., a draining construction wrap) is coupled along an interior wall panel 41 as in FIG. 17. The three-dimensional waterproof and moisture permeable fabric described herein (see FIG. 17) is coupled along the interior wall panel 41, and a metal screen is fixed on the surface of the protection layer 3. Stucco is plastered on the metal screen to form a composite wall assembly including the metal screen and concrete.

Figure 19:
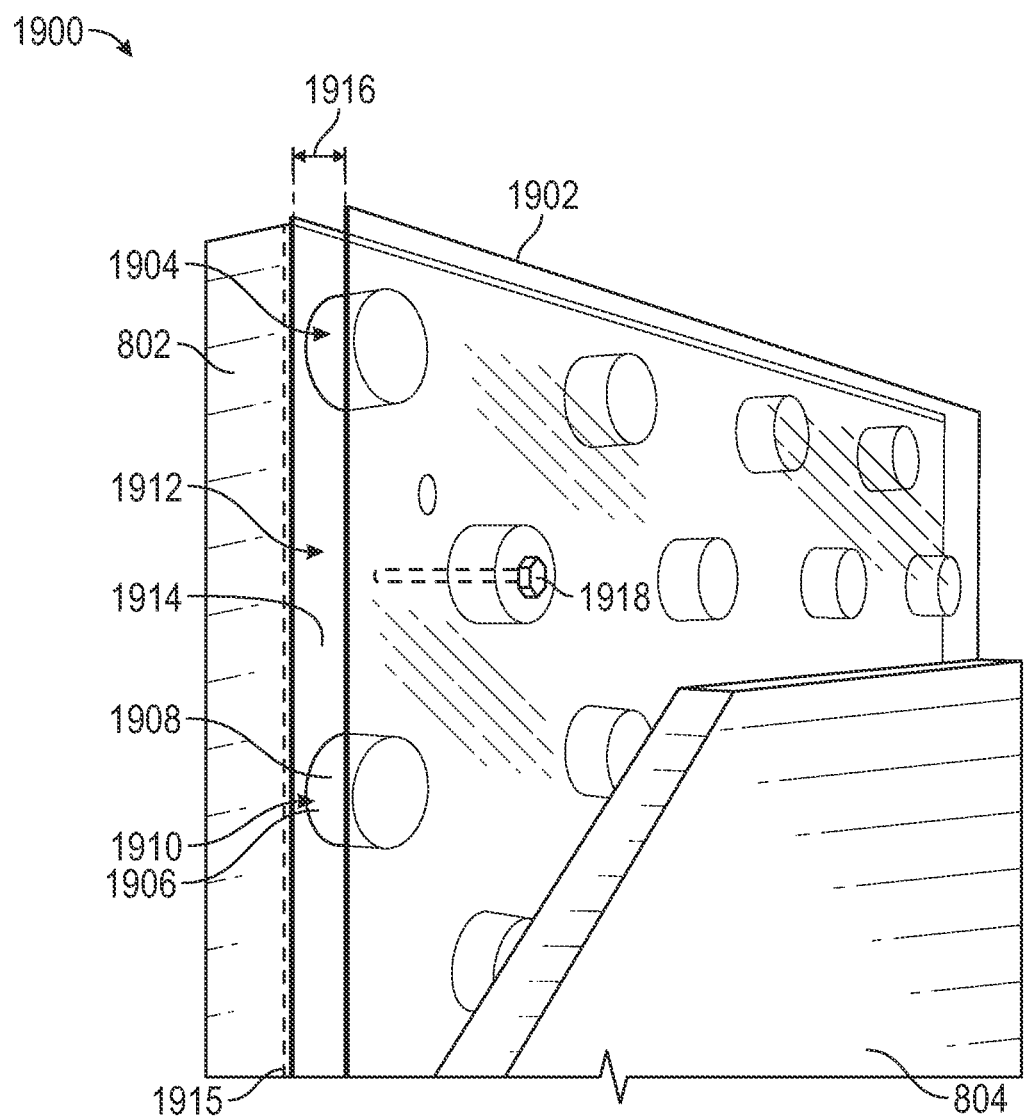
FIG. 19 is a perspective view of an additional example of a draining construction structure.

FIG. 19 is perspective view of another example of a draining construction structure 1900. The draining construction structure 1900 includes one or more of a pliable draining construction wrap having the drainage framework 1904 (described herein) or a panel including the framework 1904. As shown in FIG. 19, the draining construction structure 1900 includes a pliable moisture permeable layer 1902 including, but not limited to, a fabric, nonwoven material, mesh material or the like. In one example, the pliable moisture permeable layer 1902 permits the ingress of moisture (e.g., from or through the outer wall 804) to the drainage framework 1904 to divert moisture (vertically) from the outer wall 804 and the inner wall 802.

The drainage framework 1904 is coupled with the pliable moisture permeable layer 1902. The framework 1904 includes a plurality of support struts 1906 extending from the pliable moisture permeable layer 1902. As shown in FIG. 19, the support struts 1906 include strut bodies (e.g., polymer, foamed polymer or the like) extending from the layer 1902 to strut support faces 1910. The strut support faces 1910 are configured for coupling with the inner wall 802 (an example of a structural panel). As previously described herein, the inner wall 802 includes, but is not limited to, structural panels and sheets such as oriented strand board (OSB), sealed OSB, plywood, wood, gypsum board, composite (e.g., fiberglass, fiber cement or the like), stone (such as granite), concrete, prestressed concrete, metals, polymers or the like. As further shown in FIG. 19, the plurality of support struts 1906 space the pliable moisture permeable layer 1902 from the inner wall 1902 with a strut gap 1916 corresponding to a length of the struts 1906. For instance, the plurality of support struts 1906 (e.g., a polymer, foamed polymer or the like) brace the pliable moisture permeable layer away from the inner wall 802 according to the strut gap 1916.

Optionally, a pliable layer 1914 is interposed between the plurality of support struts 1906 and the inner wall 802, for instance along the strut support faces 1910. The pliable layer 1914 cooperates with the pliable moisture permeable layer 1902 described herein to capture the support struts 1906 therebetween and maintain the struts in a specified pattern, avoid decoupling and breaking or the like. The pliable layer 1914 and the pliable moisture permeable layer 1902 provide a pliable substrate that supports the (more rigid) support struts 1906 and facilitates folding, shaping and profiling of the draining construction structure 1900 to conform with corresponding features on a building such as corners, recesses or the like).

In one example, the pliable layer 1914 includes a pliable moisture impermeable layer as previously described herein. The moisture impermeable layer 1914 minimizes (e.g., reduces or eliminates) the ingress of moisture through the layer, for instance to the underlying inner wall 802. For instance, the moisture impermeable layer 1914 has a decreased permeability to moisture in comparison to the moisture permeable layer 1902. The decreased permeability sheds moisture that otherwise penetrates through the layer 1914 while optionally allowing breathing through the layer 1914, for instance to evaporate or diffuse incidental moisture along the underlying inner wall 802.

In another example, the pliable layer 1914 includes a pliable moisture permeable layer including, but not limited to, a fabric, nonwoven material, mesh material or the like. The inner wall 802, such as a sealed inner wall panel (e.g., sealed OSB) having an impermeable film, coating or membrane minimizes the ingress of moisture to the wall material and the interior of the building. Accordingly, the pliable moisture permeable layer of the draining construction structure 1900 facilitate ventilation (e.g., breathing) through the layer, for instance to dry the sealed surface of the inner wall 802.

The drainage framework 1904 including the plurality of support struts 1906 diverts moisture through the drain channels 1912 according to the strut gap 1916 between the pliable moisture permeable layer 1902 (and proximate outer wall 804) braced with the struts 1906 and the inner wall 802 (and optional pliable layer 1914). In the example including a pliable moisture permeable layer 1914 the permeable layer facilitates the ventilation, diffusion and evaporation of moisture proximate to the inner wall 802.

In another example, the draining construction structure 1900 is a panel assembly including the inner wall 802. For instance, the inner wall 802, such as one or more of OSB, scaled OSB, plywood, wood, gypsum board, composite (e.g., fiberglass, fiber cement or the like), stone (such as granite), concrete, prestressed concrete, metals, polymers or the like. The drainage framework 1904 and the pliable moisture permeable layer 1902 are preinstalled to the wall. The inner wall 802 is optionally impermeable (e.g., resistant to moisture ingress) through one or more of a film, coating or a membrane, herein a seal 1915 shown in broken lines in FIG. 19. For instance, the structural panel, such as inner wall 902, includes a structural component layer (OSB, plywood, composites, metals, polymers or the like as described herein) and a moisture impermeable component layer (the seal 1915). In another example, the inner wall 802 is impermeable because of the interposing pliable layer 1914, such as an impermeable pliable layer. Optionally, the impermeable pliable layer is relatively less permeable than the permeable layer 1902 to minimize the ingress of moisture (compared to the permeable layer 1902).

The draining construction structure 1900, in this example an assembly including the inner wall 802 (an example of a structural panel) and the drainage framework 1904, is readily installed to a building in a minimal number of steps. Instead of installing the inner wall and then separately applying, fastening, taping, adhering or the like a moisture diverting feature (e.g., construction wrap or the like), the draining construction structure 1900 is installed as a consolidated structural panel unit including the inner wall 802 and the preinstalled drainage framework 1904. Accordingly, the installation of the draining construction structure 1900, in this example, installs the inner wall 802 and the drainage framework 1904 at the same time and avoids added labor and time otherwise used with the separate application of a construction wrap.

Optionally, the drainage framework 1904 and the pliable moisture permeable layer 1902 are coupled with the inner wall 802 with one or more fasteners including, but not limited to, adhesives, welds, tacks, nails, screws or the like. For example, fasteners 1918 shown in FIG. 19 extend through one or more (including all or a subset) of the support struts 1906 to couple the drainage frame work 1904, the layer 1902 and the inner wall 802 together as a composite assembly. In still other examples, the fastener includes an adhesive, weld or other intermediate between the plurality of support struts (or the pliable layer 1914) and the inner wall 802.

Figure 20:
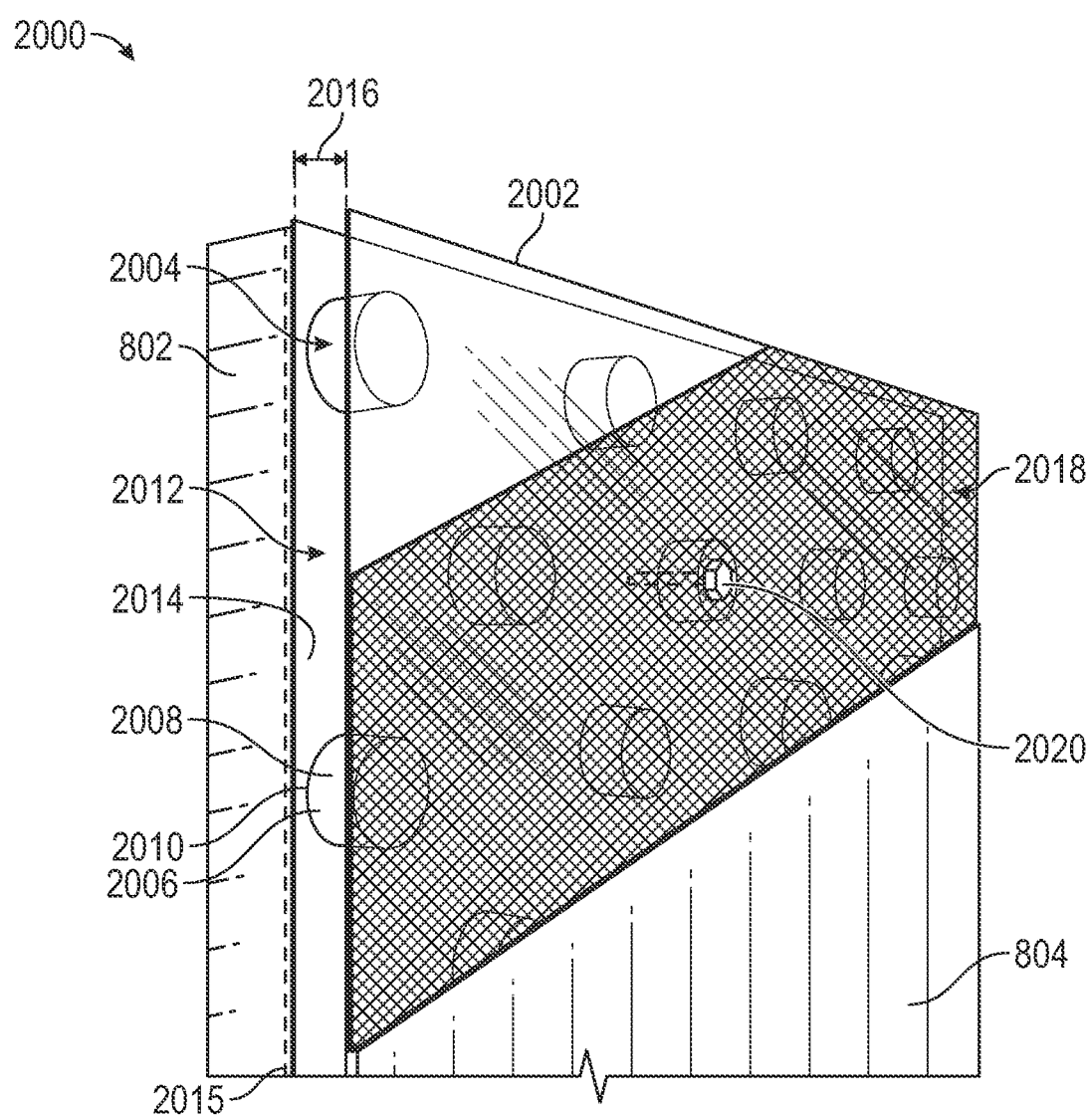
FIG. 20 is a perspective view of an example draining construction structure including a lath membrane.

FIG. 20 is perspective view of another example of a draining construction structure 2000. Like the draining construction structure 1900 shown in FIG. 19, the structure 2000 includes one or more of a pliable draining construction wrap having the drainage framework 2004 (described herein) or a panel, such as the inner wall 802 including the framework 2004. As shown in FIG. 20, the draining construction structure 2000 includes a pliable moisture permeable layer 2002 including, but not limited to, a fabric, nonwoven material, mesh material or the like. The pliable moisture permeable layer 2002 permits the ingress of moisture (e.g., from or through the outer wall 804) to the drainage framework 1904 to divert moisture (vertically) from the outer wall 804 and the inner wall 802.

The drainage framework 2004 is similar in some regards to the framework 1904 previously described herein (as well as the other example frameworks). The drainage framework 2004 includes a plurality of support struts 2006 extending from the pliable moisture permeable layer 2002. As shown in FIG. 20, the support struts 2006 include strut bodies (e.g., polymer, foamed polymer or the like) extending from the layer 2002 to strut support faces 2010. The strut support faces 2010 are configured for coupling with the inner wall 802 directly or indirectly (e.g., with an optional intervening permeable or impermeable pliable layer 2014). The plurality of support struts 2006 brace the pliable moisture permeable layer 2002 at a location spaced from the inner wall 2002 with a strut gap 2016 corresponding to a length of the struts 2006.

Optionally, a pliable layer 2014 is interposed between the plurality of support struts 2006 and the inner wall 802, for instance along the strut support faces 2010. The pliable layer 2014 cooperates with the pliable moisture permeable layer 2002 described herein to capture the support struts 2006 there between and maintain the struts in a specified pattern, avoid decoupling and breaking or the like.

In one example, the pliable layer 2014 includes a pliable moisture impermeable layer as previously described herein. The moisture impermeable layer 2014 minimizes (e.g., reduces or eliminates) the ingress of moisture through the layer, for instance to the underlying inner wall 802. The moisture impermeable layer 2014 has a lower permeability than the layer 2002 and accordingly interrupts the passage of moisture from the exterior toward the interior of the draining construction structure 2000. The moisture impermeable layer 2014 optionally retains some permeability to facilitate ventilation (e.g., breathing) through the layer 2014 and drying of the underlying inner wall 802.

In another example, the pliable layer 2014 includes a pliable moisture permeable layer including, but not limited to, a fabric, nonwoven material, mesh material or the like. The inner wall 802, such as a sealed structural panel or the like (e.g., sealed OSB, plywood, wood, gypsum board, composite, stone, concrete, prestressed concrete, metals, polymers or the like) having an impermeable (including moisture resistant) film, coating or membrane minimizes the ingress of moisture to the wall material and the interior of the building to facilitate the use of the permeable layer (e.g., element 2014). The drainage framework 2004 including the plurality of support struts 2006 diverts moisture through the drain channels 2012 according to the strut gap 2016 between the pliable moisture permeable layer 2002 and the inner wall 802 (and optional pliable layer 2014). In the example including a pliable moisture permeable layer 2014 the porous permeable layer facilitates the ventilation and evaporation of moisture proximate to the inner wall 802.

As further shown in FIG. 20, the draining construction structure 2000 includes a lath membrane 2018 coupled along the drainage framework 2004. In the example shown, the lath membrane 2018 is coupled along an exterior surface of the pliable moisture permeable layer 2002 (the support struts 2006 are coupled with the interior surface of the layer 2002). The lath membrane 2018 includes a mesh (polymer, metal or composite), substrate or the like configured to capture stucco, mud or plaster along the outer wall 804 during application. The lath membrane 2018 is porous, and includes one or more of a wire mesh, fabric mesh, fiberglass mesh, boarded substrate or the like (e.g., herein a lath mesh). Optionally, the lath membrane 2018 and the pliable moisture permeable layer 2002 cooperate to enhance adhesion of stucco, mud or plaster with the draining construction structure 2000. For instance, the pores of the pliable moisture permeable layer 2002 and the lath mesh of the lath membrane 2018 cooperate to capture the stucco, mud or plaster.

As shown in FIG. 20, the lath membrane 2018 is coupled along the pliable moisture permeable layer 2002. For example, the lath membrane 2018 is coupled to the remainder of the draining construction structure 2000 with one or more fasteners 2020 including, but not limited to, tacks, nails, screws, cleats, adhesives, welds or the like. Optionally, the lath membrane 2018 includes cleats (barbed feet, projections or the like) along one or more faces to facilitate coupling with the plurality of support struts 2006. As previously described herein the support struts 2006 are, in some examples, configured for minimal deformation (e.g., to absorb shock loading during installation). In another example, the cleats of the lath membrane 2018 readily pierce the pliable moisture permeable layer 2002 and the support struts 2006, and the cleats seat therein to reliably hold the lath membrane 2018 along the support struts 2006.

Optionally, the draining construction structure 2000 is an assembly including the inner wall 802 (an example of a structural panel). For instance, the inner wall 802, includes one or more structural panels such as OSB, plywood, gypsum board, sealed OSB or the like having the drainage framework 2004, the pliable moisture permeable layer 2002 and the lath membrane 2018 preinstalled to the structural panel. Optionally, the inner wall 802 is impermeable because of one or more of a film, coating or membrane (e.g., a seal 2015 shown in broken lines in FIG. 20) along the inner wall 802. For instance, the structural panel, such as inner wall 902, includes a structural component layer (OSB, plywood or the like) and a moisture impermeable component layer (the seal 2015). In another example, the pliable layer 2014 is moisture impermeable (e.g., has less permeability than the permeable layer 2002) and accordingly resists moisture ingress to the inner wall 802.

The draining construction structure 2000, in this example an assembly of the inner wall 802 as a structural panel and the drainage framework 1904, is readily installed to a building in a minimal number of steps. Instead of installing the inner wall and then separately applying, fastening, taping or adhering a moisture diverting feature (e.g., construction wrap or the like) and a separate lath membrane, the draining construction structure 2000 is installed as a consolidated unit including the inner wall 802 and the preinstalled drainage framework 2004. Accordingly, the installation of the draining construction structure 2000, in this example, installs the inner wall 802, the drainage framework 2004 and the lath membrane 2018 at the same time and avoids added labor and time otherwise used with the separate applications of construction wrap and a lath membrane.

Optionally, the drainage framework 2004 and the pliable moisture permeable layer 2002 and the lath membrane 2018 are coupled with the inner wall 802 with one or more fasteners including, but not limited to, adhesives, welds, tacks, nails, screws or the like. For example, fasteners 2020 shown in FIG. 19 extend through one or more (including all or a subset) of the support struts 2006 to couple the drainage framework 2004, the layer 2002, the lath membrane 2018 and the inner wall 802 together and optionally the pliable layer 2014 (if included) as a composite assembly. In still other examples, the fastener includes an adhesive, weld or other intermediate between the plurality of support struts (or the pliable layer 1914) and the inner wall 802.

FIGS. 21A, B show another example a draining construction structure 2100 including a lath membrane 2128. In this example, the draining construction structure 2100 includes a pliable moisture impermeable layer 2102, a drainage framework 2104, a pliable moisture permeable layer 2111 (such as a cloth or nonwoven material having increased permeability relative to the layer 2102) and the lath membrane 2128 coupled along the layer 2111. Optionally, the moisture permeable layer 2111 is omitted in other examples, and the lath membrane 2128 is directly coupled along the drainage framework 2104. FIG. 21B illustrates the draining construction structure in a folded configuration showing the lath membrane 2128 along an exterior surface 2118 (e.g., directed outward from the building) and the pliable moisture impermeable layer 2102 along an interior surface 2116 of the draining construction structure 2100 (e.g., directed inward toward the building).

In the example shown in FIG. 21A the pliable moisture impermeable layer 2102 is a composite layer including one or more component layers. For instance, a moisture impermeable component layer 2110 is optionally layered with one or more nonwoven component layers 2112, 2114. As shown in FIG. 21A the impermeable component layer 2110 is in this example interposed between opposed nonwoven component layers 2112, 2114. The moisture impermeable component layer 2110 is resistant to moisture penetration (e.g., has a greater impermeability or lesser permeability than the pliable moisture permeable layer 2111) and retains moisture within the drainage framework 2104 for draining and ventilation therein.

As with the previously described structures (e.g., wraps, panels or the like) the draining construction structure 2100 includes a drainage framework 2104 including a plurality of support struts 2106 that space the lath membrane 2128 from the remainder of the structure 2100 and an underlying inner wall (e.g., like the inner wall 802 in FIG. 20). As shown in FIG. 21A the support struts 2106 space the lath membrane 2128 according to a strut gap 2120 corresponding to a dimension of the struts 2106, such as the length of the strut body 2122 extending between a strut support face 2126 to the base strut portion 2124 coupled with the pliable moisture impermeable layer 2102. Drain channels 2108 extend between the support struts 2106 to facilitate drainage of moisture and ventilation while minimizing infiltration of moisture beyond the moisture impermeable layer 2102, for instance to the inner wall 802.

The lath membrane 2128 includes, but is not limited to, a mesh (polymer, metal or composite), substrate or the like configured to capture stucco, mud or plaster along the outer wall 804 during application. The lath membrane 2018 is porous, and includes one or more of a wire mesh, fabric mesh, fiberglass mesh, boarded substrate or the like (e.g., herein a lath mesh). Optionally, the lath membrane 2018 and the pliable moisture permeable layer 2002 cooperate to enhance adhesion of stucco, mud or plaster with the draining construction structure 2000. For instance, the pores of the pliable moisture permeable layer 2002 and the lath mesh of the lath membrane 2018 cooperate to capture the stucco, mud or plaster while at the same time minimizing (e.g., reducing or eliminating) the ingress of these materials into the drainage framework 2104. Accordingly, the drainage framework 2104 remains 'open' after the application and setting of these materials and facilitates drainage and ventilation.

Figure 22B:
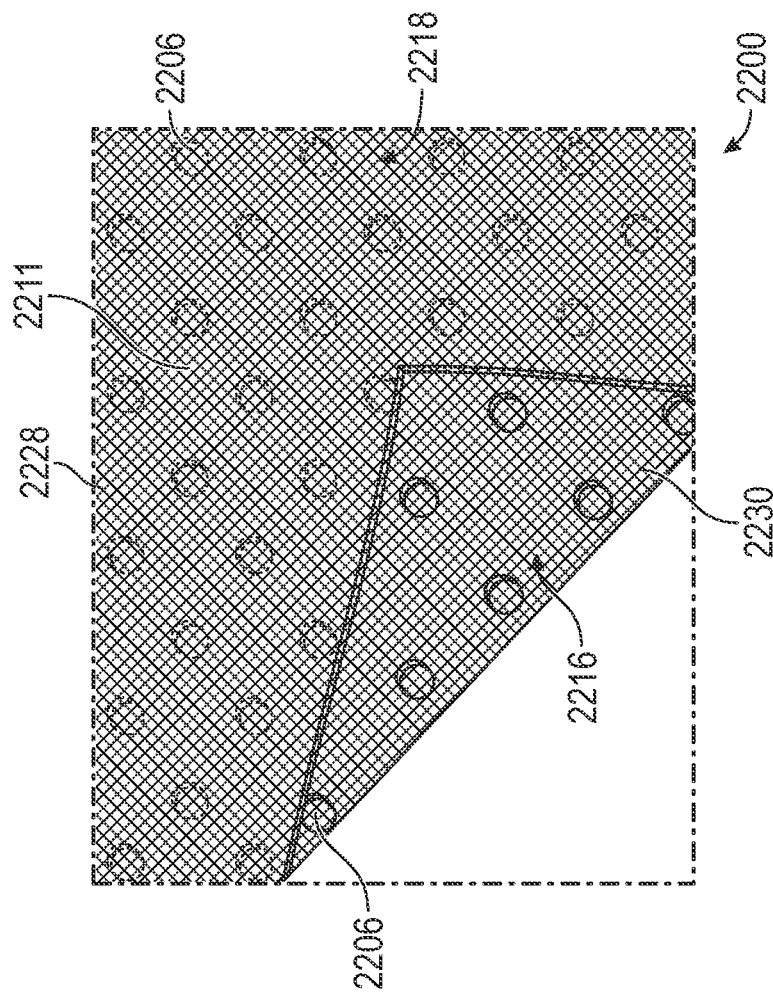
FIG. 22B is a perspective view of the draining construction structure of FIG. 22A partially reversed to show exterior and interior surfaces.
Figure 22A:
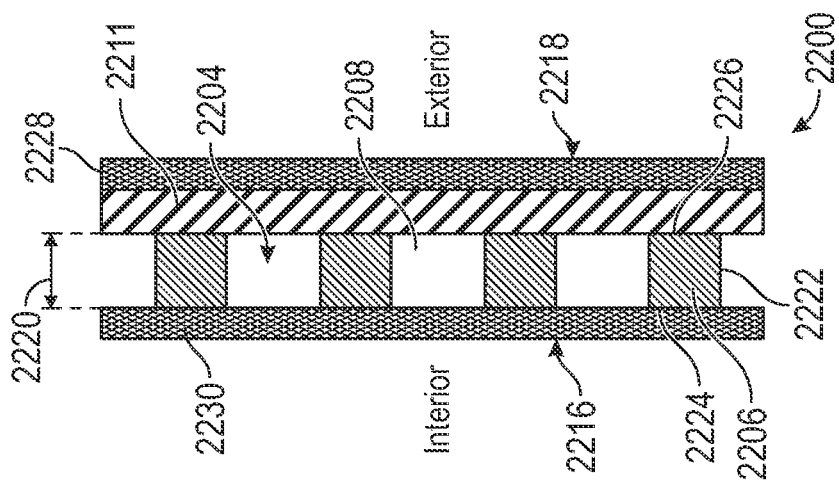
FIG. 22A is schematic cross sectional view of an additional example of a draining construction structure including a lath membrane.

FIGS. 22A, B show another example a draining construction structure 2200 including lath membranes 2228, 2230. In this example, the draining construction structure 2200 includes a drainage framework 2204 having a plurality of support struts 2206 interposed between the lath membrane 2230 along an interior surface 2216 (e.g., directed inwardly toward a building) and the lath membrane 2228 along an exterior surface 2218 (e.g., directed outwardly, for instance toward a cladding material, such as stucco). FIG. 22B illustrates the draining construction structure 2200 in a partially folded configuration showing the lath membrane 2228 along the exterior surface 2218 and the lath membrane 2230 along an interior surface 2216. Each of the lath membranes 2228, 2230 are pliable and retain the support struts 2206 of the drainage framework 2204 there between. For example, the lath membranes 2228, 2230 include, but are not limited to, fiberglass lath, polymer lath, wire lath or the like.

In the example shown in FIG. 22A a pliable moisture permeable layer 2211 is coupled along the support struts 2206 of the drainage framework 2204. The permeable layer 2211 provides an optional interface between the lath membrane 2228 and the drainage framework 2204. In various examples, the permeable layer 2211 is constructed with a cloth, nonwoven material or the like that facilitates the passage of moisture into the drainage framework 2204 while at the same time maintaining the drain channels 2208 of the framework open for moisture diversion.

For instance, the permeable layer 2211 intercepts liquid building materials including, but not limited to, stucco, mud, plaster or the like and minimizes ingress of these materials into the drainage framework 2204. The pliable moisture permeable layer 2211 is coupled with one or more of the drainage framework 2204 and the lath membrane 2228 with adhesives, fasteners, welds or the like. In another example, fasteners (e.g., like the fastener 2020 shown in FIG. 20) extend through the various layers of the draining construction structure 2200 to couple the lath membrane 2228 with the pliable moisture permeable layer 2211, the drainage framework 2204 and optionally the lath membrane 2230 along the interior surface 2216.

As previously described, the lath membrane 2230 is provided along the interior surface 2216. In one example, the lath membrane 2230 is the interface between the draining construction structure 2200 and a building surface, such as the inner wall 802 shown in FIG. 20. The lath membrane 2230 is coupled with the inner wall 802 with one or more adhesives, fasteners, welds or muds. In an example including a mud or adhesive, the mud or adhesive is applied along the inner wall 802 and the draining construction structure 2200 is installed on the inner wall 802. The mud or adhesive infiltrates the lath membrane 2230 and then sets to retain the structure 2200 in the coupled configuration along the wall.

In another example, the lath membrane 2230 is included with the draining construction structure 2200 to provide a supporting substrate for the structure 2200 and the support struts 2206. The lath membrane 2230 provides a substrate that carries the support struts 2206 and is more resistant to folding, creasing or the like (e.g., with the pliable moisture permeable layer 2311) that otherwise may cause decoupling of the support struts 2206 from the structure 2200 while also providing moderate pliability to facilitate contouring of the structure 2220 for installation (e.g., around and into rough openings, along corners or the like). Instead, the lath membrane 2230 supports the struts 2206 and maintains their arrangement and coupling with the remainder of the draining construction structure 2200 during storage and installation.

As with the previously described structures (e.g., wraps, panels or the like) the draining construction structure 2200 includes a drainage framework 2204 including a plurality of support struts 2206 that space the lath membrane 2228 (and the optional pliable moisture permeable layer 2211) from the remainder of the structure 2200 and an underlying inner wall (e.g., like the inner wall 802 in FIG. 20). As shown in FIG. 22A the support struts 2206 space the lath membrane 2228 according to a strut gap 2220 corresponding to a dimension of the struts 2206, such as the length of the strut body 2222 extending between a strut support face 2226 (proximate the lath membrane 2228) to the base strut portion 2224 coupled with the lath membrane 2230. Drain channels 2208 extend between the support struts 2206 to facilitate drainage of moisture and ventilation while minimizing infiltration of moisture to the inner wall 802.

FIGS. 23A, B show another example of a draining construction structure 2300 a lath membrane 2330. In this example, the lath membrane 2330 is provided along an interior surface 2316 of the draining construction structure 2300. The draining construction structure 2300 includes a drainage framework 2304 having a plurality of support struts 2306 interposed between the lath membrane 2330 along the interior surface 2216 (e.g., directed inwardly toward a building) and a pliable moisture permeable layer 2311 along an exterior surface 2318 (e.g., directed outwardly, for instance toward a cladding material, such as stucco). FIG. 23B illustrates the draining construction structure 2300 in a partially folded configuration showing the pliable moisture permeable layer 2311 along the exterior surface 2318 and the lath membrane 2330 along an interior surface 2316. Each of the lath membrane 2330 and the pliable moisture permeable layer 2311 are pliable and retain the support struts 2306 of the drainage framework 2204 there between. For example, the lath membrane 2330 includes but is not limited to, fiberglass lath, polymer lath, wire lath or the like that provide some measure of pliability to the draining construction structure 2300 (e.g., for shaping of the structure to confirm with profiles, corners and contours of a wall or building material).

In the example shown in FIG. 23A the pliable moisture permeable layer 2311 is coupled along the support struts 2306 of the drainage framework 2204. The permeable layer 2311 isolates the drainage framework 2304 from building materials, such as stucco, mortar, mud or the like applied along the exterior surface 2318 of the draining construction structure 2300. In various examples, the permeable layer 2311 is constructed with a cloth, nonwoven material or the like that facilitates the passage of moisture into the drainage framework 2304 while at the same time maintaining the drain channels 2308 of the framework open for moisture diversion. For instance, the permeable layer 2311 intercepts liquid building materials including, but not limited to, stucco, mud, plaster or the like and minimizes ingress of these materials into the drainage framework 2304. The pliable moisture permeable layer 2311 is coupled with the drainage framework 2304 with one or more of adhesives, fasteners, welds or the like. In another example, fasteners (e.g., like the fastener 2020 shown in FIG. 20) extend through the various layers of the draining construction structure 2300 to couple the pliable moisture permeable layer 2311 with the drainage framework 2304 and optionally the lath membrane 2330 along the interior surface 2316.

As previously described, the lath membrane 2330 is provided along the interior surface 2316. In one example, the lath membrane 2330 is the interface between the draining construction structure 2300 and a building surface, such as the inner wall 802 shown in FIG. 20. The lath membrane 2330 is coupled with the inner wall 802 with one or more adhesives, fasteners, welds or muds. In an example including a mud or adhesive, the mud or adhesive is applied along the inner wall 802 and the draining construction structure 2300 is installed on the inner wall 802. The mud or adhesive infiltrates the lath membrane 2330 and then sets to retain the structure 2300 in the coupled configuration along the wall.

In another example, the lath membrane 2330 is included with the draining construction structure 2300 to provide a supporting substrate for the structure 2300 and the support struts 2306. The lath membrane 2330 provides a substrate that carries the support struts 2306 and is more resistant to decoupling of the support struts 2306 from the structure 2300 because the lath membrane 2330 is more robust (e.g., more rigid than the layer 2311) and maintains surface to surface contact between the struts 2306 and the structure 2300. Instead, the lath membrane 2330 supports the struts 2306 and maintains their arrangement and coupling with the remainder of the draining construction structure 2300 while at the same time maintaining pliability of the draining construction structure 2300, for instance for shaping to comply with corners, contours or the like of a building.

As with the previously described structures (e.g., wraps, panels or the like) the draining construction structure 2300 includes a drainage framework 2304 including a plurality of support struts 2306 that space the pliable moisture permeable layer 2311 from the remainder of the structure 2300, such as the lath membrane 2330, and an underlying inner wall (e.g., like the inner wall 802 in FIG. 20). As shown in FIG. 23A the support struts 2306 space the lath membrane 2330 and the pliable moisture permeable layer 2311 according to a strut gap 2320 corresponding to a dimension of the struts 2306, such as the length of the strut body 2322 extending between a strut support face 2326 (proximate the pliable moisture permeable layer 2311) to the base strut portion 2324 coupled with the lath membrane 2330. Drain channels 2308 extend between the support struts 2306 to facilitate drainage of moisture and ventilation while minimizing infiltration of moisture to the inner wall 802.

FIGS. 24A, B show another example of a draining construction structure 2400. In this example, a lath membrane 2430 and an optional adhesive 2402 are provided along an interior surface 2416 of the draining construction structure 2400. The draining construction structure 2400 includes a drainage framework 2404 having a plurality of support struts 2406 interposed between the lath membrane 2430 along the interior surface 2216 (e.g., directed inwardly toward a building) and a pliable moisture permeable layer 2411 along an exterior surface 2418 (e.g., directed outwardly, for instance toward a cladding material, such as stucco). FIG. 24B illustrates the draining construction structure 2400 in a partially folded configuration showing the pliable moisture permeable layer 2411 along the exterior surface 2418 and the lath membrane 2430 along an interior surface 2416. Each of the lath membrane 2430 and the pliable moisture permeable layer 2411 are pliable and retain the support struts 2406 of the drainage framework 2204 there between.

In the examples shown in FIGS. 24A, B the draining construction structure 2400 is optionally provided as a furring strip for installation along a building to provide spacing between the building, such as an inner wall 802, and a cladding or other fascia provided over the structure 2400. In another example, the draining construction structure 2400 is installed with supplemental structures, for instance in a staggered manner with the draining construction structure 2400 bridging the seams between other structural panels, such as, draining construction structures described herein, OSB, sealed OSB, plywood, wood, gypsum board, composite (e.g., fiberglass, fiber cement or the like), stone (such as granite), concrete, prestressed concrete, metals, polymers or the like.

The draining constructions structure 2400 includes an optional adhesive 2402. The adhesive includes, but is not limited to, a double sided tape, contact cement, adhesive film, adhesive layer or the like provided along a surface of the structure 2400. As shown in FIG. 24A, in this example the adhesive 2402 is provided along the interior surface 2416. The adhesive 2402 facilitates installation of the draining construction structure 2400, for instance, along a building, seams or the like. Additionally, the adhesive 2402 allows for rapid installation of the draining construction structure that may be followed with other fasteners such as tacks, nails, screws or the like.

Referring again to FIG. 24A, a pliable moisture permeable layer 2411 is coupled along the support struts 2406 of the drainage framework 2404. The permeable layer 2411 isolates the drainage framework 2204 from building materials, such as stucco, mortar, mud or the like applied along the exterior surface 2418 of the draining construction structure 2400. In various examples, the permeable layer 2411 is constructed with a cloth, nonwoven material or the like that facilitates the passage of moisture into the drainage framework 2404 for drainage through the structure 2400. The pliable moisture permeable layer 2411 is coupled with the drainage framework 2404 with one or more of adhesives, fasteners, welds or the like. In another example, fasteners (e.g., like the fastener 2020 shown in FIG. 20) extend through the various layers of the draining construction structure 2400 to couple the pliable moisture permeable layer 2411 with the drainage framework 2404 and optionally the lath membrane 2430 along the interior surface 2416.

The lath membrane 2430 is optionally included with the draining construction structure 2400 to provide a supporting substrate for the structure 2400 and the support struts 2406. The lath membrane 2430 provides a substrate that carries the support struts 2406 and is more resistant to decoupling of the support struts 2406 from the structure 2400 because the lath membrane 2430 is more robust (e.g., more rigid than the layer 2411) and maintains surface to surface contact between the struts 2406 and the structure 2400. Instead, the lath membrane 2430 supports the struts 2406 and maintains their arrangement and coupling with the remainder of the draining construction structure 2400 while at the same time maintaining pliability of the draining construction structure 2400, for instance for shaping to comply with corners, contours or the like of a building. Additionally, the lath membrane 2430 maintains sufficient pliability for rolling of the draining construction structure 2400 (e.g., at manufacture, on-site for storage, or the like) without decoupling the support struts 2406 from the structure. Instead, the lath membrane 2430 and the pliable moisture permeable layer 2411 are stacked over the support struts 2406 and maintain surface to surface contact with the struts 2406 even while the structure 2400 is rolled (for storage, shipping or the like) and unrolled for installation.

As with the previously described structures (e.g., wraps, panels or the like) the draining construction structure 2400 includes a drainage framework 2404 including support struts 2406 that space the lath membrane 2430 from the pliable moisture permeable layer 2411. As shown in FIG. 24A the support struts 2406 space the lath membrane 2430 and the pliable moisture permeable layer 2411 according to a strut gap 2420 corresponding to a dimension of the struts 2406, such as the length of the strut body 2422 extending between a strut support face 2426 (proximate the pliable moisture permeable layer 2411) to the base strut portion 2424 coupled with the lath membrane 2430. Drain channels 2408 extend between the support struts 2406 to facilitate drainage of moisture and ventilation while minimizing infiltration of moisture to an inner wall, such as the 802 shown in FIGS. 2A, B.

FIGS. 25A, B show another example of a draining construction structure 2500. In this example, the structure 2500 includes a jacket 2511 configured to retain components of the structure 2500 in a specified arrangement. One example arrangement is shown in the schematic cross section of FIG. 25A. The draining construction structure 2500 includes a drainage framework 2504 within the jacket 2511. In this example, the jacket 2511 includes one or more jacket chambers 2513 separated with intervening portions of the pliable jacket 2511. The jacket chambers 2513 contain one or more components of the draining construction structure 2500. As shown in FIG. 25A, the example jacket 2511 includes three jacket chambers 2513 including the drainage framework 2504 and laths membranes 2528, 2530, respectively. In one example, the jacket 2511 is pliable and includes a permeable or impermeable material, such as cloth, nonwoven, fabric, polymer membrane or the like. Optionally, the materials are permeable or impermeable (e.g., resistant to moisture penetration or ingress). In an impermeable jacket 2511 the jacket material has a lower permeability than other materials described herein, such as cloth or nonwoven, and includes a moisture resistant construction or barrier, such as a film, coating or the like, that minimizes moisture ingress. In another example, the jacket 2511 has moderated pliability, and is constructed in strips or lineal pieces, and accordingly the draining construction structure 2500 is a strip or lineal assembly. Optionally, the jacket 2511 is constructed with one or more layers and the layers are assembled as a stack (with or without the lath membranes or drainage framework) and bonded along the edges of the structure, for instance with welds, heat staking, crimping, adhesives or the like.

The draining construction structure 2500 includes the drainage framework 2504, and in this example the framework 2504 is within one of the jacket chambers 2513. The drainage framework 2504 includes a plurality of support struts 2506 interposed between the lath membranes 2528, 2530. As shown the drainage framework 2504, in this example, is in a separated jacket chamber 2513 from the lath membranes 2528, 2530 and interposed between the respective chambers and membranes. The plurality of support struts 2506 extend between the interior surface 2216 (e.g., directed inwardly toward a building) and the exterior surface 2518 (e.g., directed outwardly, for instance toward a cladding material such as stucco). FIG. 25B illustrates the draining construction structure 2500 in a perspective view with the drainage framework 2504 enclosed within the jacket 2511. For instance, the support struts 2506 are coupled with opposed surfaces of the jacket 2511 within the jacket chamber 2513 (e.g., with adhesives, welds or the like). Optionally, the support struts 2506 are coupled with a panel, such as a sheet, membrane or the like, and the struts and panel are enclosed within the jacket chamber 2513.

As with the previously described structures (e.g., wraps, panels or the like) the support struts 2506 of the drainage framework 2504 space the layers of the draining construction structure 2500. As shown in FIG. 25A the support struts 2506 space the lath membranes 2528, 2530 with a strut gap 2520 corresponding to a dimension of the struts 2506, such as the length of the strut body 2522 extending between a strut support face 2526 (proximate the lath membrane 2528) coupled with a wall of the jacket chamber 2513 to the base strut portion 2524 coupled with the an opposed wall of the jacket chamber 2513. Drain channels 2508 extend between the support struts 2506 to facilitate drainage of moisture and ventilation while minimizing infiltration of moisture to an inner wall, such as the 802 shown in FIGS. 2A, B.

Referring again to FIG. 25A, lath membranes 2528, 2530 are included in jacket chambers 2513 of the structure 2500 proximate to the chamber including the drainage framework 2504. The lath membranes 2528, 2530, including lath mesh or similar components as well as deformable components that provide support to the draining construction structure 2500, are provided with the structure 2500 to brace the drainage framework 2504 and protect the framework from damage, including decoupling of the support struts 2506 from the jacket 2511 or from a panel within the jacket chamber 2513. For instance, the lath membranes 2528, 2530 are readily rolled during manufacturing, on-site or the like for storage or transport, and then unrolled during installation without decoupling the support struts 2506. The lath membranes 2528, 2530 (including other pliable sheets, panels, membranes or the like) maintains the support struts 2506 in a spaced arrangement to facilitate drainage while at the same time maintaining pliability of the draining construction structure 2500, for instance for shaping to comply with corners, contours or the like of a building.

In the examples shown in FIGS. 25A, B the draining construction structure 2500 is optionally provided as a furring strip for installation along a building to provide spacing between the building, such as an inner wall 802, and a cladding or other fascia provided over the structure 2500. In another example, the draining construction structure 2500 is installed with supplemental structures, for instance in a staggered manner with the draining construction structure 2500 bridging the seams between other construction structures, such as, draining construction structures described herein. OSB, sealed OSB, plywood, wood, gypsum board, composite (e.g., fiberglass, fiber cement or the like), stone (such as granite), concrete, prestressed concrete, metals, polymers or the like.

The draining constructions structure 2500 includes an optional adhesive 2502. The adhesive includes, but is not limited to, a double sided tape, contact cement, adhesive film, adhesive layer or the like provided along a surface of the structure 2500. As shown in FIG. 25A, in this example the adhesive 2502 is provided along the interior surface 2516. In another example, the adhesive 2502 is provided along the exterior surface 2518, both of the surfaces 2516, 2518, or is absent from the structure 2500. The adhesive 2502 facilitates installation of the draining construction structure 2500, for instance, along a building, seams or the like. Additionally, the adhesive 2502 allows for rapid installation of the draining construction structure that may be followed with other fasteners such as tacks, nails, screws or the like.

Various Notes and Aspects

Aspect 1 can include subject matter such as a draining construction structure comprising: a first layer configured for coupling with one or more of a building or an outer wall; a second layer configured for coupling with one or more of the building or the outer wall; and a drainage framework interposed between the first and second layers, the drainage framework includes: a plurality of support struts, each of the support struts includes a strut body extending between the first and second layers; drain channels between the support struts; and wherein the plurality of support struts brace the first layer away from the second layer with a strut gap.

Aspect 2 can include, or can optionally be combined with the subject matter of Aspect 1, to optionally include wherein one or more of the first or second layers includes a lath membrane configured for coupling with stucco, mud or plaster.

Aspect 3 can include, or can optionally be combined with the subject matter of one or any combination of Aspects 1 or 2 to optionally include wherein one or more of the first or second layers including the lath membrane includes a moisture permeable layer coupled with the lath membrane.

Aspect 4 can include, or can optionally be combined with the subject matter of one or any combination of Aspects 1-3 to optionally include wherein the strut bodies of the plurality of support struts are rigid relative to the first and second layers.

Aspect 5 can include, or can optionally be combined with the subject matter of one or any combination of Aspects 1-4 to optionally include wherein the plurality of support struts are in a pattern, and the plurality of support struts are captured between the first and second layers and maintained in the pattern.

Aspect 6 can include, or can optionally be combined with the subject matter of Aspects 1-5 to optionally include wherein one or more of the first or second layers includes a pliable moisture permeable layer configured to permit moisture ingress to the drainage framework.

Aspect 7 can include, or can optionally be combined with the subject matter of Aspects 1-6 to optionally include wherein one or more of the first or second layers includes a pliable moisture impermeable layer that is less permeable relative to the pliable moisture permeable layer and configured to resist moisture ingress through the pliable moisture impermeable layer.

Aspect 8 can include, or can optionally be combined with the subject matter of Aspects 1-7 to optionally include wherein one or more of the first or second layers includes a structural panel.

Aspect 9 can include, or can optionally be combined with the subject matter of Aspects 1-8 to optionally include wherein the structural panel includes a sealed wall panel having a moisture impermeable layer interposed between the drainage framework and the remainder of the inner wall panel.

Aspect 10 can include, or can optionally be combined with the subject matter of Aspects 1-9 to optionally include wherein the plurality of support struts include one or more of a polymer or a foamed polymer.

Aspect 11 can include, or can optionally be combined with the subject matter of Aspects 1-10 to optionally include wherein the first and second layers and the drainage framework are included in a construction wrap.

Aspect 12 can include, or can optionally be combined with the subject matter of Aspects 1-11 to optionally include a jacket including the first layer coupled with the second layer with one or more jacket chambers therebetween, and the drainage framework is within the one or more jacket chambers.

Aspect 13 can include, or can optionally be combined with the subject matter of Aspects 1-12 to optionally include wherein one or more of the first or second layers includes a fastener for coupling along one or more of the building or the outer wall.

Aspect 14 can include, or can optionally be combined with the subject matter of Aspects 1-13 to optionally include a draining construction structure comprising: a lath membrane; and a drainage framework coupled with the lath membrane, the drainage framework includes: a plurality of support struts, each of the support struts of the plurality of support struts extends from the lath membrane to respective strut support faces; drain channels between the support struts; and wherein the lath membrane is recessed from the strut support faces of the plurality of support struts with the plurality of support struts and drainage channels therebetween.

Aspect 15 can include, or can optionally be combined with the subject matter of Aspects 1-14 to optionally include wherein the lath membrane includes one or more of a wire mesh, fabric mesh, fiberglass mesh or boarded substrate.

Aspect 16 can include, or can optionally be combined with the subject matter of Aspects 1-15 to optionally include wherein the lath membrane is coupled with the drainage framework with one or more fasteners.

Aspect 17 can include, or can optionally be combined with the subject matter of Aspects 1-16 to optionally include a moisture permeable layer interposed between the lath membrane and the drainage framework.

Aspect 18 can include, or can optionally be combined with the subject matter of Aspects 1-17 to optionally include a moisture impermeable layer coupled along the strut support faces, the moisture impermeable layer is less moisture permeable relative to the moisture permeable layer and configured to resist moisture ingress through the moisture impermeable layer.

Aspect 19 can include, or can optionally be combined with the subject matter of Aspects 1-18 to optionally include a second lath membrane coupled with the strut support faces, and the plurality of support struts space the lath membrane and the second lath membrane from each other.

Aspect 20 can include, or can optionally be combined with the subject matter of Aspects 1-19 to optionally include wherein the plurality of support struts include one or more of a polymer or a foamed polymer.

Aspect 21 can include, or can optionally be combined with the subject matter of Aspects 1-20 to optionally include a structural panel, and the drainage framework and the lath membrane are components of the structural panel.

Aspect 22 can include, or can optionally be combined with the subject matter of Aspects 1-21 to optionally include wherein the structural panel includes an inner wall panel, and the drainage framework is coupled directly or indirectly with the inner wall panel.

Aspect 23 can include, or can optionally be combined with the subject matter of Aspects 1-22 to optionally include a first layer having the lath membrane and a second layer, and the drainage framework is captured between the first and second layers.

Aspect 24 can include, or can optionally be combined with the subject matter of Aspects 1-23 to optionally include a jacket including the first layer coupled with the second layer with one or more jacket chambers therebetween, and the drainage framework is within the one or more jacket chambers.

Aspect 25 can include, or can optionally be combined with the subject matter of Aspects 1-24 to optionally include wherein the one or more jacket chambers include first and second jacket chambers, and the drainage framework is within the first jacket chamber and the lath membrane is within the second jacket chamber.

Aspect 26 can include, or can optionally be combined with the subject matter of Aspects 1-25 to optionally include a draining construction structure comprising: a structural panel; and a drainage framework coupled with the structural panel, the drainage framework includes: a plurality of support struts, wherein each of the support struts of the plurality of support struts includes a strut body extending from the structural panel to a strut support face; drain channels between the support struts; and wherein the plurality of support struts brace the structural panel away from the strut support faces.

Aspect 27 can include, or can optionally be combined with the subject matter of Aspects 1-26 to optionally include wherein the structural panel includes one or more of plywood, oriented strand board (OSB), sealed OSB, sealed plywood, structural fiberboard, diagonal tongue and groove plank, or foam board.

Aspect 28 can include, or can optionally be combined with the subject matter of Aspects 1-27 to optionally include wherein the structural panel includes: a structural component layer; and a moisture impermeable component layer interposed between the structural component layer and the drainage framework.

Aspect 29 can include, or can optionally be combined with the subject matter of Aspects 1-28 to optionally include wherein the moisture impermeable component layer includes one or more of a moisture resistant coating, film or membrane.

Aspect 30 can include, or can optionally be combined with the subject matter of Aspects 1-29 to optionally include a lath membrane coupled with the strut support faces.

Aspect 31 can include, or can optionally be combined with the subject matter of Aspects 1-30 to optionally include moisture permeable layer interposed between the lath membrane and the strut support faces.

Aspect 32 can include, or can optionally be combined with the subject matter of Aspects 1-31 to optionally include wherein the plurality of support struts include one or more of a polymer or a foamed polymer.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," or the like are used merely as labels, and are not intended to impose numerical requirements on their objects.

Geometric terms, such as "parallel". "perpendicular", "round", or "square", are not intended to require absolute mathematical precision, unless the context indicates otherwise. Instead, such geometric terms allow for variations due to manufacturing or equivalent functions. For example, if an element is described as "round" or "generally round." a component that is not precisely circular (e.g., one that is slightly oblong or is a many-sided polygon) is still encompassed by this description.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A draining construction structure comprising:
a first layer configured for coupling with one or more of a building or an outer wall;
a second layer configured for coupling with one or more of the building or the outer wall;
a drainage framework interposed between the first and second layers, the drainage framework includes:
a plurality of support struts, each of the support struts includes a strut body extending between the first and second layers;
drain channels between the support struts; and
wherein the plurality of support struts brace the first layer away from the second layer with a strut gap; and
a jacket including three jacket chambers, each chamber including one of the drainage framework, the first and the second layers, respectively.

2. The draining construction structure of claim 1, wherein one or more of the first or second layers includes a lath membrane configured for coupling with stucco, mud or plaster.

3. The draining construction structure of claim 2, wherein one or more of the first or second layers including the lath membrane includes a moisture permeable layer coupled with the lath membrane.

4. The draining construction structure of claim 1, wherein the strut bodies of the plurality of support struts are rigid relative to the first and second layers.

5. The draining construction structure of claim 1, wherein the plurality of support struts are in a pattern, and the plurality of support struts are captured between the first and second layers and maintained in the pattern.

6. The draining construction structure of claim 1, wherein one or more of the first or second layers includes a pliable moisture permeable layer configured to permit moisture ingress to the drainage framework.

7. The draining construction structure of claim 6, wherein one or more of the first or second layers includes a pliable moisture impermeable layer that is less permeable relative to the pliable moisture permeable layer and configured to resist moisture ingress through the pliable moisture impermeable layer.

8. The draining construction structure of claim 1, wherein one or more of the first or second layers includes a structural panel.

9. The draining construction structure of claim 8, wherein the structural panel includes a sealed wall panel having a moisture impermeable layer interposed between the drainage framework and the remainder of the sealed wall panel.

10. The draining construction structure of claim 1, wherein the plurality of support struts include one or more of a polymer or a foamed polymer.

11. The draining construction structure of claim 1, wherein the first and second layers and the drainage framework are included in a construction wrap.

12. The draining construction structure of claim 1, wherein one or more of the first or second layers includes a fastener for coupling; along one or more of the building or the outer wall.

13. A draining construction structure comprising:
a lath membrane;
a drainage framework indirectly coupled with the lath membrane, the drainage framework includes:
a plurality of support struts, each of the support struts of the plurality of support struts extends from the lath membrane to respective strut support faces;
drain channels between the support struts; and
wherein the lath membrane is recessed from the strut support faces of the plurality of support struts with the plurality of support struts and drainage channels therebetween; and
a moisture permeable layer interposed between the lath membrane and the drainage framework.

14. The draining construction structure of claim 13, wherein the lath membrane includes one or more of a wire mesh, fabric mesh, fiberglass mesh or boarded substrate.

15. The draining construction structure of claim 13, wherein the lath membrane is coupled with the drainage framework with one or more fasteners.

16. The draining construction structure of claim 13 comprising a moisture impermeable layer coupled along the strut support faces, the moisture impermeable layer is less moisture permeable relative to the moisture permeable layer and configured to resist moisture ingress through the moisture impermeable layer.

17. The draining construction structure of claim 13 comprising a second lath membrane coupled with the strut support faces, and the plurality of support struts space the lath membrane and the second lath membrane from each other.

18. The draining construction structure of claim 13, wherein the plurality of support struts include one or more of a polymer or a foamed polymer.

19. The draining construction structure of claim 13 comprising a structural panel, and the drainage framework and the lath membrane are components of the structural panel.

20. The draining construction structure of claim 19, wherein the structural panel includes an inner wall panel, and the drainage framework is coupled directly or indirectly with the inner wall panel.

21. The draining construction structure of claim 13 comprising a first layer having the lath membrane and a second layer, and the drainage framework is captured between the first and second layers.

22. The draining construction structure of claim 21 comprising a jacket including the first layer coupled with the second layer with one or more jacket chambers therebetween, and the drainage framework is within the one or more jacket chambers.

23. The draining construction structure of claim 22, wherein the one or more jacket chambers include first and second jacket chambers, and the drainage framework is within the first jacket chamber and the lath membrane is within the second jacket chamber.

* * * * *